(12) United States Patent
Takada et al.

(10) Patent No.: US 7,743,209 B2
(45) Date of Patent: Jun. 22, 2010

(54) STORAGE SYSTEM FOR VIRTUALIZING CONTROL MEMORY

(75) Inventors: Masanori Takada, Yokohama (JP); Kentaro Shimada, Tokyo (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 11/607,370

(22) Filed: Dec. 1, 2006

(65) Prior Publication Data

US 2008/0082745 A1 Apr. 3, 2008

(30) Foreign Application Priority Data

Oct. 3, 2006 (JP) .............................. 2006-271778

(51) Int. Cl.
G06F 12/00 (2006.01)
G06F 12/02 (2006.01)
G06F 12/08 (2006.01)
G06F 13/00 (2006.01)
G06F 13/28 (2006.01)
G06F 9/26 (2006.01)
G06F 9/34 (2006.01)

(52) U.S. Cl. ................ 711/113; 711/1; 711/3; 711/118; 711/122; 711/129; 711/202; 711/203; 711/205; 711/206

(58) Field of Classification Search .......... 711/1–6, 711/113, 118–146, 202–206
See application file for complete search history.

(56) References Cited

U.S. PATENT DOCUMENTS 6,058,456 A * 5/2000 Arimilli et al. .............. 711/129
7,043,604 B2 5/2006 Ogasawara et al.
2002/0007427 A1 * 1/2002 Forin ........................... 710/26

(Continued)

FOREIGN PATENT DOCUMENTS

JP 05-313824 A 11/1993

(Continued)

OTHER PUBLICATIONS

"The IBM Total Storage DS8000 Series: Concepts and Architecture", ibm.com/redbooks, International Technical Support Organization, Mar. 2005.

(Continued)

*Primary Examiner*—Sanjiv Shah
*Assistant Examiner*—Yaima Campos
(74) *Attorney, Agent, or Firm*—Townsend and Townsend and Crew LLP

(57) ABSTRACT

There is provided a storage system capable of handling a large amount of control data at low cost in high performance. The storage system includes a cache memory for temporarily storing data read/written between a host computer and a disk array, a CPU for making a control related to data transfer, and a local memory for storing control data utilized by the CPU. The disk array has a first user data storing area for storing user data and a control data storing area for storing all control data. A control unit has a virtualization unit for allocating a memory space of the control data storing area to a virtual address accessible from the CPU, reading the control data specified by the virtual address to a physical address of the local memory, and transferring the control data to the CPU.

12 Claims, 43 Drawing Sheets

U.S. PATENT DOCUMENTS

| | | | |
|---|---|---|---|
| 2003/0088739 A1* | 5/2003 | Wilkes et al. | 711/133 |
| 2004/0215878 A1* | 10/2004 | Takata et al. | 711/114 |
| 2004/0221105 A1 | 11/2004 | Fujimoto et al. | |
| 2005/0055528 A1* | 3/2005 | Arimilli et al. | 711/203 |
| 2005/0228937 A1* | 10/2005 | Karr et al. | 711/6 |
| 2006/0010293 A1* | 1/2006 | Schnapp et al. | 711/119 |

FOREIGN PATENT DOCUMENTS

| | | |
|---|---|---|
| JP | 07-152643 A | 6/1995 |
| JP | 2004-240949 | 8/2004 |
| JP | 2005-157713 A | 6/2005 |

OTHER PUBLICATIONS

Japan Patent Office (JPO) office action for JPO patent application JP2006-271778 (Feb. 3, 2009).

Japan Patent Office (JPO) office action for JPO patent application JP2006-271778 (May 26, 2009).

* cited by examiner

| VIRTUAL PAGE NUMBER | VALID | PHYSICAL PAGE NUMBER | UPDATE |
|---|---|---|---|
| 0 | Y | 1 | Y |
| 1 | Y | 5 | N |
| 2 | Y | 7 | N |
| 3 | N | NULL | N |
| 4 | N | NULL | N |
| ... | ... | ... | ... |

| SLOT NUMBER | DATA |
|---|---|
| 0 | DATA OF VIRTUAL PAGE 2 |
| 1 | DATA OF VIRTUAL PAGE 3 |
| 2 | INVALID DATA (FREE) |
| ... | ... |

*FIG. 18*

| VIRTUAL PAGE NUMBER | VALID | SLOT NUMBER | UPDATE |
|---|---|---|---|
| 0 | Y | 2 | N |
| 1 | N | NULL | - |
| 2 | Y | 5 | Y |
| 3 | Y | 1 | Y |
| ... | ... | ... | ... |

*FIG. 19*

| CACHE MEMORY SLOT NUMBER |
|---|
| 3 |
| 4 |
| 6 |
| ... |

*FIG. 20*

| FIRMWARE PROGRAM | MEMORY VIRTUALIZATION FUNCTION | 4101 |
| --- | --- | --- |
| | DATA TRANSFER FUNCTION TO LOCAL MEMORY | 4102 |
| | LOCAL MEMORY FREE PHYSICAL PAGE ALLOCATING FUNCTION | 4103 |
| | LOCAL MEMORY PHYSICAL PAGE RELEASING FUNCTION | 4104 |
| | CONTROL DATA COMMIT FUNCTION | 4105 |
| | DATA TRANSFER FUNCTION TO CACHE MEMORY | 4106 |
| | DATA TRANSFER FUNCTION FROM LOCAL MEMORY TO CACHE MEMORY | 4107 |
| | CACHE MEMORY FREE SLOT ALLOCATING FUNCTION | 4108 |
| | CACHE MEMORY SLOT RELEASING FUNCTION | 4109 |
| | CACHE MEMORY ALLOCATING FUNCTION TO CONTROL PROGRAM | 4110 |
| | CACHE MEMORY RELEASING FUNCTION FROM CONTROL PROGRAM | 4111 |
| | FIRMWARE DATA RESUME FUNCTION | 4112 |
| | ⋮ | |

STORAGE SYSTEM FOR VIRTUALIZING CONTROL MEMORY

CLAIM OF PRIORITY

The present application claims priority from Japanese application P2006-271778 filed on Oct. 3, 2006, the content of which is hereby incorporated by reference into this application.

BACKGROUND

This invention relates to a storage system for storing data in a plurality of disk drives.

There has been known a so-called storage system, whose subsystem is composed of a disk array composed of a plurality of disk drives, for storing data to the disk array.

The storage system is composed of a host interface, a disk interface, a cache memory, a control unit, and a switch for connecting them. The control unit is composed of a processor and a control memory for storing control data of the processor for example. The storage system is connected with a host computer via the host interface and with the disk array via the disk interface. The storage system is composed of the host interface for connecting with the host computer, the disk interface for connecting with the disk array, the cache memory for quickly executing data access to/from the disk array, a CPU for controlling the storage system, the switch for connecting each unit within the storage system, the control memory for storing data required by the CPU in making the above-mentioned control, and a bus used by the CPU in accessing the memory.

Large corporations typified by banks, security companies, telephone companies, and the like are inclined to cut costs required for operations, maintenances, and administration of computer and storage systems by centralizing within a data center the computer and storage systems conventionally scattered at various places. Therefore, it is now required to manage a larger scale data by one storage system.

Still more, due to multi-functioning of the storage system, a rate of control data tends to be larger as compared to user data actually sent from the host computer.

Up to now, there has been known a storage system in which whole control data is stored in a control memory of a control unit independent of a cache memory as disclosed in JP 2004-240949 A for example.

Meanwhile, there has been known a storage system using a general purpose server that has a dedicated interface and a hard disk as destinations in saving the control data and that is capable of handing control data whose volume is larger than a capacity of a control memory as disclosed in "The IBM Total Storage DS8000 Series Concepts and Architecture" Page 64, Line 6, "online" Retrieved on Aug. 31, 2006, Internet, (http://www.redbooks.ibm.com/redbooks/pdfs/sg246452.pdf.)

SUMMARY

However, the storage system that is provided with the control memory independently of the cache memory as disclosed in JP 2004-240949 A has a problem that it is unable to increase a scale of management over the storage system due to deficiency of the capacity of the control memory when an amount of control data increases as described above.

Meanwhile, it is also possible to largely increase the capacity of the control memory to place the whole necessary control data in the control memory. However, there has been a problem that the cost of the control memory per capacity is expensive and that it becomes difficult to provide the storage system at low cost when the capacity of the control memory is increased.

The configuration using the general purpose server as seen in "The IBM Total Storage DS8000 Series Concepts and Architecture" can handle the control data whose volume is larger than the capacity of the control memory, but it also has had a problem that it requires the dedicated interface and hard disk as the destination of saving of the control data and that it becomes difficult to provide the storage system at low cost.

Accordingly, it is an object of this invention to provide a storage system that is capable of handling a large volume of control data at low cost in high performance.

According to this invention, there is provided a storage system, including: a first interface connected to a host computer; a second interface connected to disk drives for storing data; a cache memory for storing data read from/written to the disk drives; a control unit having a processor for performing a control related to data transfer between the first and second interfaces and the cache memory; and a local memory for storing control data used by the processor for the control, in which: the disk drive has a first user data storing area for storing user data and a first control data storing area for storing the control data used by the processor; and the control unit has a virtualization unit for allocating a memory space of the first control data storing area to a virtual address accessible from the processor, and reading control data specified by the virtual address to an area specified by a physical address of the local memory to pass the control data to the processor.

Accordingly, this invention enables the storage system to handle a large amount of control data even when the capacity of the local memory for storing the control data mounted in the storage system is small. Meanwhile, this invention allows the virtualization as if the large local memory exists when seen from the control unit. The control memory virtualization function of this invention may be readily used even when a program executed in the control unit is a control program having many functions. As a result, it becomes possible to provide the low cost and high performance storage system because it is not necessary to increase the capacity of the local memory.

BRIEF DESCRIPTION OF THE DRAWINGS

FIG. 18 is an explanatory table showing a configuration of a control data storing area on the cache memory according to the third embodiment of this invention.

FIG. 19 is an explanatory table showing a configuration of a cache memory directory according to the third embodiment of this invention.

FIG. 20 is an explanatory table showing a configuration of a cache memory free slot list according to the third embodiment of this invention.

FIG. 37 is a block diagram showing functions of a firmware program according to the sixth embodiment of this invention.

DETAILED DESCRIPTION OF THE PREFERRED EMBODIMENTS

Preferred embodiments of this invention will now be explained based on the appended drawings.

First Embodiment

A first embodiment pertains to a case where control data, i.e., management information for carrying out data transfer is stored in a disk array composed of two or more disk drives and a firmware carries out the data transfer appropriately between the disk array and a local memory in response to a request from a control program in a storage system that has a cache memory and a processor (CPU) that controls the data transfer.

Figure 1:
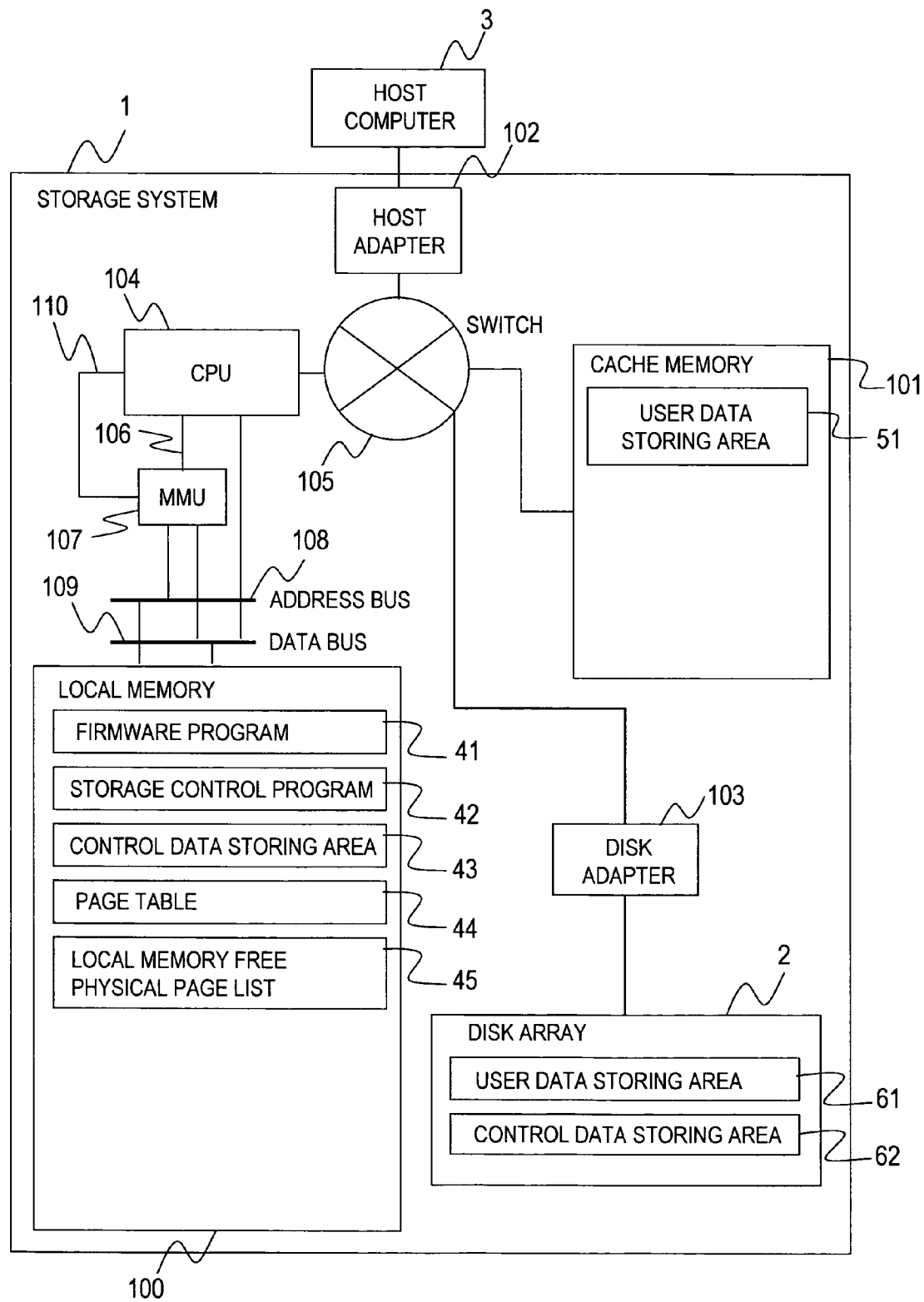
FIG. 1 is a block diagram showing a configuration of a storage system according to a first embodiment of this invention.

FIG. 1 shows a whole configuration of a storage system of this embodiment. The storage system 1 is connected with a host computer 3 via a host adaptor 102 and is connected with a disk array 2 via a disk adaptor 103. It should be noted that the host adaptor 102 is a channel interface and the disk adaptor 103 is a disk interface.

The storage system 1 is composed of the host adaptor 102 for connecting with the host computer 3, the disk adaptor 103 for connecting with the disk array 2, a cache memory 101 for quickly accessing data to/from the disk array 2, a CPU 104 for controlling the storage system 1, a switch 105 for mutually connecting the respective units within the storage system 1, a local memory 100 used by the CPU 104 for operations, a virtual address bus 106 for specifying an address when the CPU 104 accesses to the local memory 100, an MMU (Memory Management Unit) 107 for converting a virtual address (or logical address) passed from the CPU 104 into a physical address, a physical address bus 108 for specifying an address when the MMU 107 accesses to the local memory 100, a data bus 109 for passing data between the CPU 104 and the local memory 100, and an interrupt line 110 for informing the CPU 104 that there exists no data by an interrupt signal when there exists no data (user data or control data) requested by the CPU 104 on the local memory 100.

The contents of the disk array 2, the cache memory 101 and the local memory 100 that are memory media included in this embodiment will be explained below.

The disk array 2 has a user data storing area 61 for storing user data transmitted from the host computer 3 and a control data storing area 62 for storing the control data handled by the storage system 1.

Here, the control data indicates data generated or utilized by a storage control program 42 described later in executing a predetermined process such as a bit map used by the storage system 1 in preparing a snapshot of an area of the user data storing area 61 of the disk array 2 and differential data calculated by the storage system 1 that conducts remote copy in transmitting only the differential data.

It should be noted that the user data is data sent from the host computer 3 and the like and is read/written from/to an application and the like of the host computer 3.

The cache memory 101 has a user data storing area 51 for storing the user data from the host computer 3.

The local memory 100 stores a firmware program 41, the storage control program 42, a control data storing area 43, a page table 441 and a local memory free page list 45. Each of those will be outlined below.

The firmware program 41 is a program executed by the CPU 104 for virtualizing a control memory space that is to be carried out in this invention.

The storage control program 42 is a program executed by the CPU 104 for controlling the storage system 1 and the disk array 2 in response to a request from the host computer 3.

The control data storing area 43 is a physical memory space for storing a part of the control data handled by the storage control program 42. The control data stored in the space of the control data storing area 43 may be accessed from the storage control program 42 via the MMU 107 managed by the firmware program 41.

The page table 44 carries out conversion between the logical address (virtual address) handled by the storage control program 42 and the physical address allocated to the local memory 100 and stores information whether or not corresponding data of the virtualized control data space exists in the control data storing area 43. The MMU 107 and the firmware program 41 make a reference to this table 44.

The local memory free page list 45 has information for managing free areas currently not in use of the control data storing area 43.

Figure 2:
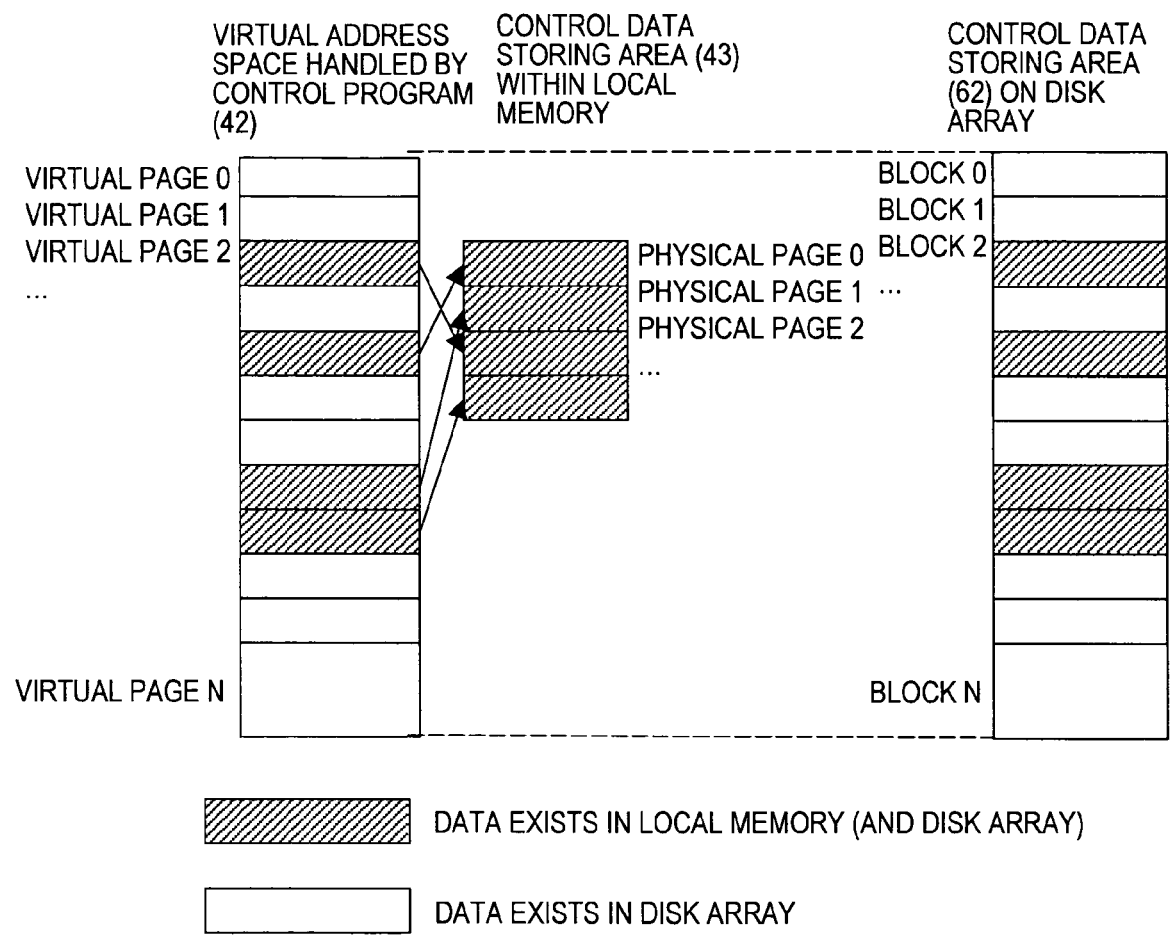
FIG. 2 is a map showing an address space of control data according to the first embodiment of this invention.

FIG. 2 shows the mapping in virtualizing the control information realized in this invention. In a configuration in which a capacity of the control data storing area 62 on the disk array 2 is larger than that of the control data storing area 43 within the local memory 100, the firmware program 41 provides a virtual control memory space having the same capacity with the control data storing area 62 on the disk array 2 to the storage control program 42 by appropriately transferring data between the aforementioned control data storing areas 43 and 62. Accordingly, the storage control program 42 can handle a large amount of control data without being restricted by the capacity of the local memory 100. In other words, the firmware program 41 allocates a memory space (or memory area) of the control data storing area 62 on the disk array 2 to a virtual address space (or to a logical address space) accessible by the CPU 104. Then, the firmware program 41 reads only necessary control data in the virtual address space to the control data storing area 43 of the local memory 100 that is a physical memory space and lets the storage control program 42 to execute reading/writing of the data.

The storage control program 42 accesses to the local memory 100 by using the virtual address of the virtual control memory space having the same size with the control data storing area 62 on the disk array 2 to access to the control data storing area 43 and to control the storage system 1. Only part of the control data in the control data storing area 62 of the disk array 2 is stored in the control data storing area 43 of the local memory 100 and when object data to which the storage control program 42 tried to access exists in the local memory 100, the storage control program 42 directly accesses to the corresponding part of the local memory 100 and continues its process. When the object data does not exist in the local memory 100, the storage control program 42 calls out a memory virtualization function 4101 of the firmware program 41 by using the interrupt line 110 to take out the data required by the storage control program 42 from the control data storing area 62 on the disk array 2 to the control data storing area 43 on the local memory 100.

Then, the process is returned from the firmware program 41 to the storage control program 42 and an appearance is given to the storage control program 42 as if information required exists from the beginning in the control data storing area 43 on the local memory 100. The firmware program 41 manages where those control data are to be stored, i.e., to which memory or to which place in the disk array.

The transfer between these resources is carried out in unit of virtual page that is a fixed length virtual address space. The virtual pages 0 through N (virtual page number) are stored in the physical page of the control data storing area 43 on the local memory 100 as necessary in addition to corresponding blocks 0 through N (block number) within the control data storing area 62 on the disk array 2.

The firmware program 41 accepts memory access from the storage control program 42 in the virtual address space equal to the memory capacity of the control data storing area 62 set in the disk array 2 and when required control data does not exist on the local memory 100, the firmware program 41 reads the control data from the control data storing area 62 on the disk array 2, writes it into the control data storing area 43 on the local memory 100 and then passes it to the storage control program 42. This realizes handling of the large capacity memory space of the control data storing area 62 of the disk array 2 by the control data storing area 43 allocated on the small capacity local memory 100.

Figure 3:
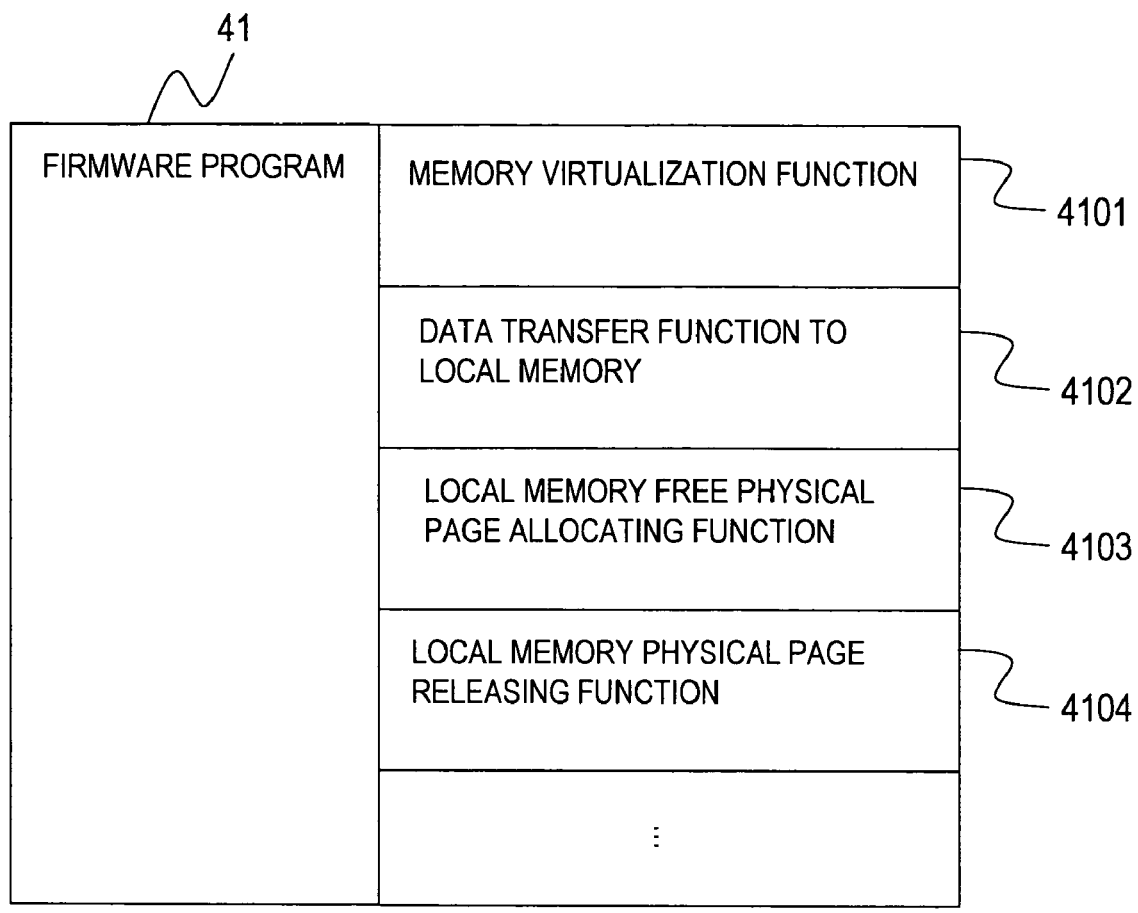
FIG. 3 is a block diagram showing functions of a firmware program according to the first embodiment of this invention.

FIG. 3 shows functions of the firmware program 41. The firmware program 41 has a memory virtualization function 4101 for transferring data between the local memory 100 and the disk array 2 in response to a request from the storage control program 42, a data transfer function 4102 for taking object control data out of the control data storing area 62 to transfer to the local memory 100, the local memory free physical page allocating function 4103 for allocating a storage space of the control data in the local memory 100, and a local memory physical page releasing function 4104 for making a part of the control data storing area 43 on the local memory 100 as a free space.

Figure 4:
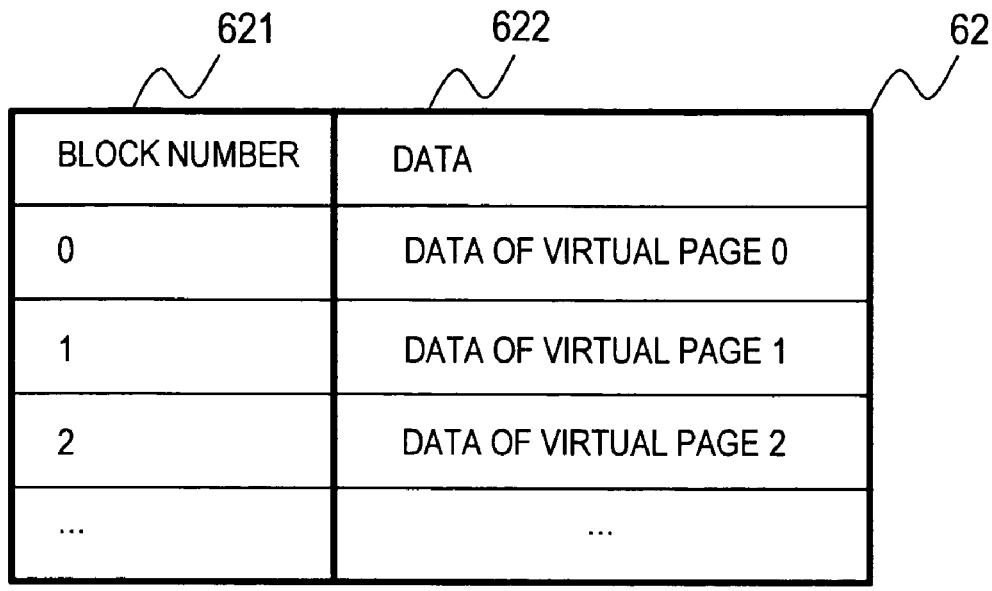
FIG. 4 is an explanatory table showing a configuration of a control data storing area on a disk array according to the first embodiment of this invention.

The control data storing area 62 within the disk array 2 is configured as shown in FIG. 4. The control data storing area 62 is divided into blocks having a constant size and numbered by block number 621 in a predetermined sequence. Reading/writing of data from/to the control data storing area 62 is carried out in unit of block by using the block number 621.

Figure 5:
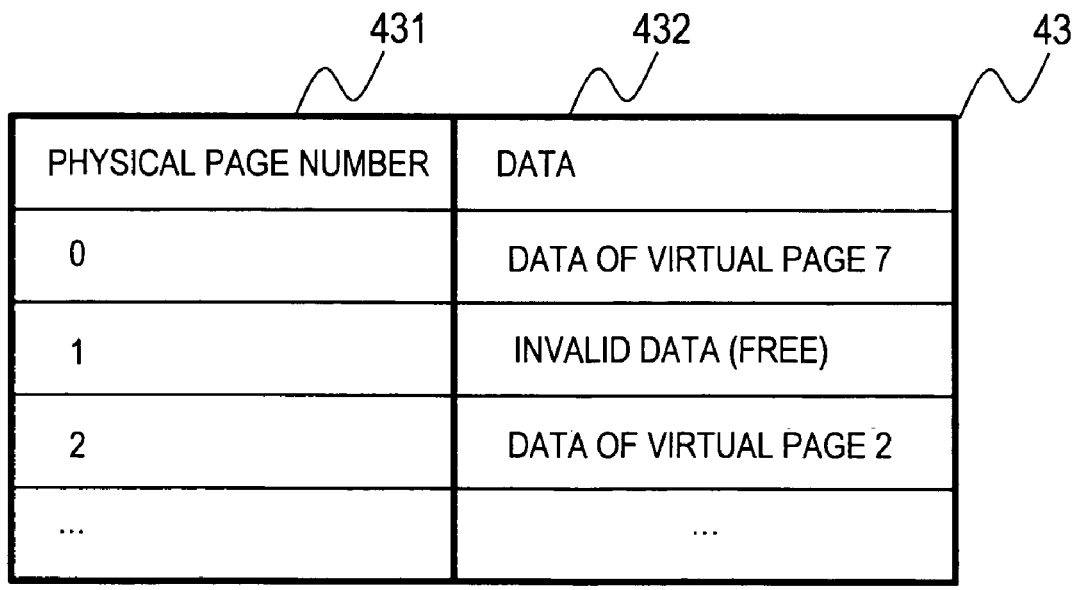
FIG. 5 is an explanatory table showing a configuration of a control data storing area on a local memory according to the first embodiment of this invention.

The control data storing area 43 on the local memory 100 is configured as shown in FIG. 5. A control data storing area 43 on the local memory 100 is divided into physical pages having a constant size and numbered by a physical page number 431 in a predetermined sequence.

Figures 6, 7:
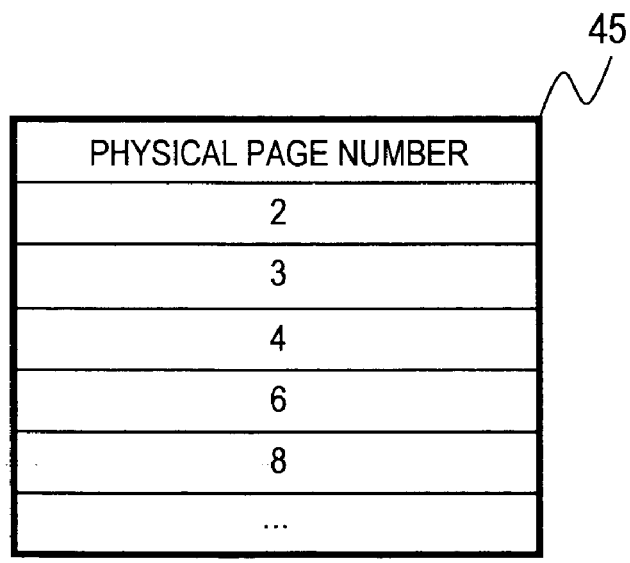
FIG. 6 is an explanatory table showing a configuration of a page table according to the first embodiment of this invention.
FIG. 7 is an explanatory table showing a configuration of a free page list of the local memory according to the first embodiment of this invention.

The page table 44 is configured as shown in FIG. 6. Each entry of the page table 44 corresponds to each virtual page. Therefore a table entry exists per virtual page number 441. Each entry has a valid flag 442 indicating whether or not the page exists on the local memory 100, a physical page number 443 indicating a place where the page exists when the page exists on the local memory 100, and an update flag 444 indicating whether or not the page has been updated after being read out of the control data storing area 62 of the disk array 2.

The local memory free physical page list 45 is configured as shown in FIG. 7. It records page numbers of physical pages in which no valid data is stored among the respective pages of the control data storing area 43 on the local memory 100.

The firmware program 41 that carries out the virtualization of the control memory that is the feature of this invention will be explained below with reference to flowcharts.

Figure 8:
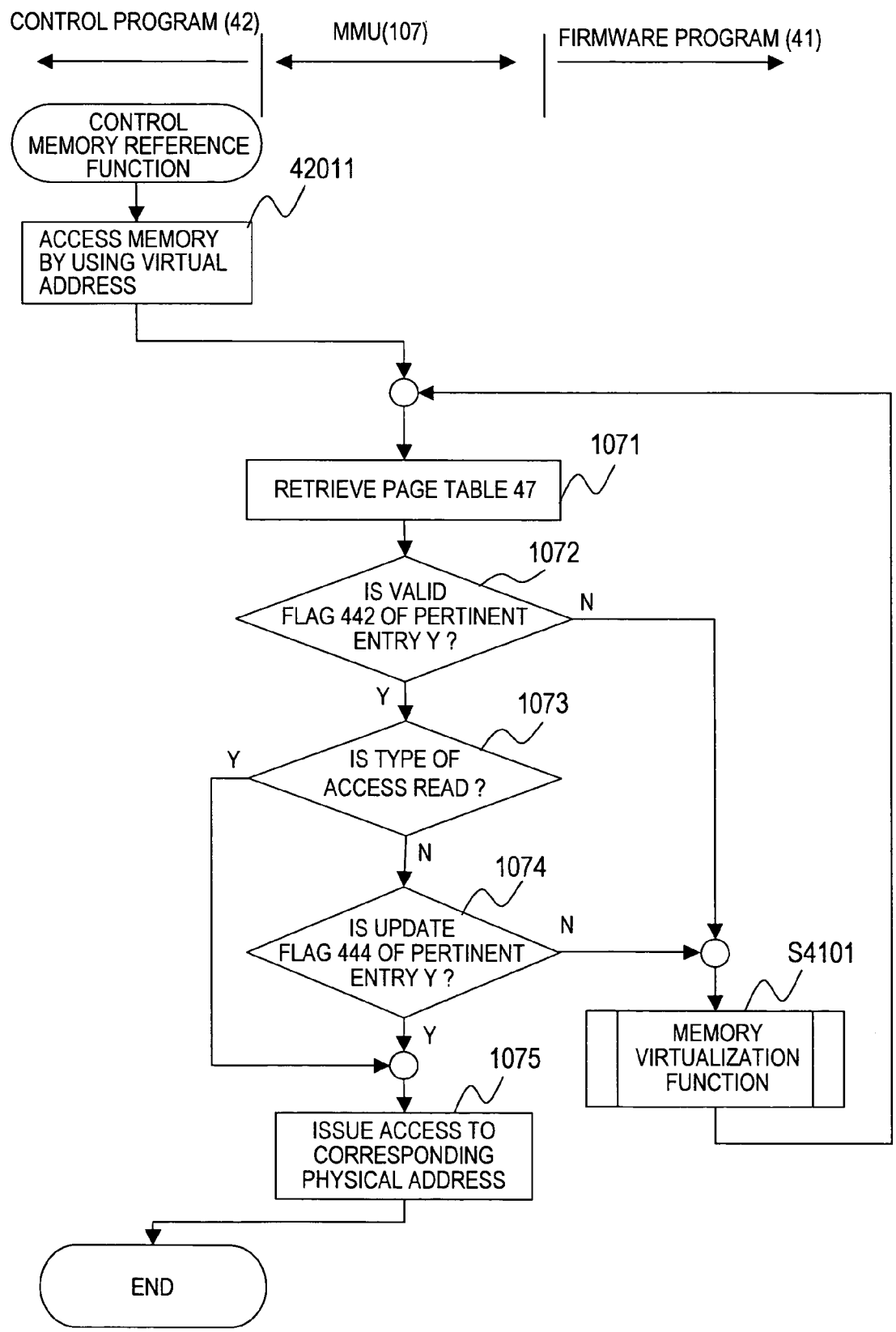
FIG. 8 is a flowchart showing one exemplary process when a storage control program references to the control data according to the first embodiment of this invention.

FIG. 8 is a flowchart when the storage control program 42 makes a reference to the control data storing area 43. The storage control program 42 makes a reference to the control data storing area 43 of the local memory 100 as follows. The storage control program 42 specifies a virtual address (virtual page number 441) and the CPU 104 executes a memory access command in Step 42011. The virtual address specified at this time is passed to the MMU 107 via the virtual address bus 106 shown in FIG. 1. The MMU 107 calculates the virtual page number from the virtual address passed from the storage control program 42 and retrieves an entry corresponding to the virtual page number 441 from the page table 44 in Step 1071.

Then, the MMU 107 makes a reference to the valid flag 442 of the entry in Step 1072. When the flag is Y and the entry exists on the control data storing area 43 of the local memory 100, the MMU 107 checks next whether the access issued by the storage control program 42 is read or write in Step 1073. When this access is read, the MMU 107 calculates a corresponding physical address of the local memory 100 from the physical page number 443 of the entry in the page table 44 and issues an access to the physical address of the local memory 100 by using the physical address bus 108 in Step 1075.

When the type of the access in Step 1073 is write on the other hand, the MMU 107 makes a reference to the update flag 444 of the page table 44 next in Step 1074. When the update flag 444 is Y as a result of the reference, the MMU 107 issues the access to the corresponding physical address in the same manner with the case of read access in Step 1075. When the update flag is N as a result of the reference in Step 1074, the MMU 107 calls out the memory virtualization function 4101 in the firmware program 41 by using the interrupt line 110 in Step S4101 because the update flag 444 of the page table 44 must be changed. Then, the MMU 107 carries out the process again from Step 1071.

When the exist flag 442 of the entry is N in Step 1072 on the other hand, the control data to which the access has been tried does not exist in the control data storing area 43 on the local memory 100 from the beginning, so that the MMU 107 calls out the memory virtualization function of the firmware program 41 in Step S4101. Then, the MMU 107 carries out the process again from the retrieval of the page table in Step 1071.

While the MMU 107 judges whether or not the control data exists and whether or not it is updated by making a reference to the page table 44 in this embodiment, it is needless to say that the effect of this invention may be obtained even when a program operative on the CPU 104 judges them in the same manner instead of the MMU 107.

Figure 9:
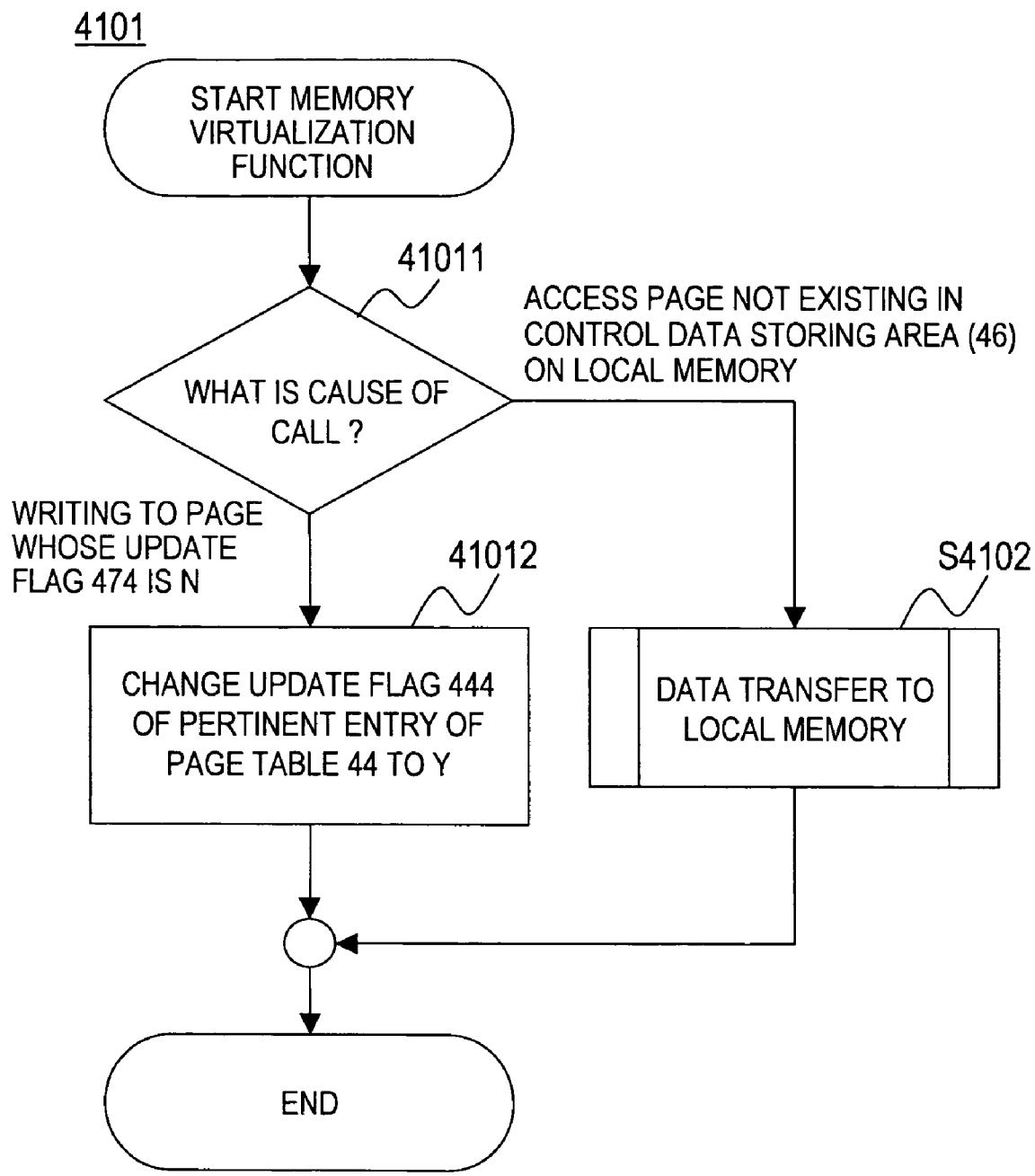
FIG. 9 is a flowchart showing one exemplary process carried out in a memory virtualization function of the firmware program according to the first embodiment of this invention.

FIG. 9 is a flowchart showing the contents of the memory virtualization function 4101 of the firmware program 41. The MMU 107 calls out this function when the storage control program 42 makes a reference to the control memory. First, the firmware program 41 checks a cause why the memory virtualization function 4101 has been called from the MMU 107 in Step 41011. When the cause of call is writing to non-updated area by the storage control program 42, the firmware program 41 changes the update flag 444 of the entry of the page table 44 to Y in Step 41012 and returns the process to the caller.

When the cause of call checked in Step 41011 is an access to the virtual page not existing in the control data storing area 43 on the local memory 100, the firmware program 41 calls out the data transfer function 4102 for transferring data from the control data storing area 62 on the disk array 2 to the control data storing area 43 on the local memory 100 in Step S4102 and then returns the process to the caller.

Figure 10:
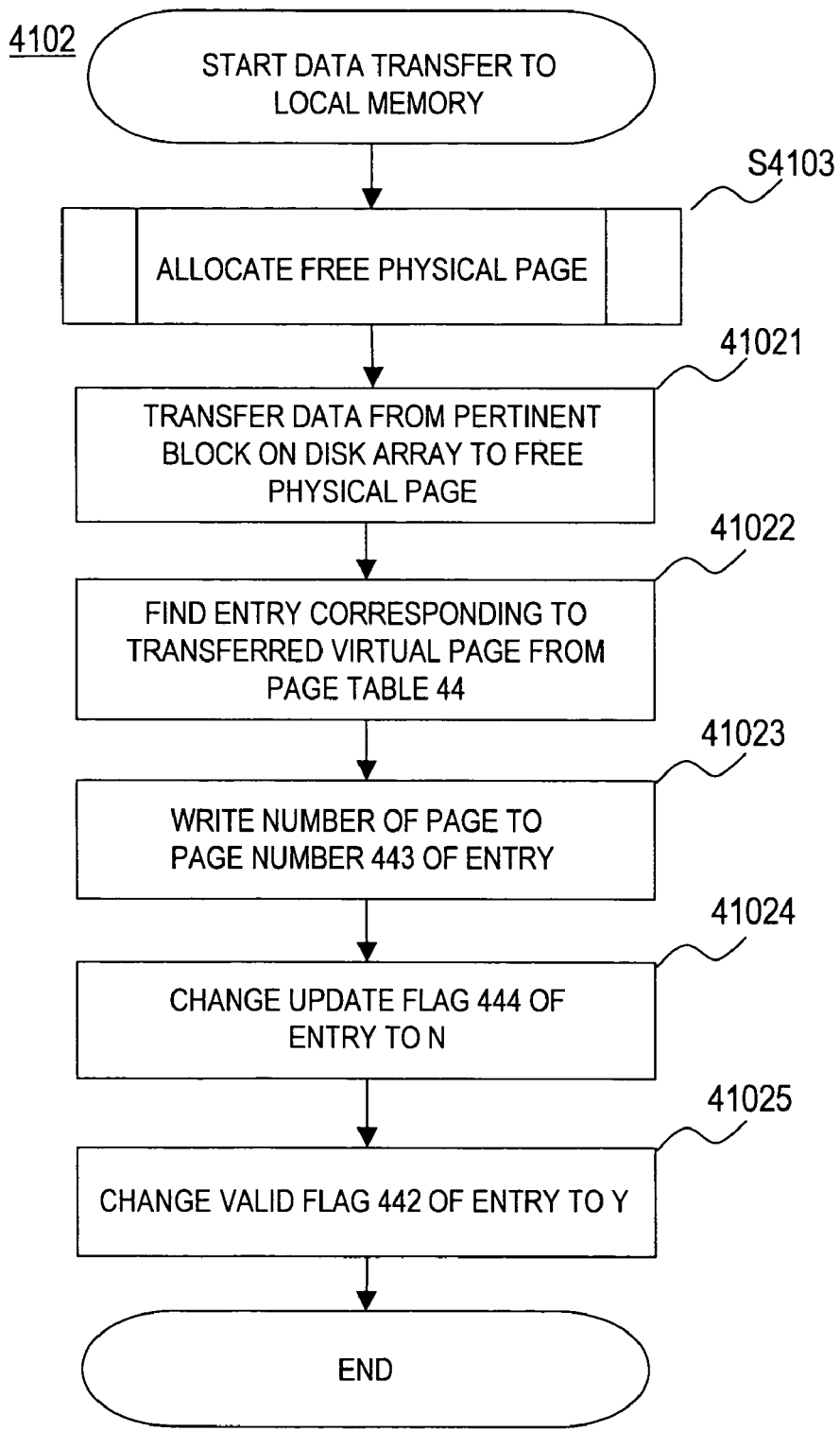
FIG. 10 is a flowchart showing one exemplary process in a data transfer function to the local memory of the firmware program according to the first embodiment of this invention.

FIG. 10 is a flowchart showing one exemplary process carried out in the data transfer function 4102 for transferring a virtual page not existing in the control data storing area 43 on the local memory 100 from the control data storing area 62 on the disk array 2 to the control data storing area 43 on the local memory 100.

First, the firmware program 41 calls out the free physical page allocating function 4103 for allocating a free physical page of the control data storing area 43 on the local memory 100 as destination in Step S4103. The allocating function will be detailed later. Then, the firmware program 41 transfers data from a block corresponding to the virtual page number 441 of the control data storing area 62 on the disk array 2 to the physical page of the local memory 100 in Step 41021. After that, the firmware program 41 updates the entry in the page table 44. To be specific, the firmware program 41 retrieves the entry corresponding to the transferred virtual page number 441 from the page table 44 in Step 41022. Then, the firmware program 41 writes the physical page number 443 of the destination to the physical page number 443 of the retrieved entry in Step 41023. After that, the firmware program 41 sets the update flag 444 of the entry at N in Step 41024 and finally sets the valid flag 442 at Y in Step 41025.

Because the firmware program 41 finishes the transfer of the object control data to the control data storing area 43 on the local memory 100 and the update of the page table 44 by the processes described above, it returns the control to the caller.

Figure 11:
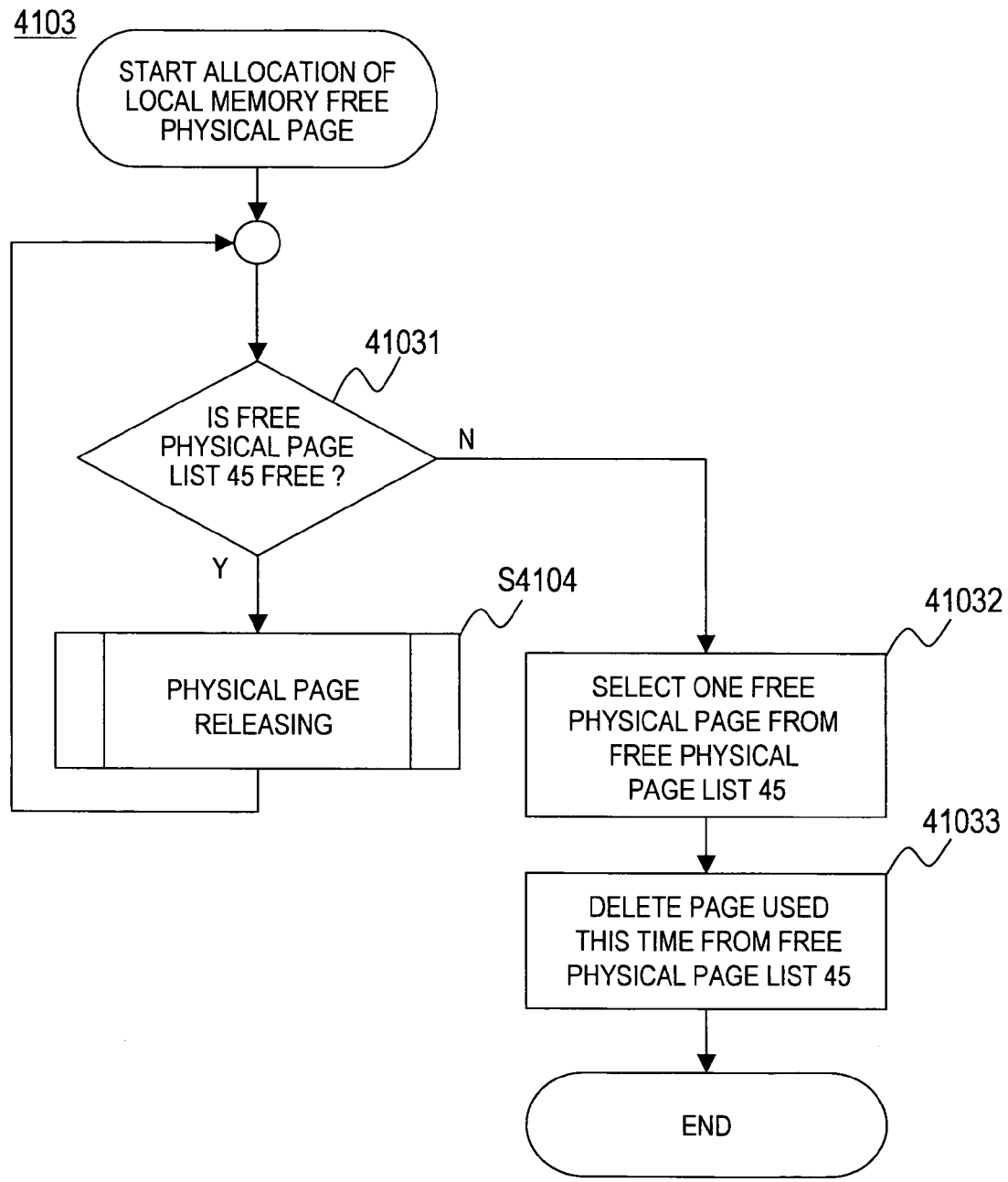
FIG. 11 is a flowchart showing one exemplary process carried out in a local memory free physical page allocating function of the firmware program according to the first embodiment of this invention.

FIG. 11 is a flowchart of the free physical page allocating function 4103 for allocating the free physical page of the control data storing area 43 on the local memory 100. First, the firmware program 41 judges whether or not the local memory free physical page list 45 is free in Step 41031 and calls out the local memory physical page releasing function 4104 in Step S4104 when it is free because there exists no free physical page. The process carried out in Step S4104 will be detailed later. Then, the process returns to Step 41031. When the local memory free physical page list 45 is not free in Step 41031, the firmware program 41 selects one free page (physical page) of the local memory 100 out of them in Step 41032 and deletes the selected page out of the local memory free physical page list 45 in Step 41033. Then, the firmware program 41 returns the selected page number (physical page number) to the caller.

When a free physical page is found in the local memory 100 from the above-mentioned process, the physical page is assured to allocate to the control data storing area 43.

Figure 12:
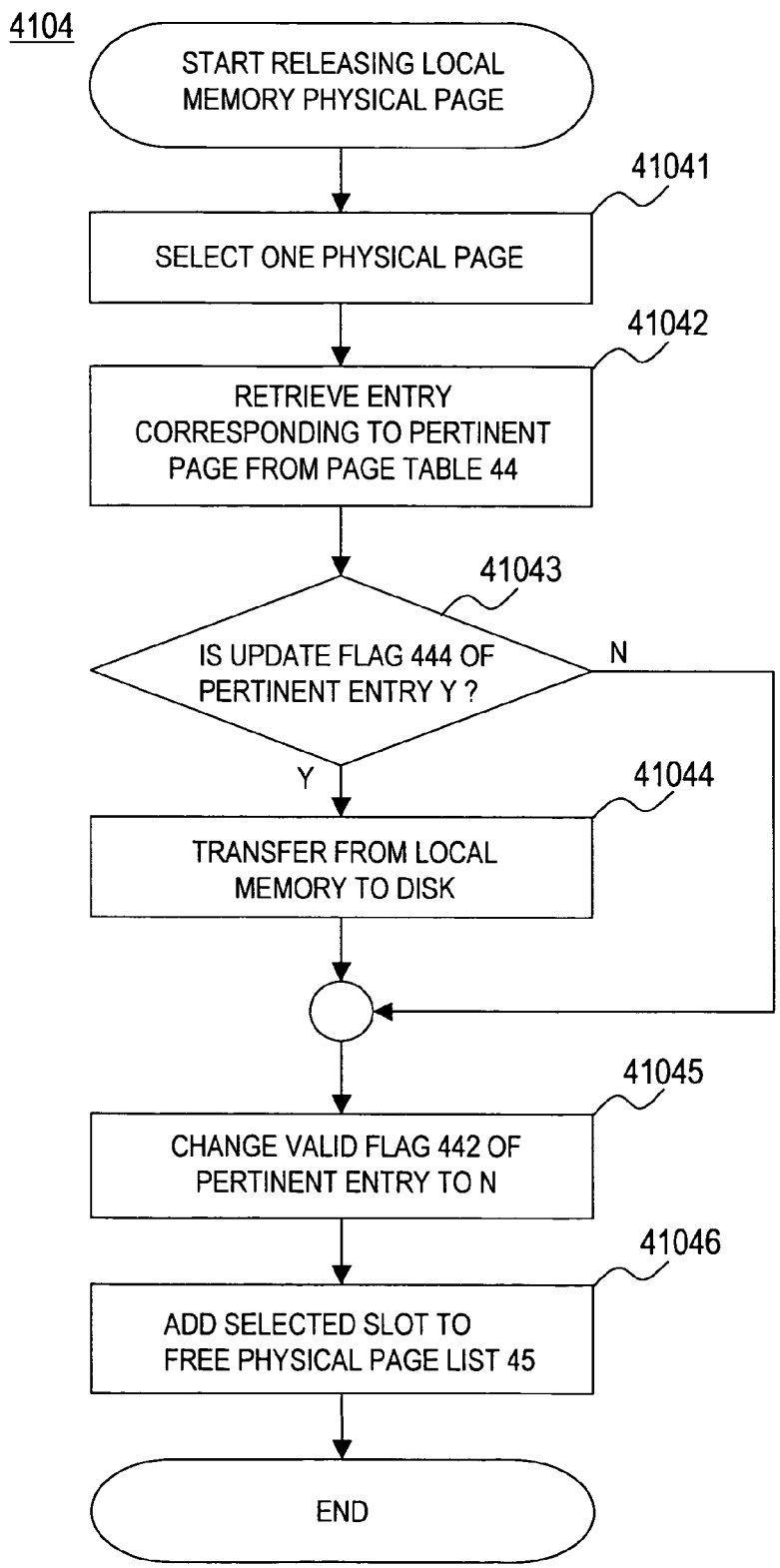
FIG. 12 is a flowchart showing one exemplary process carried out in local memory physical page releasing function of the firmware program according to the first embodiment of this invention.

FIG. 12 is a flowchart of the local memory physical page releasing function 4104 executed in Step S4104 of FIG. 11. According to this function, a physical page in use is released among areas allocated to the control data storing area 43 of the local memory 100 to be able to store different control data.

The firmware program 41 selects one physical page at first in Step 41041. Then, the firmware program 41 retrieves the page table 44 to retrieve a virtual page using the physical page, i.e., to retrieve an entry whose physical page number 443 coincides with the physical page in Step 41042. Next, the firmware program 41 checks the update flag 444 of the entry in Step 41043. When the update flag is N, the same data always exists in the control data storing area 62 of the disk array 2, so that the firmware program 41 may discard the data. Then, the firmware program 41 sets the valid flag 442 of the entry at N in Step 41045 and adds the number of the physical page to the local memory free physical page list 45 in Step 41046. Then, the firmware program 41 returns the process the caller.

When the update flag 444 is Y in Step 41043 on the other hand, the control data is updated on the local memory 100, so that the firmware program 41 writes back the physical page to a block corresponding to a virtual page number of the control data storing area 62 on the disk array 2 in Step 41044. Then, the firmware program 41 carries out the process on and after Step 41045 described above.

Thus the virtualization of the control memory may be realized by taking out the data to be referenced by the storage control program 42 to the local memory 100 and by writing back the data not referenced to the control data storing area 62 on the disk array 2.

An access to the virtual control memory space may be made as follows. All control data is stored in the control data storing area 62 of the disk array 2 in advance. When the storage control program 42 accesses to the control data storing area 43, the firmware program 41 reads object control data from the control data storing area 62 of the disk array 2 to the control data storing area 43 on the local memory 100. Then, the firmware program 41 gives the control data specified by the virtual address to the storage control program 42.

The firmware program 41 hands over the control data specified by the virtual address to the storage control program 42 by converting the virtual page number to make a reference to the page table 44 and by reading it from the control data storing area 43 of the local memory 100 or the control data storing area 62 of the disk array 2 corresponding to the physical page number 443.

Thus, the local memory 100 having a small capacity may handle a large amount of control data by adopting the virtual control memory space of this invention. Meanwhile, it is possible to readily use the control memory virtualization function of this invention even for a control program having many functions because there seems to be the control memory having the large virtual addresses to be accessed for the storage control program 42. As a result, it becomes possible to realize the low cost and high performance storage system 1.

Second Embodiment

Figure 13:
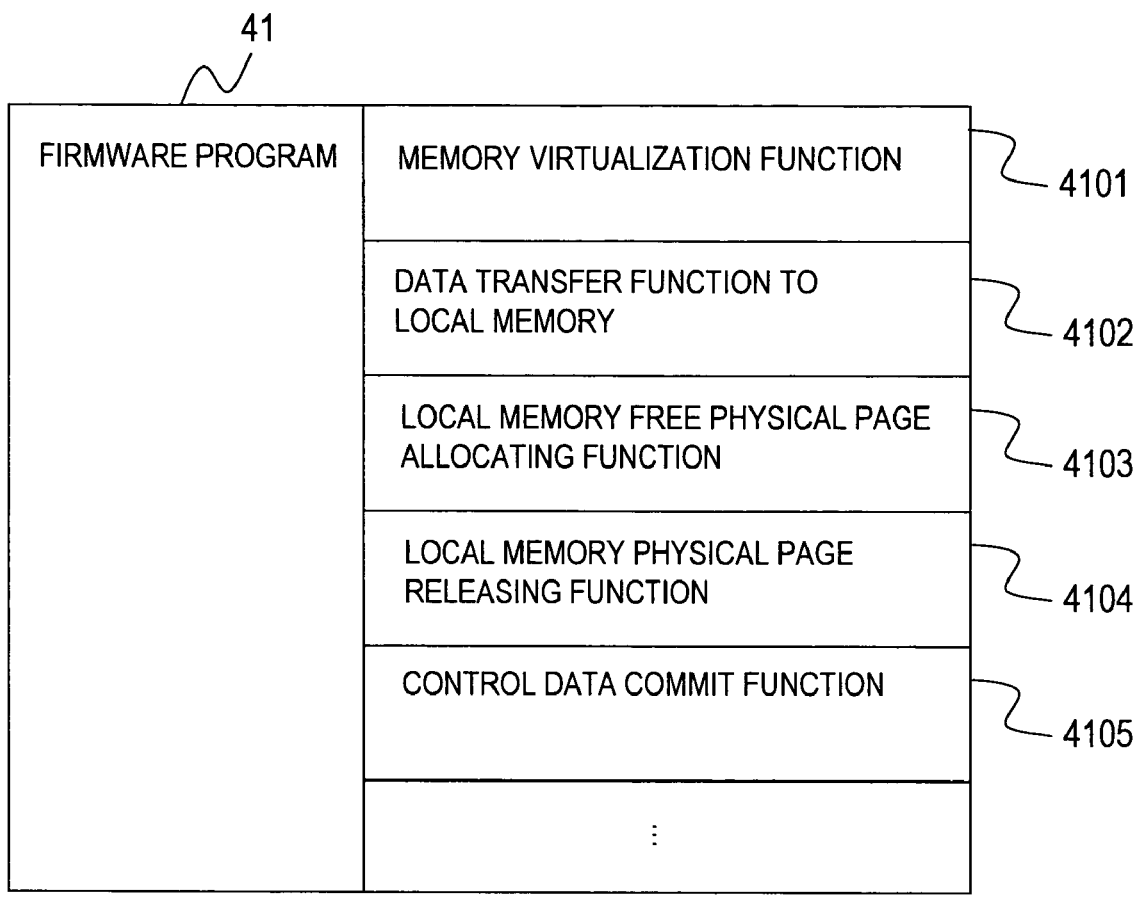
FIG. 13 is a block diagram showing functions of a firmware program according to a second embodiment of this invention.

FIG. 13 illustrates a second embodiment, in which a control data commit function 4105 for writing back all of the control data updated by the control data storing area 43 on the local memory 100 to the control data storing area 62 on the disk array 2 is provided to the firmware program 41 of the first embodiment. The configuration of the second embodiment other than that is the same with that of the first embodiment.

FIG. 13 shows the functions of the firmware program 41 in the second embodiment that is characterized in that the control data commit function 4105 for writing back all control data on the local memory 100 to the control data storing area 62 on the disk array 2 is added to the firmware program 41 of the first embodiment shown in FIG. 3.

It becomes possible to prevent the control data from being lost even when a failure occurs in the local memory 100 and the CPU 104 and to improve the reliability of the storage system 1 by writing back all control data read out of the control data storing area 43 of the local memory 100 to the control data storing area 62 of the disk array 2.

Figure 14:
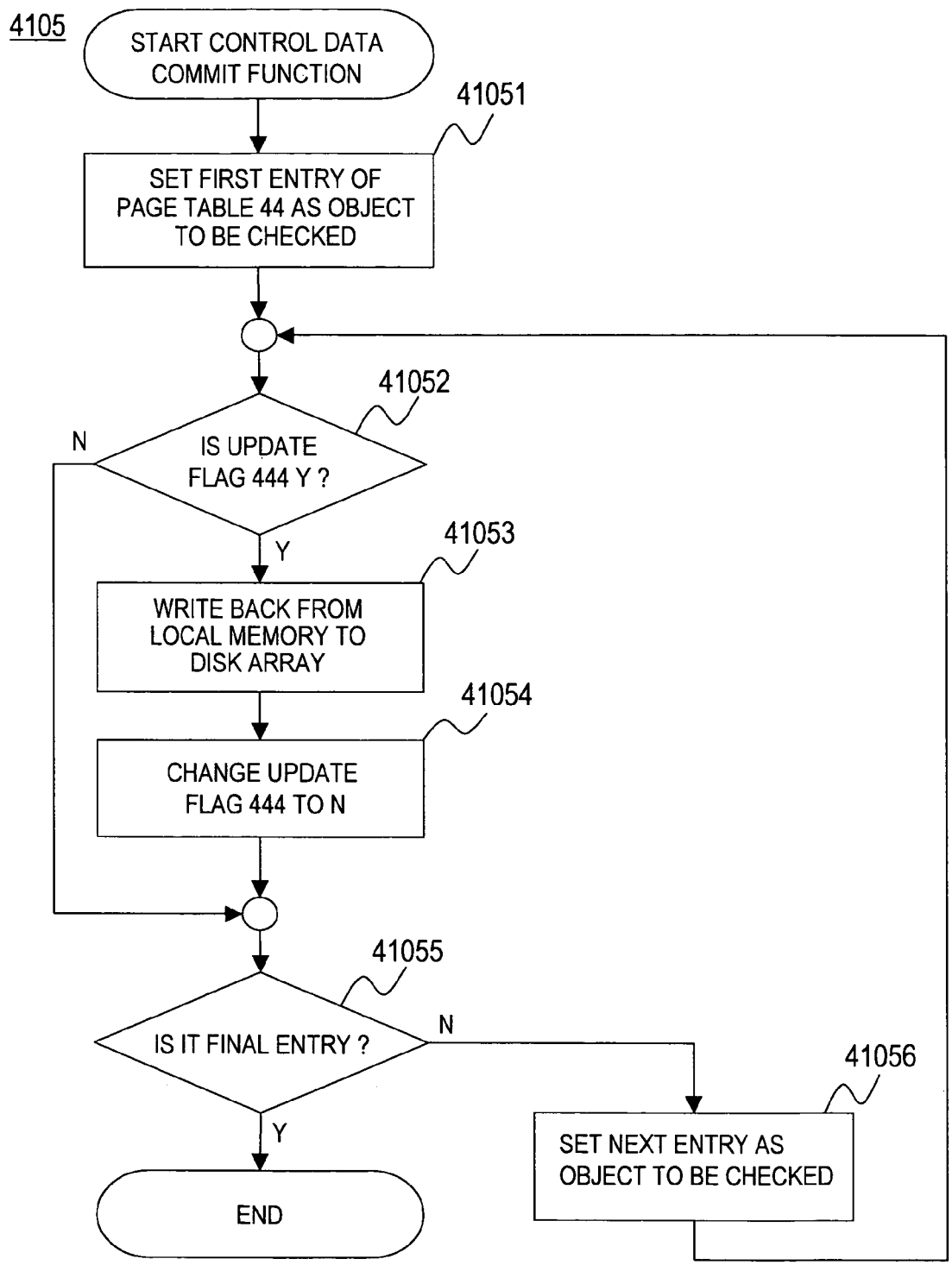
FIG. 14 is a flowchart showing one exemplary process carried out in a control data commit function of the firmware program according to the second embodiment of this invention.

FIG. 14 is a flowchart of the control data commit function 4105 executed by the firmware program 41. It should be noted that this flowchart may be executed at a predetermined period.

First, the firmware program 41 selects the first entry in the page table 44 in Step 41051 to check the update flag 444 of the entry in Step 41052. When the update flag is Y, a virtual page corresponding to the entry is updated on the local memory 100, so that the firmware program 41 transfers the data from a physical page corresponding to the physical page number 443 to a block corresponding to the virtual page in the control data storing area 62 on the disk array 2 in Step 41053. Then, the firmware program 41 changes the update flag 444 of the entry to N in Step 41054.

On the other hand, when the update flag 444 is N in Step 41052 or after writing back in Steps 41053 and 41054 in Step 41055, the firmware program 41 judges whether or not the entry is a final entry in the page table 44. When it is not the final entry, the firmware program 41 repeats the process on and after Step 41052 by setting a next entry as an object in Step 41056.

The above-mentioned process allows all of the control data updated in the control data storing area 43 on the local memory 100 to be written back to the control data storing area 62 on the disk array 2.

Third Embodiment

Figure 15:
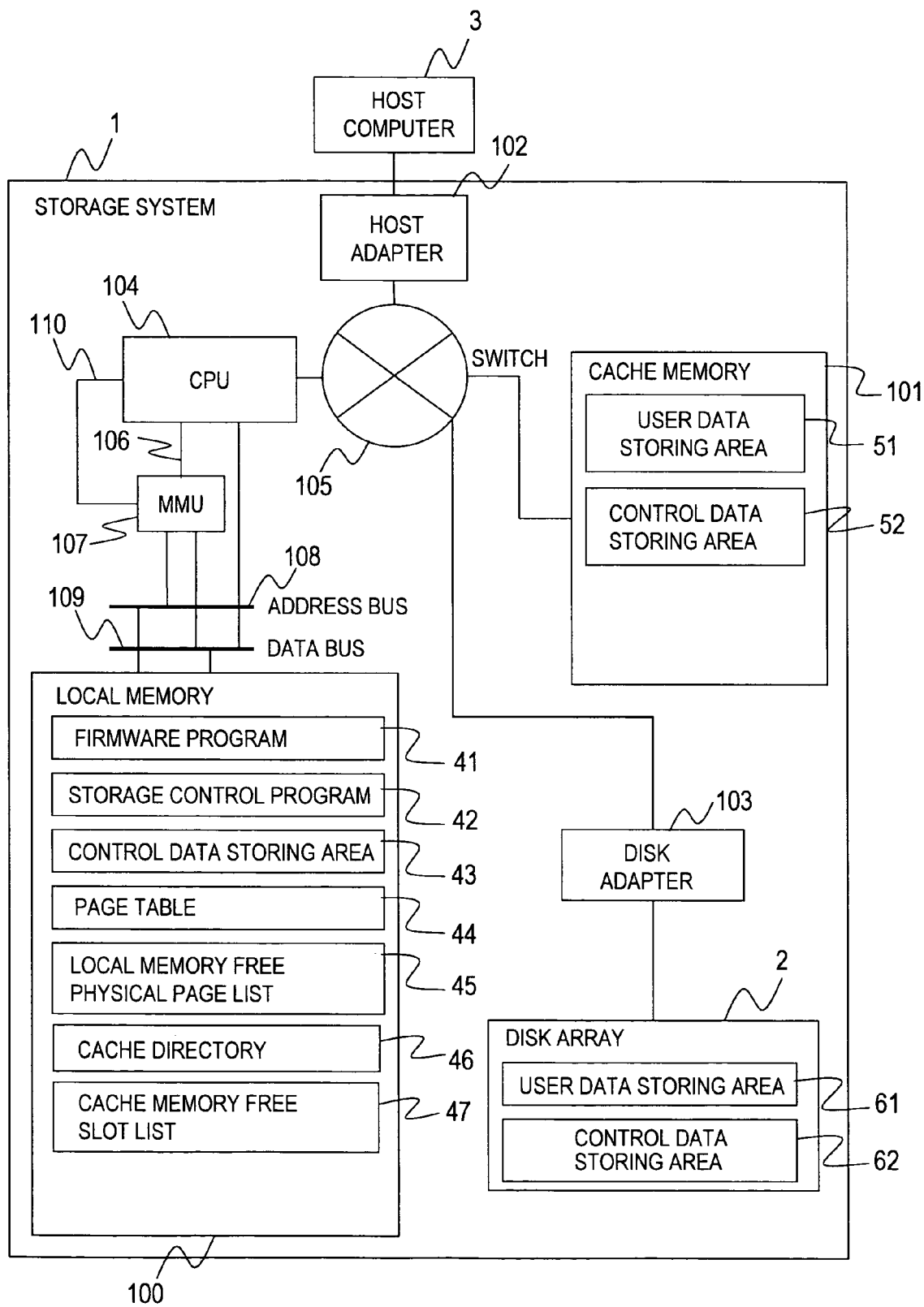
FIG. 15 is a block diagram showing a configuration of a storage system according to a third embodiment of this invention.

FIG. 15 illustrates a third embodiment, in which a control data storing area 52 is provided also in the cache memory 101 of the first embodiment shown in FIG. 1 and a cache directory 46 and a cache memory free slot list 47 are added on the local memory 100 of the first embodiment shown in FIG. 1. A configuration thereof other than that is the same with that of the first embodiment.

The storage control program 42 can make a reference to control data more quickly by the cache memory 101 in addition to the local memory 100 by providing the area for storing the control data also on the cache memory 101. A difference from the storage system of the first embodiment in a case where the control data is stored also on the cache memory 101 will be explained below.

FIG. 15 shows the configuration of the storage system of the third embodiment. The storage system of the third embodiment is characterized in that the control data storing area 52 for storing the control data is set on the cache memory 101 and the cache directory 46 and the cache memory free slot list 47 are provided on the local memory 100. Each of those will be outlined below.

The control data storing area 52 on the cache memory 101 is a physical memory space for storing part of the control data.

The cache directory 46 is used to manage the mapping between the virtual control memory space and the control data on the cache memory 101 for the control data storing area 52 on the cache memory 101.

The cache memory free slot list 47 is used to manage a space where no control data is placed for the control data storing area 52 on the cache memory 101. It should be noted that a case is shown where the memory space of the cache memory 101 is managed by a slot of predetermined data length.

Figure 16:
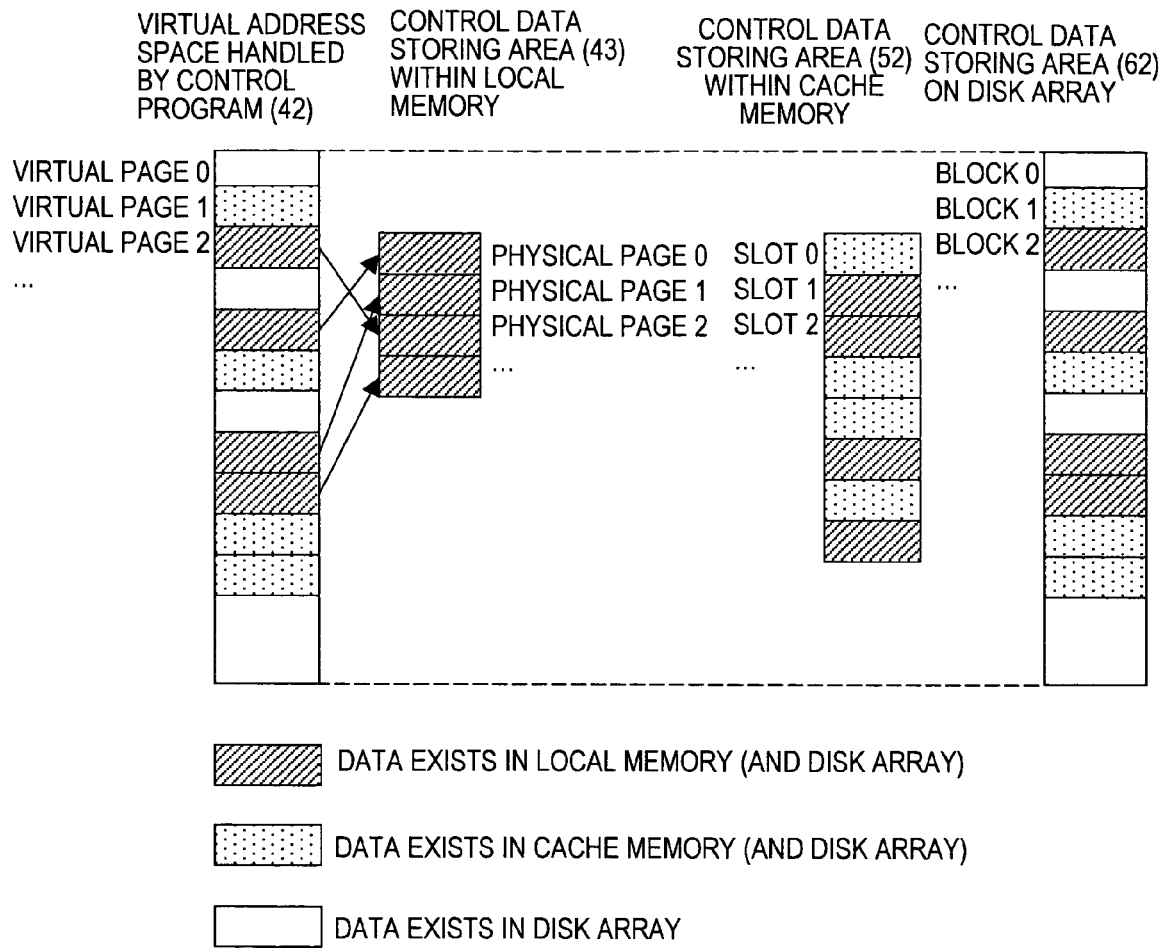
FIG. 16 is a map showing an address space of control data according to the third embodiment of this invention.

FIG. 16 shows the mapping of virtualization of control data realized in this invention. In addition to the configuration of the first embodiment shown in FIG. 2, the control data storing area 52 on the cache memory 101 is provided between the control data storing area 43 on the local memory 100 and the control data storing area 62 on the disk array 2 to use as a data storage place between the control data storing area 62 on the disk array 2 and the local memory 100. The firmware program 41 transfers the control data appropriately among the three kinds of control data storing areas.

Figure 17:
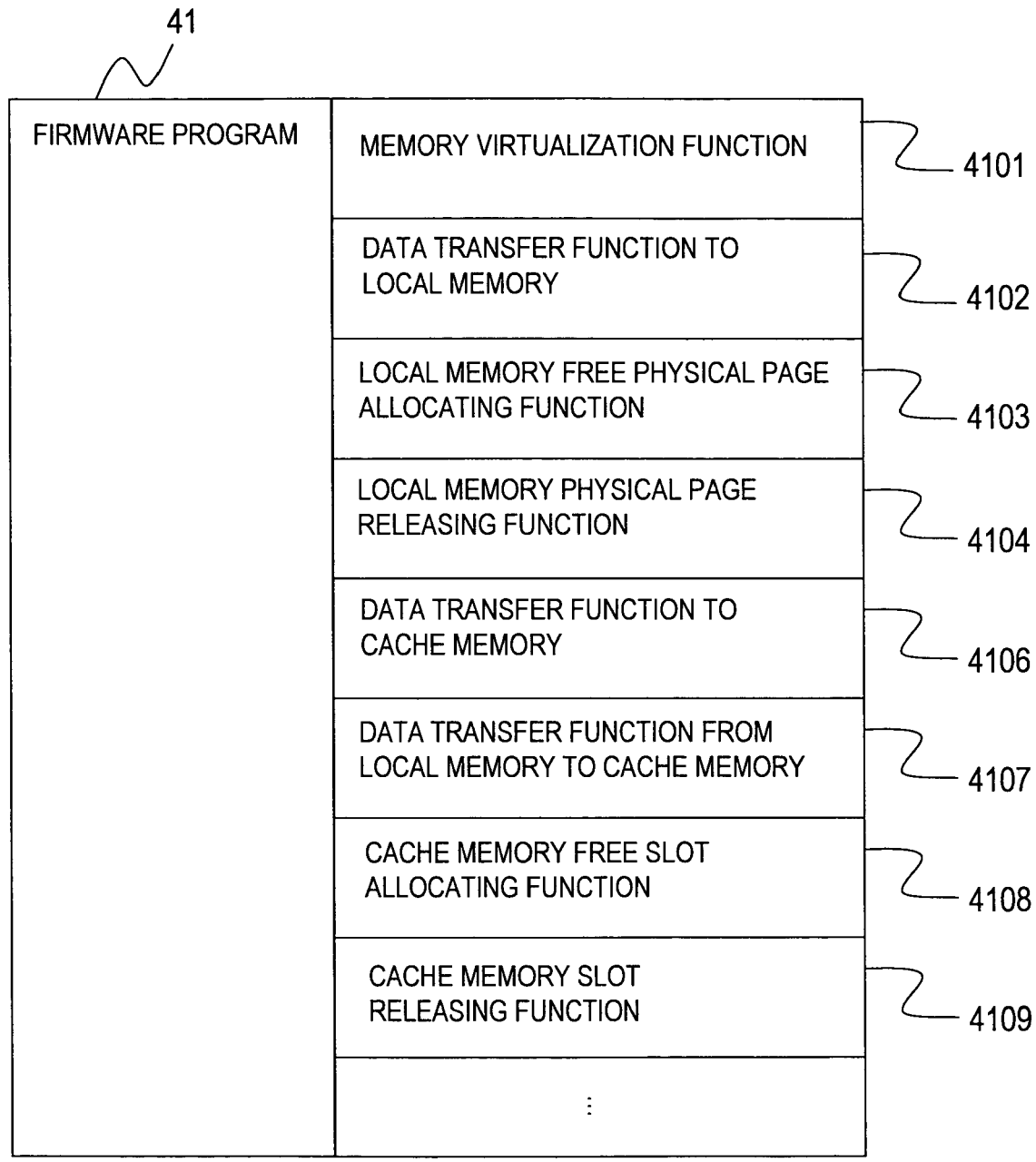
FIG. 17 is a block diagram showing functions of a firmware program according to the third embodiment of this invention.

FIG. 17 shows the functions of the firmware program 41 of the third embodiment. The firmware program 41 of the third embodiment is characterized in that in addition to the functions of the firmware program 41 of the first embodiment, the firmware program 41 has a data transfer function 4106 for transferring the control data from the cache memory 101 to the local memory 100, a data transfer function 4107 for transferring the control data from the local memory 100 to the cache memory 101, a cache memory free slot allocating function 4108 for allocating a free slot on the cache memory 101 and a cache memory slot releasing function 4109 for releasing the allocated slot.

The control data storing area 52 on the cache memory 101 is configured as shown in FIG. 18. Data 522 in the control data storing area 52 is divided into slots having a constant size and denoted sequentially by slot numbers similar to the control data storing area 62 within the disk array 2. An arbitrary block of the control data storing area 62 on the disk array 2 is stored in the data 522 corresponding to each slot number 521.

The cache directory 46 is configured as shown in FIG. 19. Each entry of the cache directory 46 corresponds to each virtual page. Therefore a table entry exists per virtual page number 461. Each entry has a valid flag 462 indicating whether or not the page exists on the cache memory 101, a slot number 463 indicating where the page exists in the cache slot when it exists, and an update flag 464 indicating whether or not the control data has been updated after being read out of the control data storing area 62 of the disk array 2.

The cache memory free slot list 47 is configured as shown in FIG. 20. The cache memory free slot list 47 records slot numbers in which valid data is not stored among the respective slots of the control data storing area 52 on the cache memory 101.

The difference between the control memory virtualization function of the third embodiment and the first embodiment will be explained below by using a flowchart.

Figure 21:
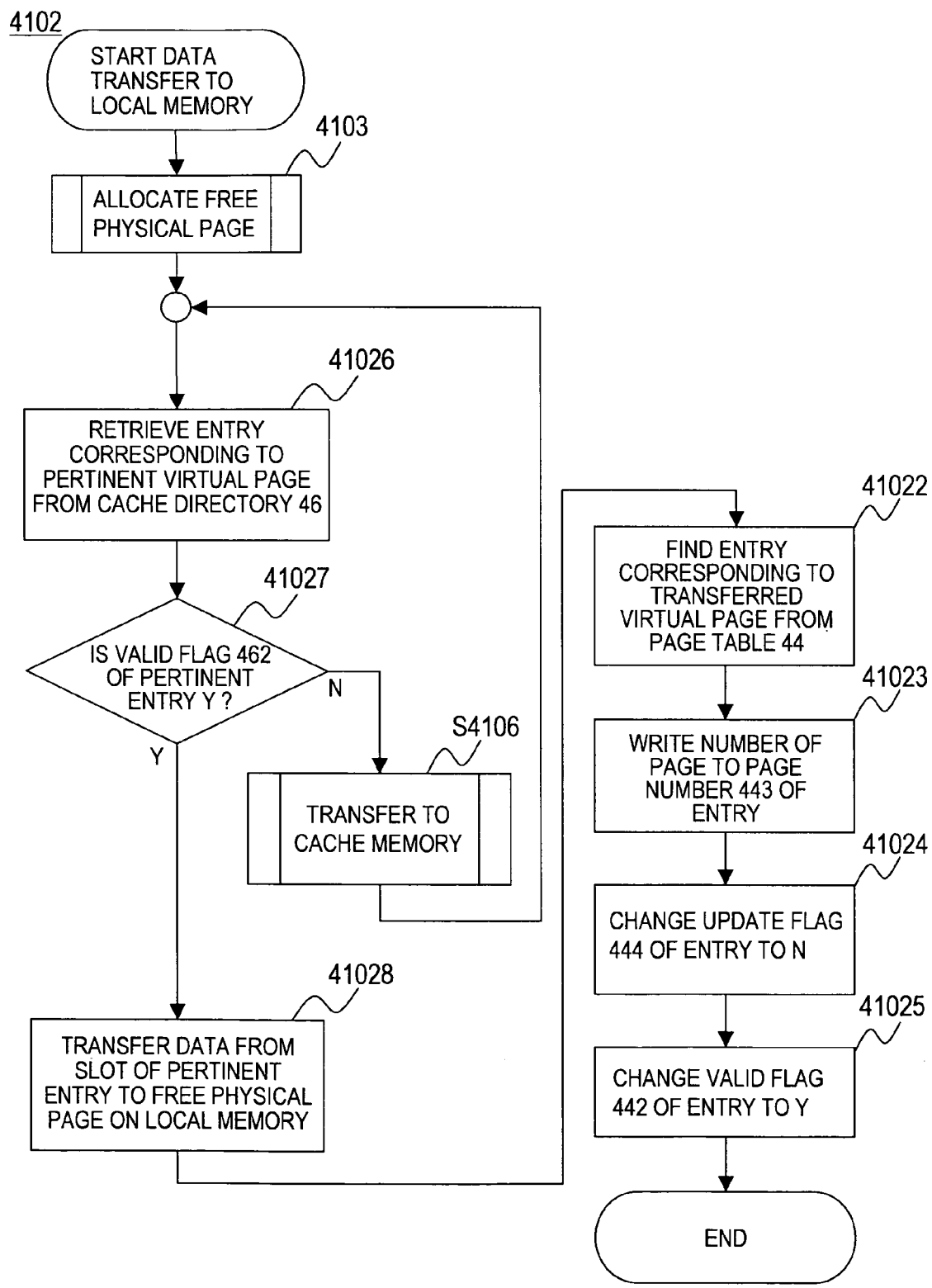
FIG. 21 is a flowchart showing one exemplary process in a data transfer function to the local memory of the firmware program according to the third embodiment of this invention.

FIG. 21 is a flowchart of the function 4102 for transferring data to the local memory in this embodiment. The function 4102 of this embodiment is characterized in that processes in Steps 41026 through 41028 in the flowchart are carried out instead of Step 40121 in the first embodiment shown in FIG. 10.

To be specific, the firmware program 41 retrieves an entry corresponding to the virtual page out of the cache directory 46 at first in Step 41026. Then the firmware program 41 judges the valid flag 462 of the entry in Step 41027. When a value of the valid flag 462 is N, the control data does not exist in the control data storing area 52 of the cache memory 101, so that the firmware program 41 calls out the data transfer function 4106 to the cache memory at first in Step S4106 and returns again to Step 41026. The transfer function 4106 to the cache memory will be detailed later.

When the valid flag 462 is Y in Step 41027 on the other hand, an object control data exists in the control data storing area 52 of the cache memory 101, so that the firmware program 41 transfers data from the slot described in the slot number 463 of the entry to a physical page (local memory 100) allocated by the free physical page allocating function 4103 in Step 41028. The page table 44 is updated in Step 41022 through 41025 in the same manner with the first embodiment shown in FIG. 10.

Figure 22:
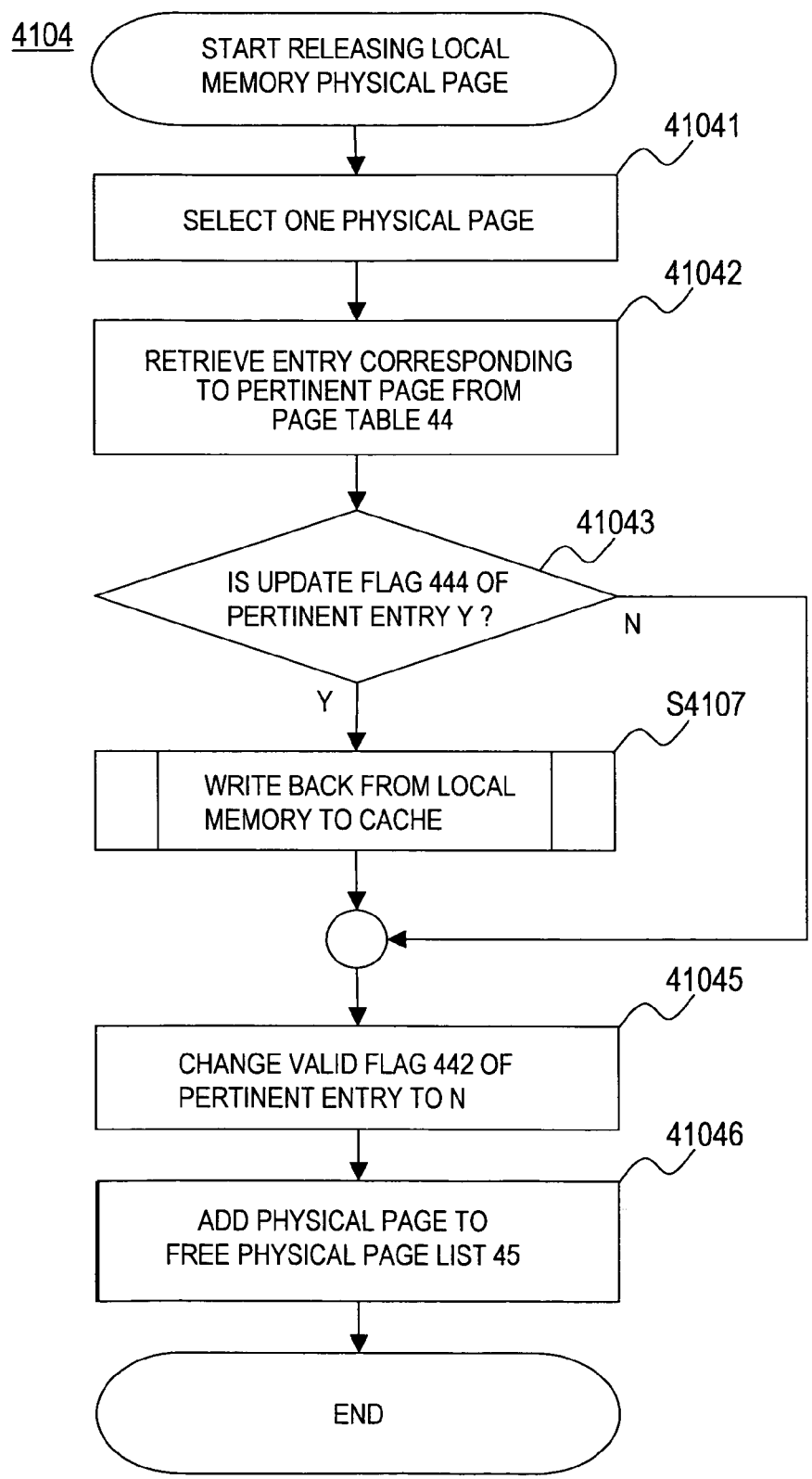
FIG. 22 is a flowchart showing one exemplary process carried out in a local memory physical page releasing function of the firmware program according to the third embodiment of this invention.

FIG. 22 is a flowchart of the local memory physical page releasing function 4104 in the third embodiment. The function 4104 of this embodiment is characterized in that the data transferring function 4107 from the local memory to the cache memory is called out instead of Step 41044 of the first embodiment shown in FIG. 12. The other processes are the same with those in the first embodiment in FIG. 12. The data transfer function 4107 from the local memory to the cache memory will be detailed later.

Figure 23:
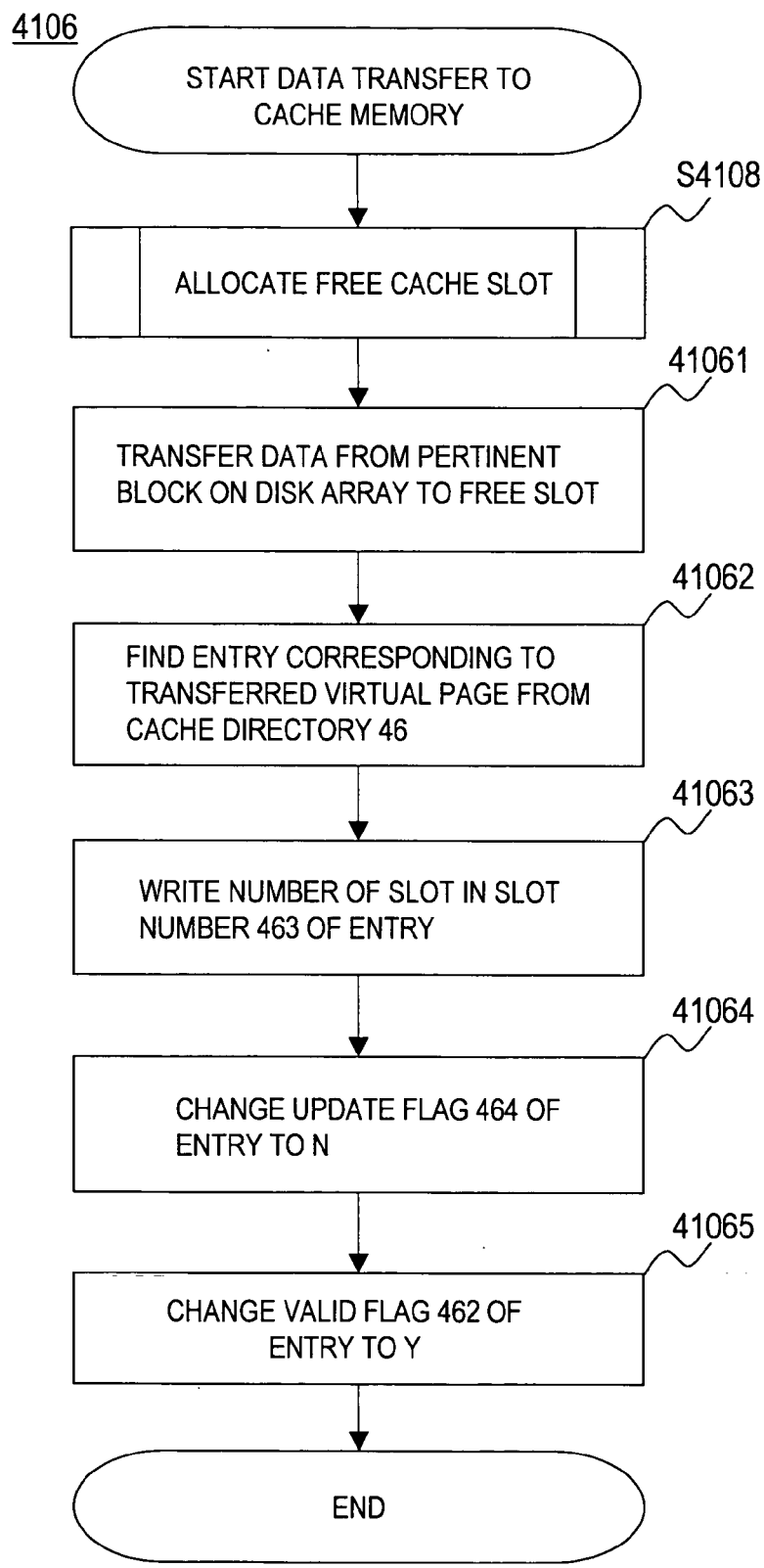
FIG. 23 is a flowchart showing one exemplary process carried out in a data transfer function to the cache memory of the firmware program according to the third embodiment of this invention.

FIG. 23 is a flowchart of the function 4106 for transferring data to the cache memory of the third embodiment. This function transfers control data from the control data storing area 62 on the disk array 2 to the control data storing area 52 on the cache memory 101.

In FIG. 23, the firmware program 41 calls out the cache memory free slot allocating function 4108 at first in Step S4108. After that, the firmware program 41 transfers control data from a block on the disk array 2 corresponding to a virtual page to a free cache slot in Step 41061. Then, the firmware program 41 finds an entry corresponding to the transferred virtual page in Step 41062. Next, the firmware program 41 writes the number of the slot to a slot number 463 of the entry in Step 41063. Then, the firmware program 41 changes the update flag 464 of the entry to N in Step 41064. Finally, the firmware program 41 changes the valid flag 462 of the entry to Y in Step 41065 and returns the control to the caller. The cache memory free slot allocating function 4108 will be detailed later.

The control data of the control data storing area 62 of the disk array 2 is transferred to the control data storing area 52 of the cache memory 101 and the cache directory 46 is updated by the processes described above.

Figure 24:
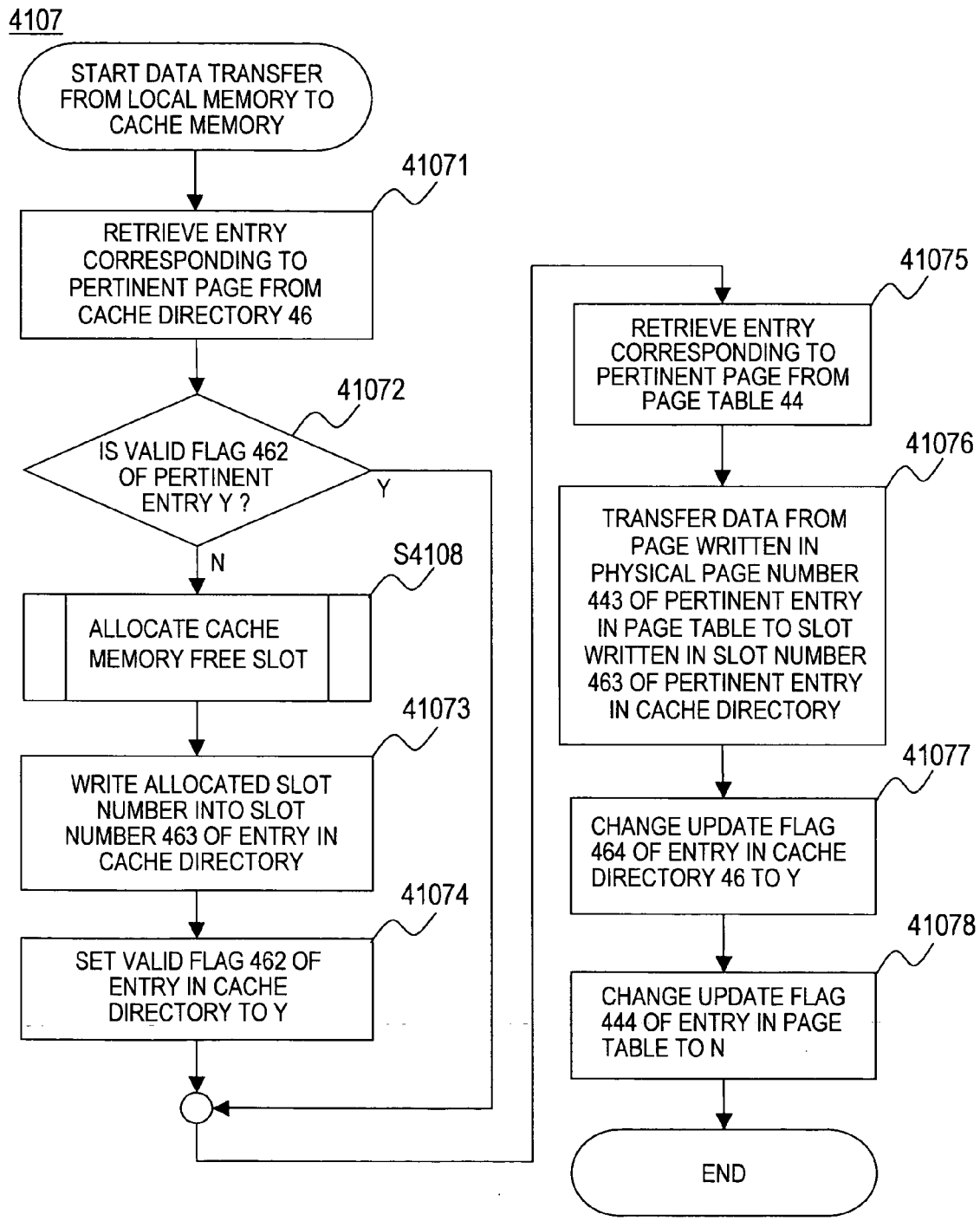
FIG. 24 is a flowchart showing one exemplary process carried out in a function for transferring data from the local memory to the cache memory of the firmware program according to the third embodiment of this invention.

FIG. 24 is a flowchart of the function 4107 for transferring data from the local memory to the cache memory of the third embodiment. According to this function, the control data updated in the control data storing area 43 on the local memory 100 is written back to the control data storing area 52 on the cache memory 101. In FIG. 24, the firmware program 41 retrieves an entry corresponding to the virtual page from the cache directory 46 at first in Step 41071. Next, the firmware program 41 checks the valid flag 462 of the entry in Step 41072. When the value of the valid flag 462 is N, there exists no cache slot for storing the data, so that the firmware program 41 calls out the cache memory free slot allocating function 4108 at first in Step S4108. It should be noted that the cache memory free slot allocating function 4108 will be detailed later. Next, the firmware program 41 writes the allocated slot number into the slot number 463 of the entry in the cache directory in Step 41073. Then, the firmware program 41 changes the valid flag 462 of the entry to Y in Step 41074.

The destination of the control data is allocated on the cache memory 101 by the process described above. When the valid flag 462 of the entry is Y in Step 41072 on the other hand, there already exists a cache slot for storing the data, so that the processes to Step 41074 is eliminated. After that, the firmware program 41 retrieves an entry corresponding to the page from the page table 44 at first in Step 41075. Next, the firmware program 41 transfers the control data from the page written in the physical page number 443 of the entry to the slot written in the slot number 463 of the entry in the cache directory 46 in Step 41076.

Next, the firmware program 41 sets the update flag 464 of the entry in the cache directory 46 at Y in Step 41077. Finally, the firmware program 41 sets the update flag 444 of the entry in the page table 44 at N in Step 41078.

Figure 25:
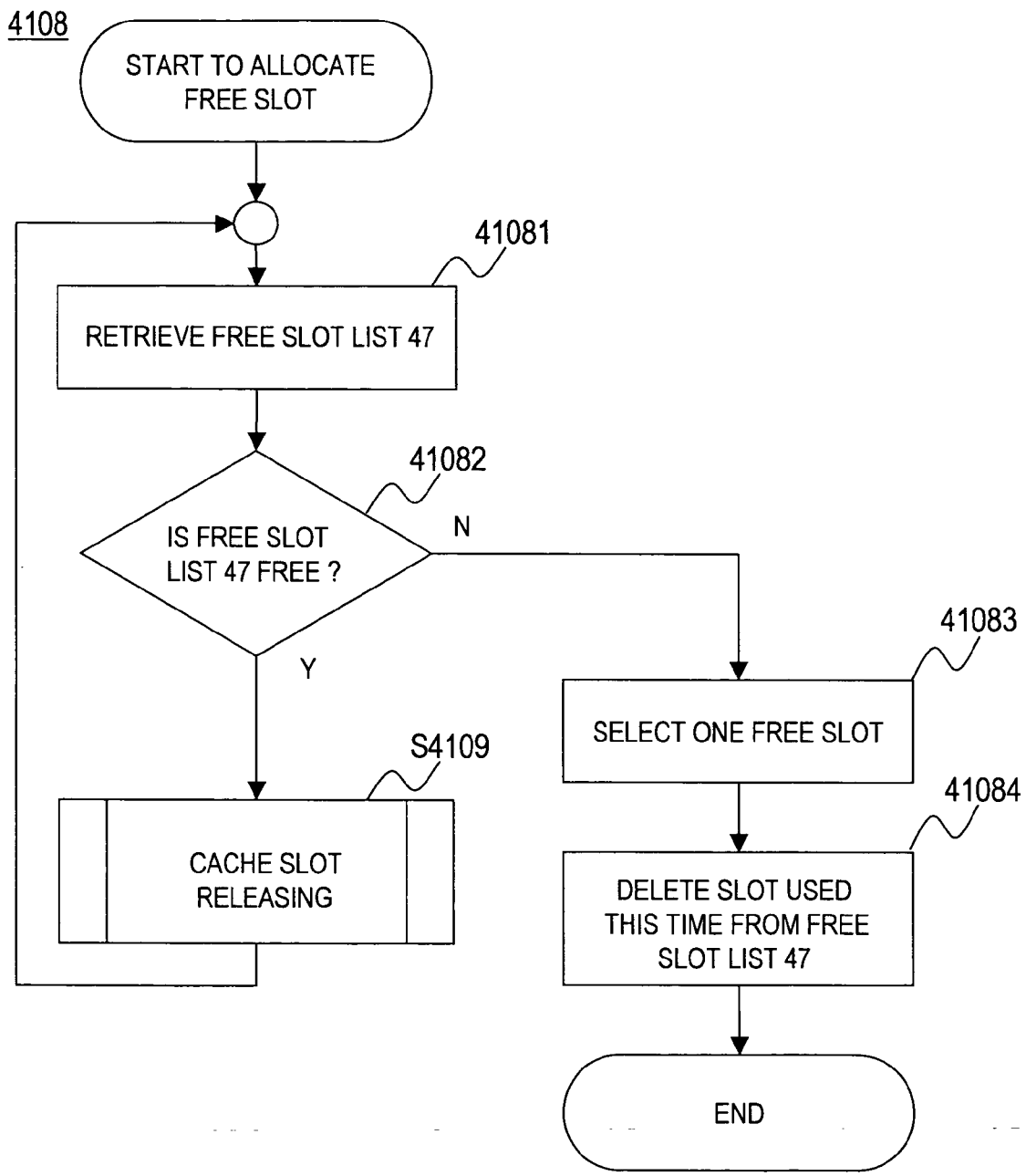
FIG. 25 is a flowchart showing one exemplary process carried out in a cache memory free slot allocating function according to the third embodiment of this invention.

FIG. 25 is a flowchart of the cache memory free slot allocating function 4108 in this embodiment. According to this function, a free slot on the cache memory 101 is retrieved, and, when there exists no free slot, a free slot on the cache memory 101 is made by expelling part of the control data to the control data storing area 62 of the disk array 2.

In FIG. 25, the firmware program 41 retrieves the cache memory free slot list 47 at first in Step 41081. Next, the firmware program 41 judges whether or not the cache memory free slot list 47 is free in Step 41082. When it is free, all of the cache slots are in use, so that the firmware program 41 calls out a cache memory slot releasing function 4109 to generate a free cache slot. Then, the firmware program 41 returns to process in Step 41081.

When the cache memory free slot list 47 is not free in Step 41082 on the other hand, the firmware program 41 selects one free slot among them in Step 41083 and deletes the selected slot from the cache memory free slot list 47 in Step 41084. Then, the firmware program 41 returns the control to the caller. The cache memory slot releasing function 4109 will be detailed later.

The free slot for allocating to the control data storing area 52 on the cache memory 101 may be thus assured by the process described above.

Figure 26:
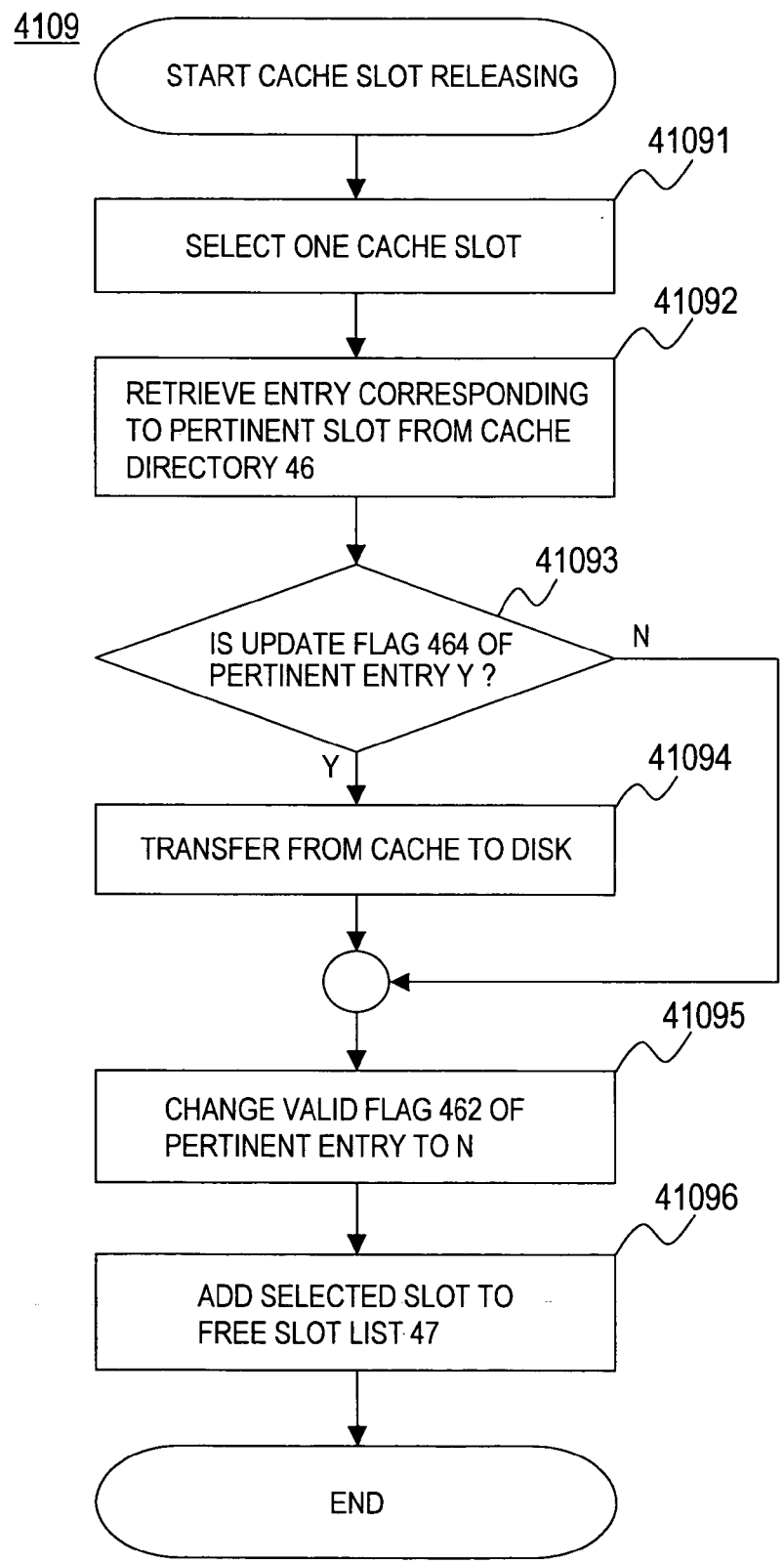
FIG. 26 is a flowchart showing one exemplary process carried out in a cache memory slot releasing function of the firmware program according to the third embodiment of this invention.

FIG. 26 is a flowchart of the cache memory slot releasing function 4109 of the third embodiment. According to this function, the control data stored in the control data storing area 52 on the cache memory 101 is written back to the control data storing area 62 on the disk array 2 as necessary to generate a free cache slot for storing the control data on the cache memory 101 in the third embodiment.

In FIG. 26, the firmware program 41 selects one cache slot at first in Step 41091. Next, the firmware program 41 retrieves the cache directory 46 to retrieve an entry corresponding to the slot, i.e., an entry whose slot number is written in the slot number 463 in Step 41092. Then, the firmware program 41 checks the update flag 464 of the entry in Step 41093. When the value is Y, control data corresponding to the entry has been updated after being taken out of the disk array 2 and transferred to the control data storing area 43 on the local memory 100, so that the firmware program 41 transfers the control data from the slot to a slot of the control data storing area 62 on the disk array 2 corresponding to a virtual page utilizing the slot in Step 41094.

Then, the firmware program 41 sets the valid flag 462 of the entry at N in Step 41095. Finally, the firmware program 41 adds the slot to the cache memory free slot list 47 in Step 41096 and returns the control to the caller.

When the update flag 464 is N in Step 41093 described above on the other hand, the control data has not been updated after being taken out of the disk array 2, so that the firmware program 41 executes the processes on and after Step 41095 without writing back to the disk array 2.

The virtualization of the control memory may be realized when the cache memory 101 is provided with the control data storing area 52 by the processes described above. In other words, it becomes possible to read quickly from the control data storing area 52 on the cache memory 101 and to improve performance of the storage control program 42 when the control data is stored on the cache memory 101 whose access latency and data transfer rate are faster than the disk array 2, an access is requested from the storage control program 42, and there exists no object control data in the control data storing area 43 on the local memory 100. In particular, it becomes possible to increase a rate of control data quickly accessible from the storage control program 42 by providing the control data storing area 52 on the cache memory 101 whose capacity is far larger than that of the local memory 100.

Fourth Embodiment

Figure 27:
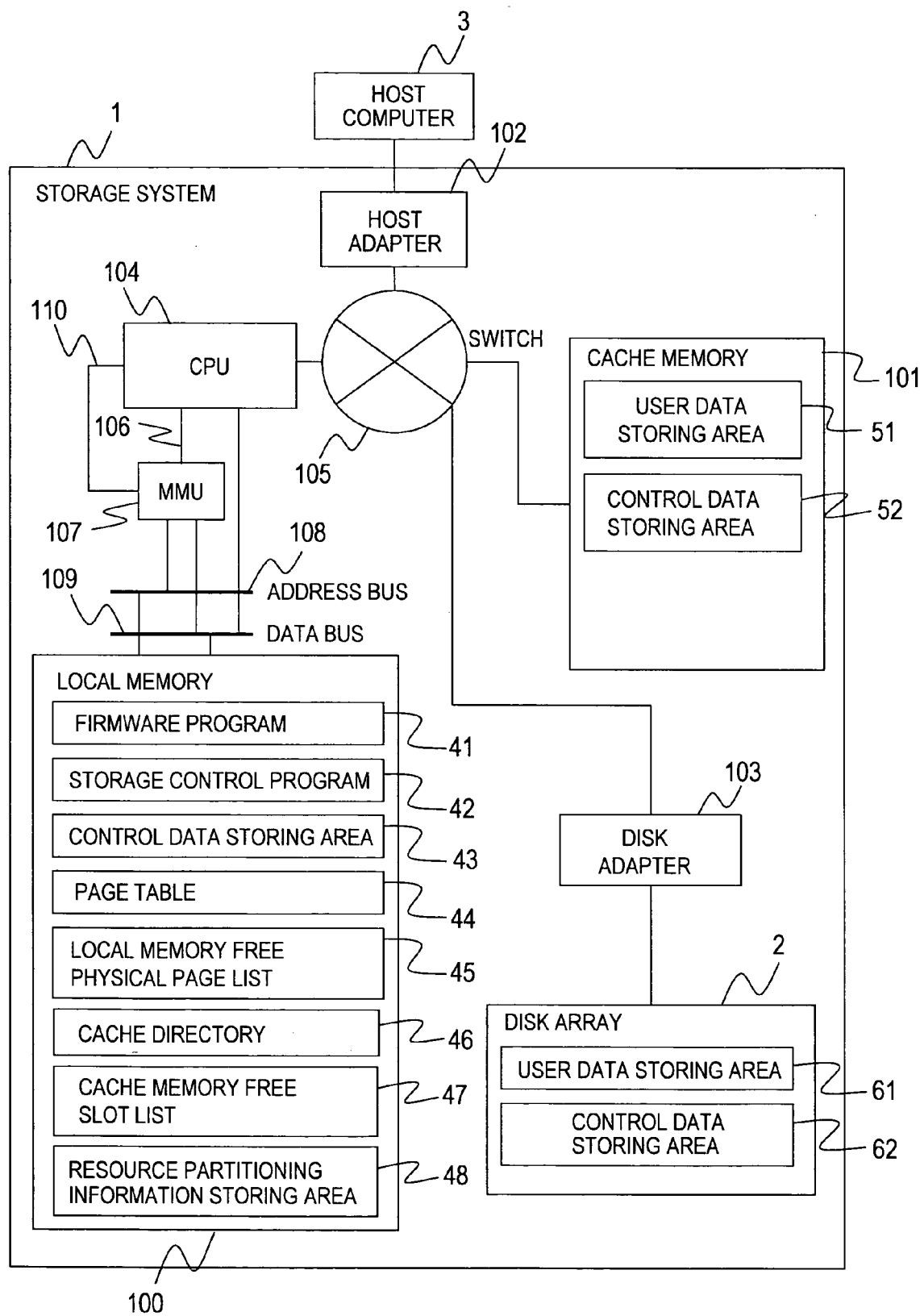
FIG. 27 is a block diagram showing a configuration of a storage system according to a fourth embodiment of this invention.

FIG. 27 illustrates a fourth embodiment, in which a cache memory allocating function 4110, a cache memory releasing function 4111, and a resource partitioning information storing area 48 for setting a rate of the user data storing area 51 to the control data storing area 52 in order to vary the size of the user data storing area 51 and the control data storing area 52 in the cache memory 101 provided to the configuration of the third embodiment shown in FIG. 15 and to be able to efficiently use the cache memory 101 whose capacity is limited. The configuration thereof other than that is the same with that of the third embodiment.

Figure 28:
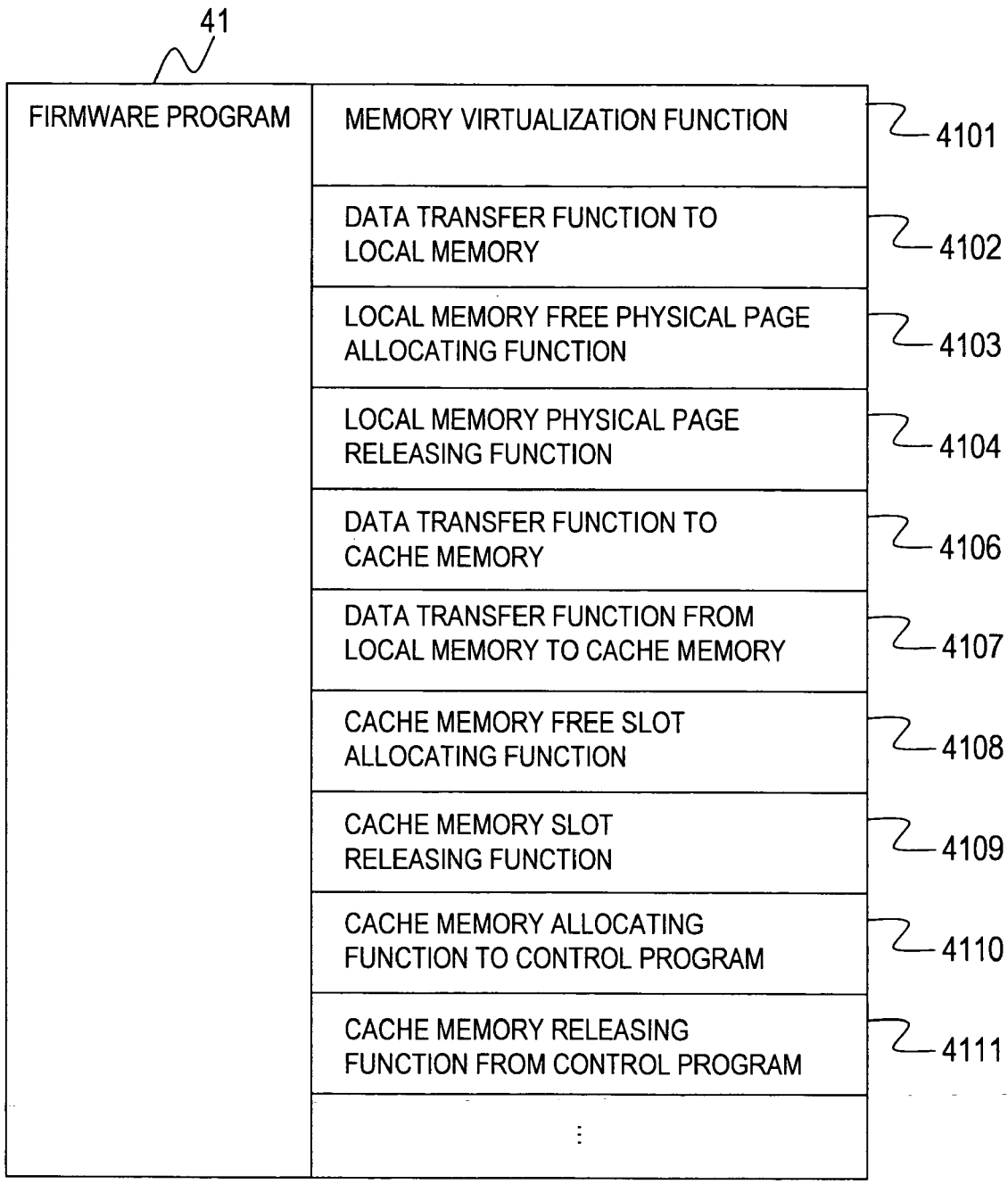
FIG. 28 is a block diagram showing functions of a firmware program according to the fourth embodiment of this invention.

FIG. 28 shows the functions of the firmware program 41 of the fourth embodiment. The firmware program 41 of the fourth embodiment is characterized in that the firmware program 41 has the function 4110 for allocating the cache memory to the storage control program 42 and the function 4111 for releasing the cache memory from the storage control program 42 in addition to the functions of the firmware program 41 of the third embodiment shown in FIG. 17.

Figure 29:
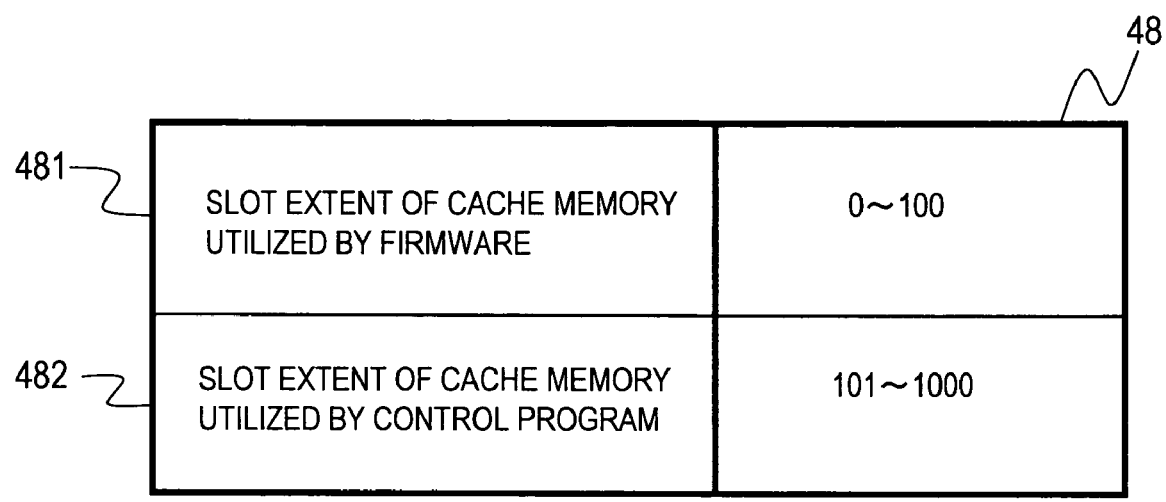
FIG. 29 is an explanatory table showing a configuration of a cache memory resource partitioning area according to the fourth embodiment of this invention.

The resource partitioning information storing area 48 in the fourth embodiment is configured as shown in FIG. 29. The resource partitioning information storing area 48 has a slot extent 481 for deciding an extent of slots of the cache memory 101 utilized by the firmware program 41 and a slot extent 482 for deciding an extent of slot of the cache memory 101 utilized by the storage control program 42.

Here, the extent of slots utilized by the firmware program 41 represents an extent of slots used in the control data storing area 52 and the extent of slots utilized in the storage control program 42 represents an extent of slots used in the user data storing area 51.

Figure 30:
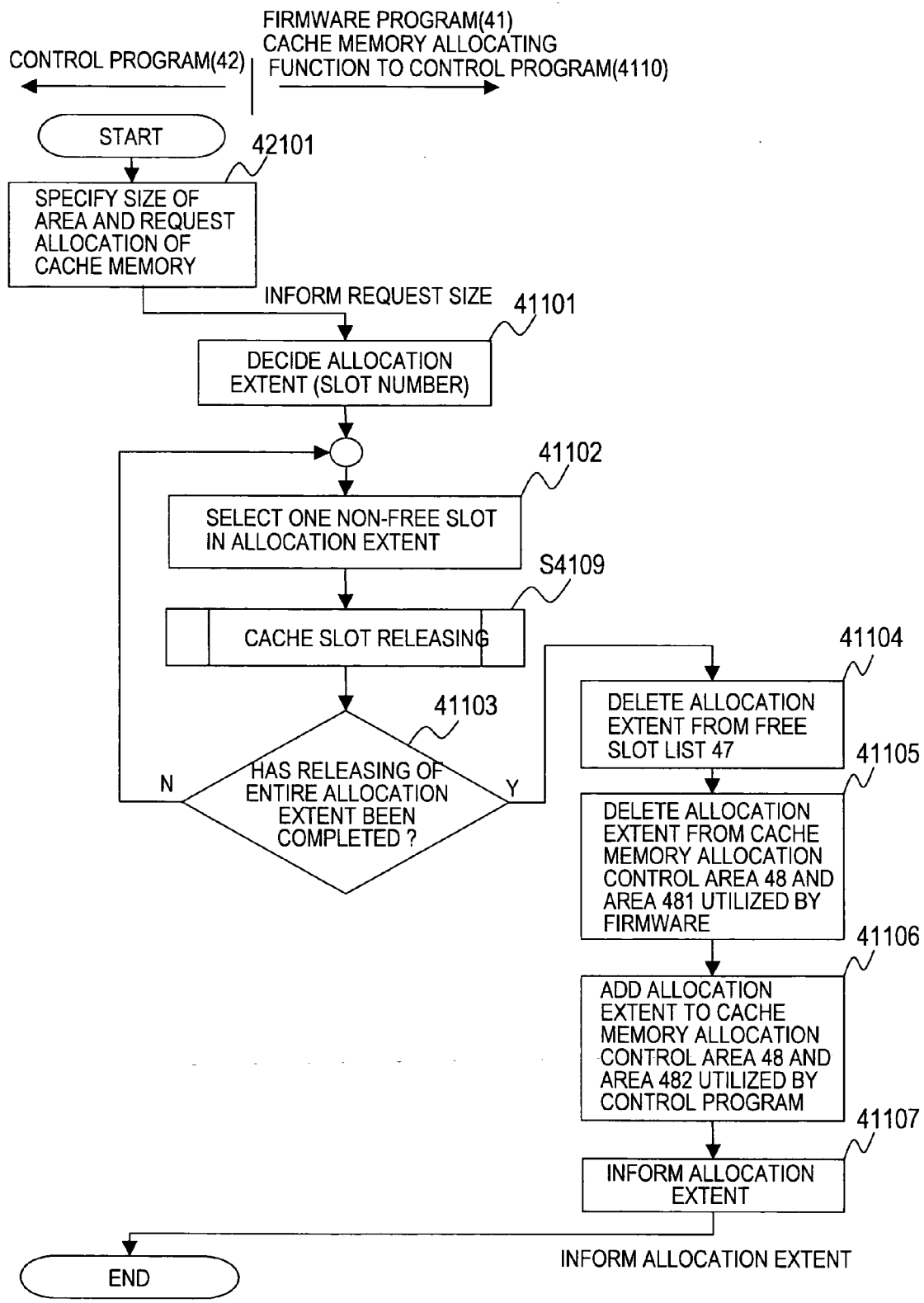
FIG. 30 is a flowchart showing one exemplary process carried out when the storage control program calls out a function for allocating the cache memory to the storage control program of the firmware program according to the fourth embodiment of this invention.

FIG. 30 is a flowchart when the storage control program 42 calls out the function 4110 for allocating cache memory to the storage control program 42 according to the fourth embodiment. First, the storage control program 42 specifies a size of the entire area of the cache memory 101 used by the user data storing area 51 and the control data storing area 52 and requests allocation of the cache memory 101 to the firmware program 41 in Step 42101.

The cache memory allocating function 4110 of the firmware program 41 that has received the request decides a slot allocation extent on the cache memory 101 from the size of the area requested by the storage control program 42 at first in Step 41101. Next, the firmware program 41 retrieves the cache directory 46 to select one non-free slot in the allocation extent in Step 41102 and calls out the cache memory slot releasing function 4109 in Step S4109. The firmware program 41 repeats those processes over the entire extent of the allocation extent in Step 41103.

When all of the cache slots in the allocation extent are released, the firmware program 41 deletes the slot allocation extent from the cache memory free slot list 47 in Step 41104. Then, the firmware program 41 makes a reference to the resource partitioning information storing area 48 to delete the allocation extent from the resource partitioning information storing area 481 of the cache memory utilized by the firmware program 41 in Step 41105. Then, the firmware program 41 adds the allocation extent to the resource partitioning information storing area 482 utilized by the storage control program 42 of the resource partitioning information storing area 48 in Step 41106 and finally informs the storage control program 42 of the actual allocation extent in Step 41107.

Figure 31:
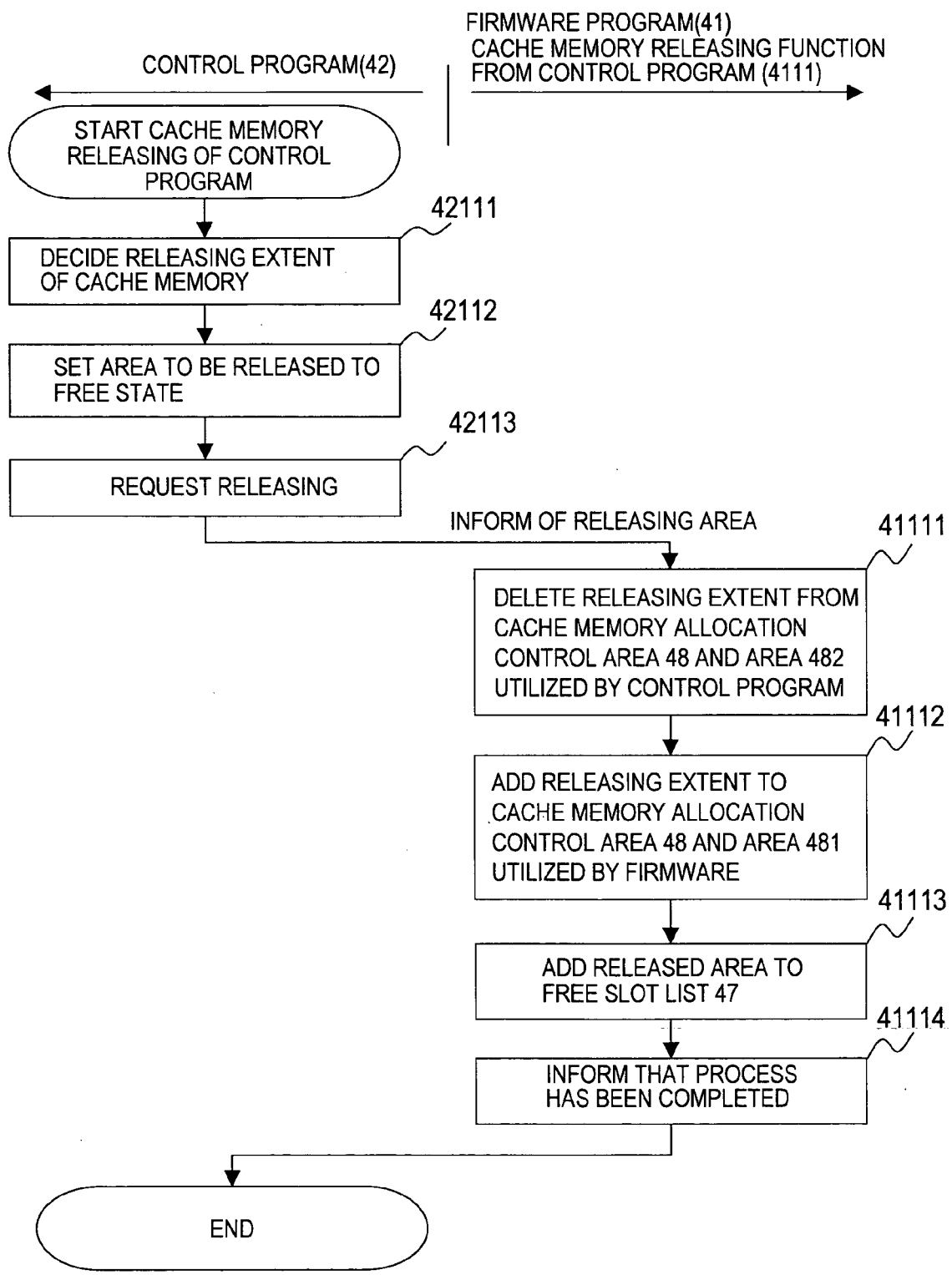
FIG. 31 is a flowchart showing one exemplary process carried out when the storage control program calls out a cache memory releasing function of the firmware program according to the fourth embodiment of this invention.

FIG. 31 is a flowchart when the storage control program 42 calls out the cache memory releasing function 4111 from the storage control program 42 in the fourth embodiment. First, the storage control program 42 decides a releasing extent of the cache memory in Step 42111 and sets an area to be released in a free state in Step 42112. In other words, the storage control program 42 sets the slot number to be released among the slot numbers 463 of the cache directory 46 to "NULL" for example to set the free state.

After that, the storage control program 42 requests a releasing to the firmware program 41 in Step 42113. The cache memory releasing function 4111 of the firmware program 41 that has received the request deletes the releasing extent from the slot extent 482 utilized by the storage control program 42 of the resource partitioning information storing area 48 in Step 41111. Next, the releasing extent is added to the slot extent 481 utilized by the firmware program 41 of the resource partitioning information storing area 48 in Step 42112. Next, the extent is added to the cache memory free slot list 47 in Step 41113. Finally, the firmware program 41 informs the storage control program 42 of that the process has been completed in Step 41114.

When the storage control program 42 requests allocation of the cache memory 101, the firmware program 41 allocates the extent of slot utilized by the firmware program 41 by making a reference to the resource partitioning information storing area 48 and then allocates the extent of slot utilized by the storage control program 42 through the processes described above. Accordingly, the capacity of the user data storing area 51 on the cache memory 101 and that of the control data storing area 52 may be arbitrarily changed by appropriately changing the extent 481 of the slot of the cache memory 101 utilized by the firmware program 41 of the resource partitioning information storing area 48. It should be noted that setting of the extent of each slot of the resource partitioning information storing area 48 may be carried out also using the firmware program 41.

Fifth Embodiment

Figure 32:
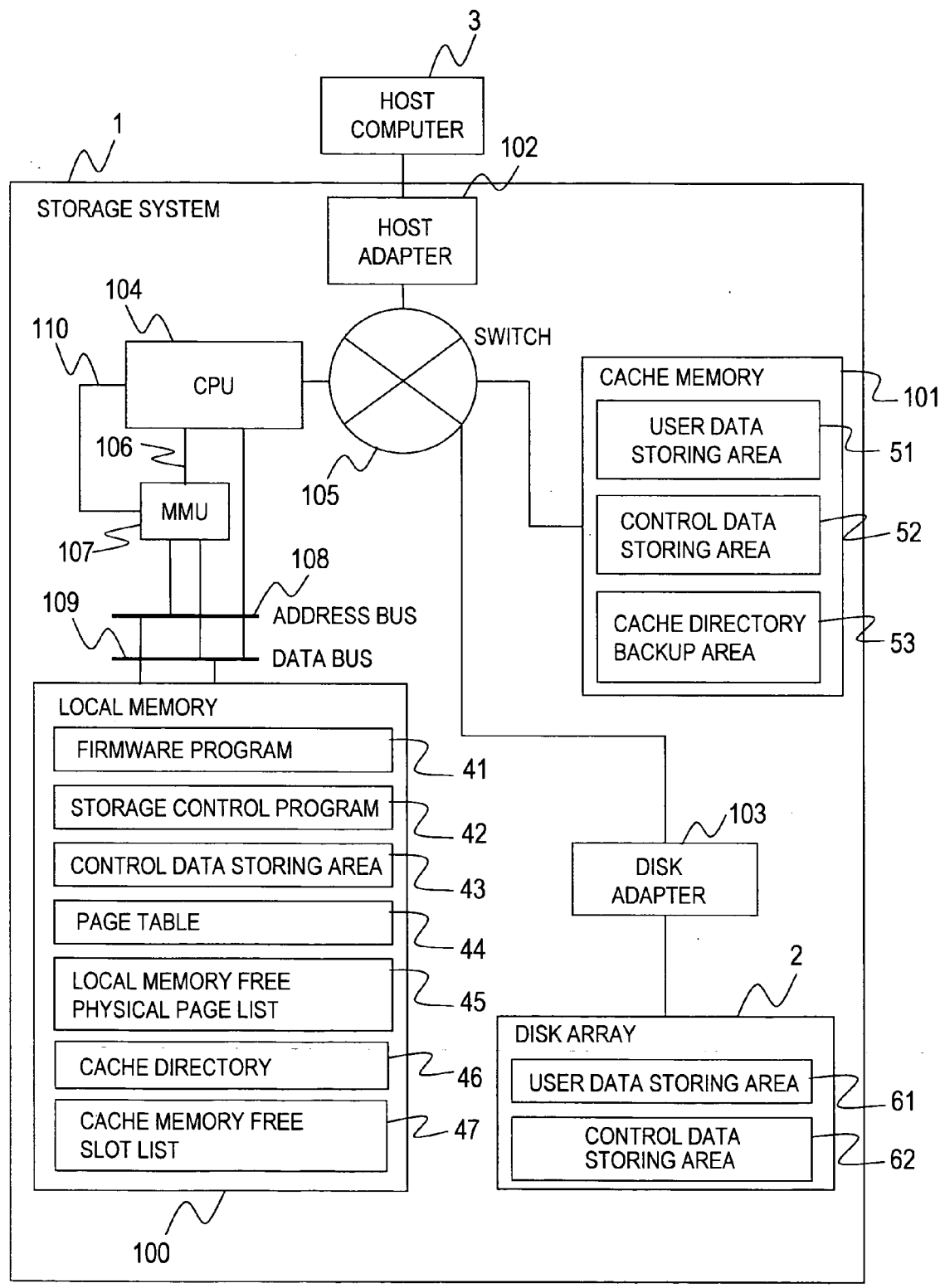
FIG. 32 is a block diagram showing a configuration of a storage system according to a fifth embodiment of this invention.

FIG. 32 illustrates a fifth embodiment, in which a cache directory backup area 53 is provided on the cache memory 101 to provide the firmware program 41 with the function for writing all control data updated on the local memory 100 back to the cache memory 101 of the third embodiment shown in FIG. 15. According to this configuration, it is possible to prevent the control data from being lost even when a failure occurs in the local memory 100 and the CPU 104 and to improve the reliability of the storage system 1. A configuration thereof other than that is the same with that of the third embodiment.

Figure 33:
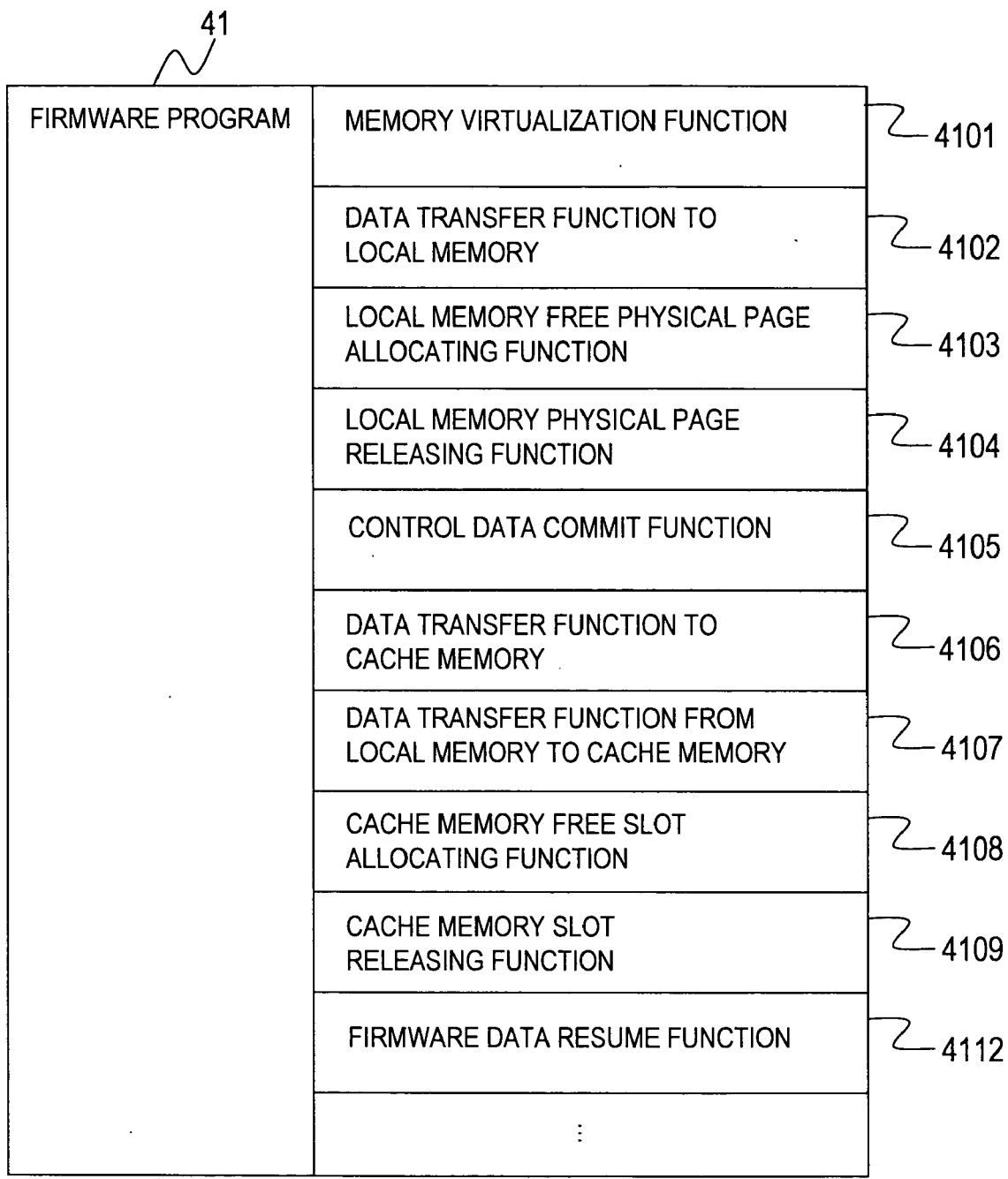
FIG. 33 is a block diagram showing functions of a firmware program according to the fifth embodiment of this invention.

FIG. 33 shows the functions of the firmware program 41 according to the fifth embodiment. According to this embodiment, the firmware program 41 is characterized by having the control data commit function 4105 for writing back all control data of the local memory 100 to the cache memory 101 and a firmware data resume function 4112 for resuming a state of recovery from a failure.

Figure 34:
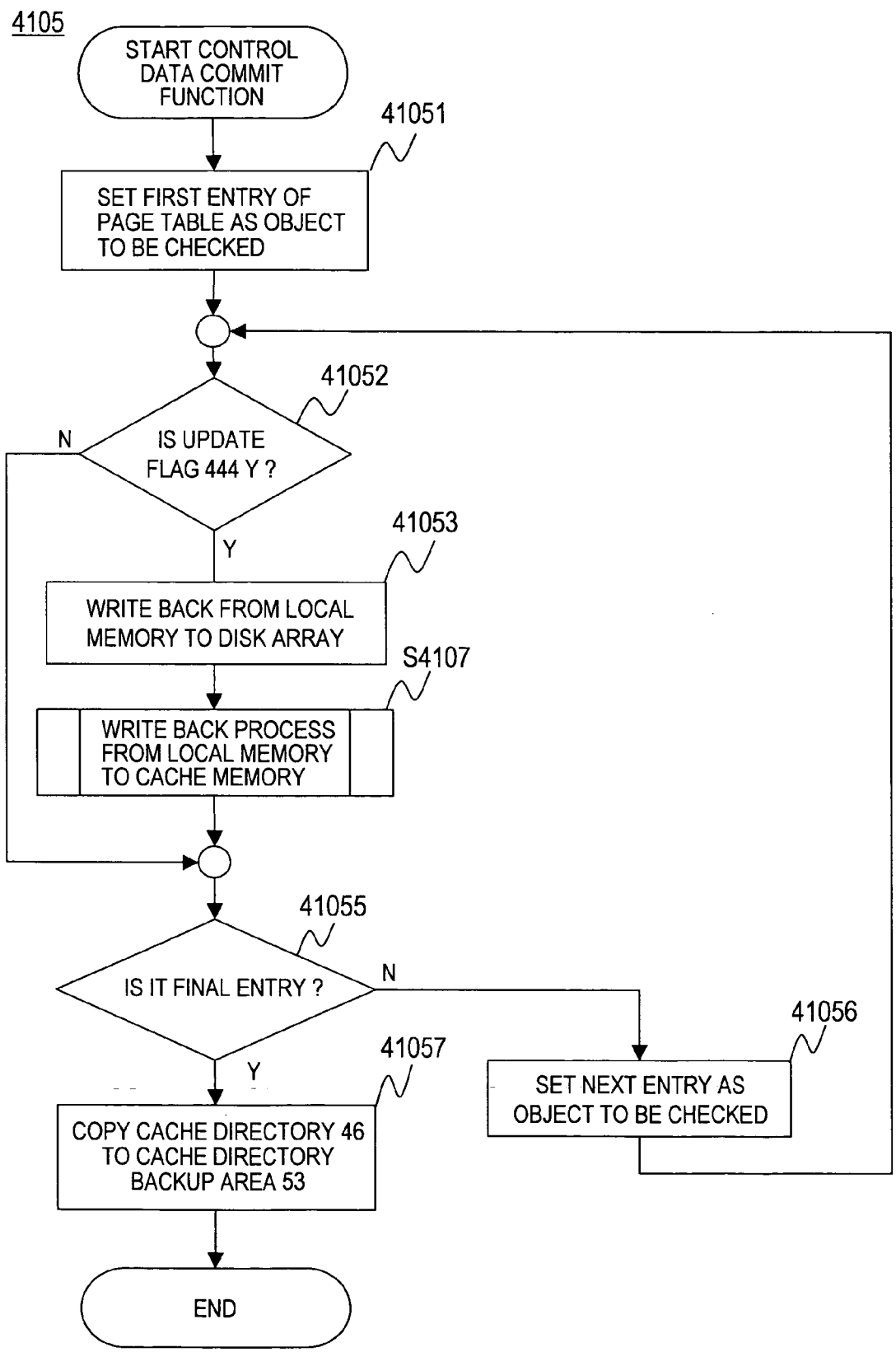
FIG. 34 is a flowchart showing one exemplary process carried out in a control data commit function of the firmware program according to the fifth embodiment of this invention.

FIG. 34 is a flowchart showing one exemplary process of the control data commit function 4105. First, the firmware program 41 selects a first entry of the page table 44 in Step 41051 and checks the update flag 444 of the entry in Step 41052. When the update flag 444 is Y, a virtual page corresponding to the entry is updated on the local memory 100, so that the firmware program 41 transfers data from a physical page corresponding to the physical page number 443 to a block corresponding to the virtual page of the control data storing area 62 on the disk array 2. Then, the firmware program 41 changes the update flag 444 of the entry to N in Step 41053.

Next, the firmware program 41 writes back the virtual page written back to the control data storing area 62 of the disk array 2 in Step 41053 described above also to the control data storing area 52 of the cache memory 101 in Step S4107. This process is carried out in the same manner with the process of the third embodiment shown in FIG. 24 and the current object virtual page is written back of the step number 463 by making a reference to the cache directory 46.

Next, when the update flag 444 is N in Step 41052 or the write back process has been carried out in Step 41053 and S4107, the firmware program 41 judges whether or not the entry is the final entry in the page table 44 in Step 41055. When it is not the final entry, the firmware program 41 repeats the processes on and after Step 41052 by setting a next entry as an object to be checked in Step 41056. When it is the final entry on the other hand, the firmware program 41 copies the cache directory 46 of the local memory 100 to a cache directory backup area 53 of the cache memory 101 in Step 41057 and ends the processes.

The control data updated in the control data storing area 43 of the local memory 100 is thus written back to the control data storing area 62 of the disk array 2 and to the control data storing area 52 of the cache memory 101 and the cache directory 46 is held in the cache directory backup area 53 of the cache memory 101 by the processes described above.

Figure 35:
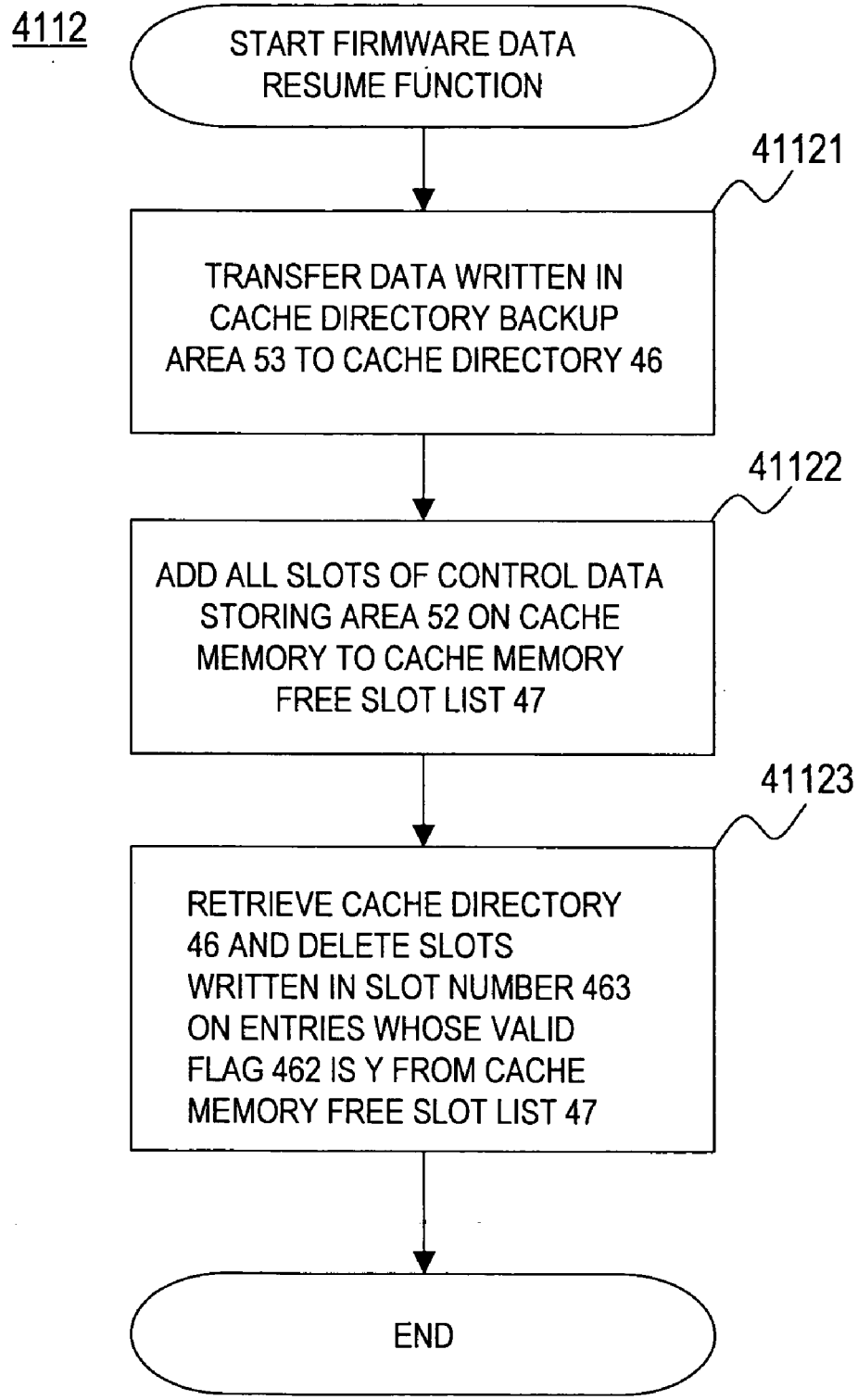
FIG. 35 is a flowchart showing one exemplary process carried out in a firmware data resume function of the firmware program according to the fifth embodiment of this invention.

FIG. 35 is a flowchart of the firmware data resume function 4112. This process is executed after when the local memory 100 and the CPU 104 recovers from a failure and is started from the storage control program 42.

In FIG. 35, the firmware program 41 transfers the data written in the cache directory backup area 53 to the cache directory 46 at first in Step 41121. Next, the firmware program 41 adds all of the slots of the control data storing area 52 on the cache memory 101 to the cache memory free slot list 47 in Step 41122. Finally, the firmware program 41 retrieves the cache directory 46 and deletes the slots written in the slot number 463 for the entry whose valid flag 462 is Y from the cache memory free slot list 47 in Step 41123.

Accordingly, the cache directory 46 and the cache memory free slot list 47 is recovered to the state before the failure occurred. Accordingly, it becomes possible to recover the control data from the cache memory even when the data on the local memory 100 is lost.

Sixth Embodiment

Figure 36:
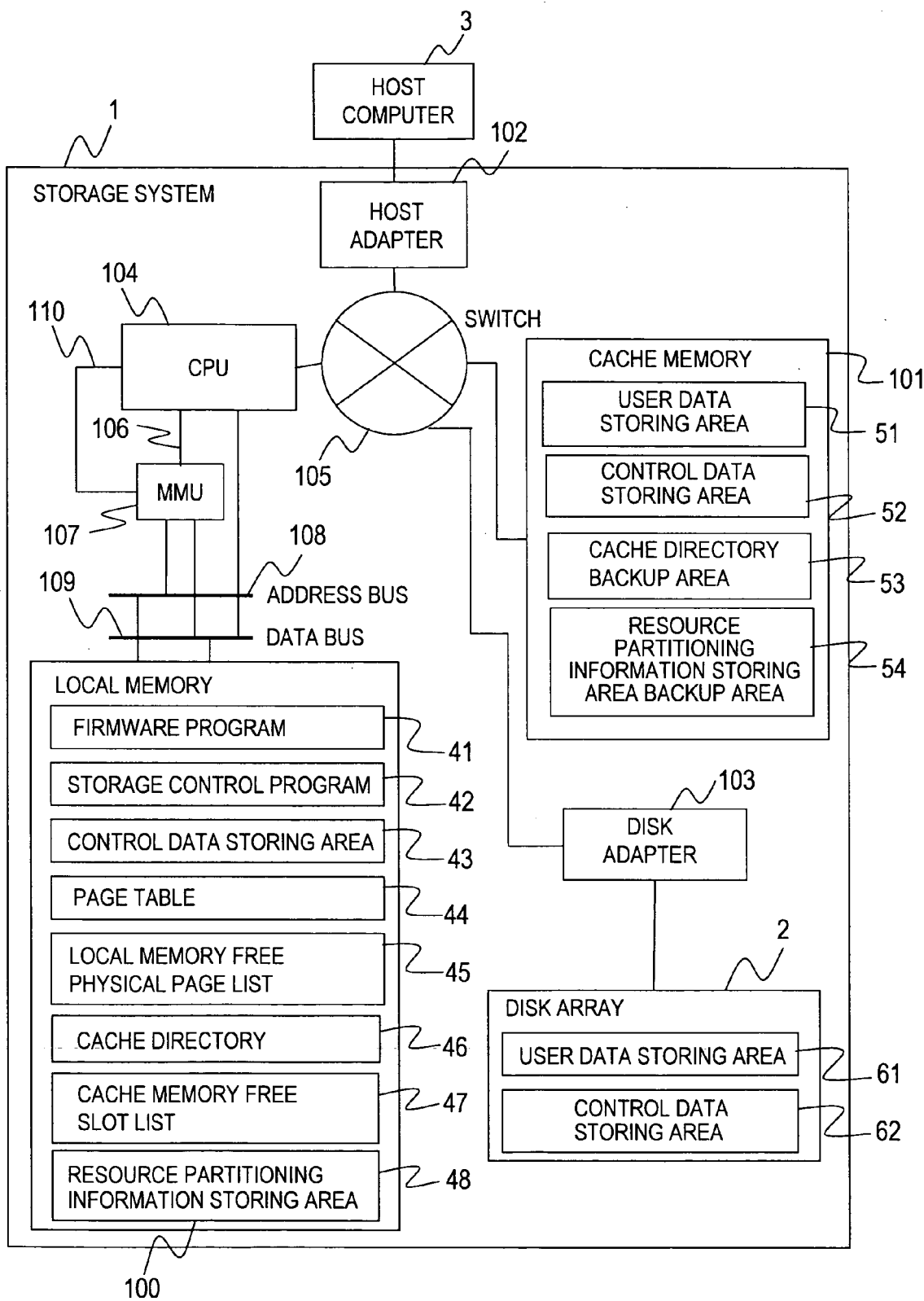
FIG. 36 is a block diagram showing a configuration of a storage system according to a sixth embodiment of this invention.

FIG. 36 illustrates a sixth embodiment, in which the resource partitioning information storing area 48 of the fourth embodiment shown in FIG. 27 is added to the configuration of the fifth embodiment and a resource partitioning information storing area backup area 54 for maintaining the contents of the resource partitioning information storing area 48 is provided to the cache memory 101 in the configuration of the fifth embodiment. A configuration thereof other than that is the same with those of the fourth and fifth embodiments described above.

According to the sixth embodiment, it becomes possible to prevent the control data from being lost even when a failure occurs in the local memory 100 or in the CPU 104 by backing up the resource partitioning information storing area 48 for setting the allocation state of the cache memory 101 to the cache memory 101, in addition to writing back all data updated on the local memory 100 to the cache memory 101, to recover the areas of the user data storing area 51 and the control data storing area 52 and to improve the reliability of the storage system 1.

FIG. 36 shows a configuration of the system according to the sixth embodiment. This embodiment is characterized in that the system has a resource partitioning information storing area backup area 54 on the cache memory 101 in the configuration of the storage system of the fifth embodiment shown in FIG. 32.

FIG. 37 shows the functions of the firmware program 41 in this embodiment. The firmware program 41 of the sixth embodiment is characterized in that the firmware program 41 has the control data commit function 4105 for writing back all control data to the cache memory 101 and for backing up the resource partitioning information storing area 48 to the cache memory 101 and the firmware data resume function 4112 for resuming the recovery state from a failure.

Figure 38:
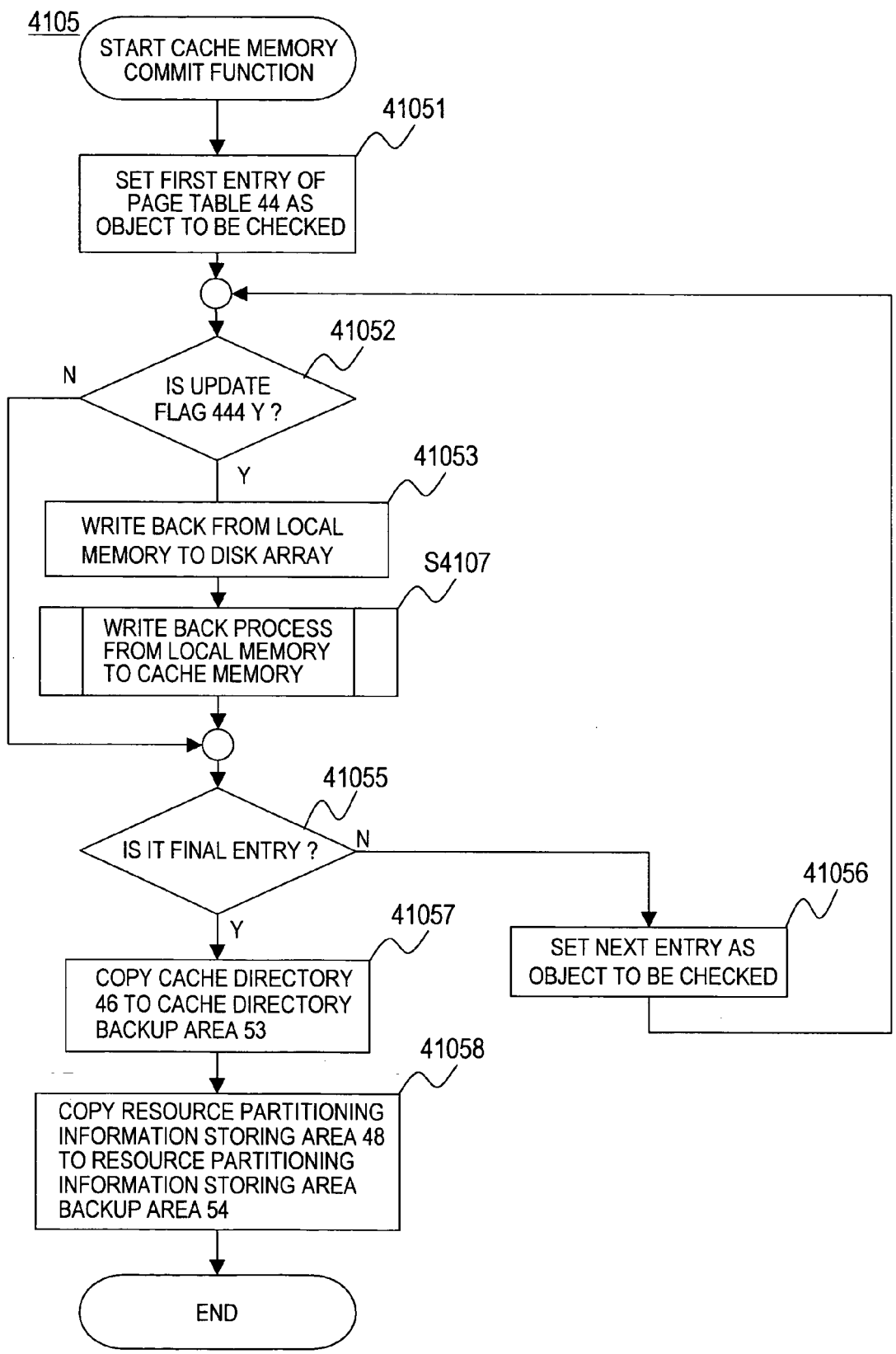
FIG. 38 is a flowchart showing one exemplary process carried out in a control data commit function of the firmware program according to the sixth embodiment of this invention.

FIG. 38 is a flowchart of the control data commit function 4105. In the control data commit function 4105, Step 41058 is added to the flowchart showing the process of the fifth embodiment shown in FIG. 34. The configuration other than that is the same with the process of the fifth embodiment shown in FIG. 34.

Similar to the process of the fifth embodiment in FIG. 34, the contents of all updated virtual pages is written back to the control data storing area 62 of the disk array 2 and also to the control data storing area 52 of the cache memory 101 in Steps 41051 through 41057. Then, the firmware program 41 copies the cache directory 46 to the cache directory backup area 53 of the cache memory 101 in Step 41057 and finally copies the resource partitioning information storing area 48 to the resource partitioning information storing area backup area 54 in Step 41058.

In addition to the contents of the all updated virtual pages and the cache directory 46, the resource partitioning information storing area 48 for controlling allocation states of the cache memory 101 is held in the cache memory 101 due to the processes described above.

Figure 39:
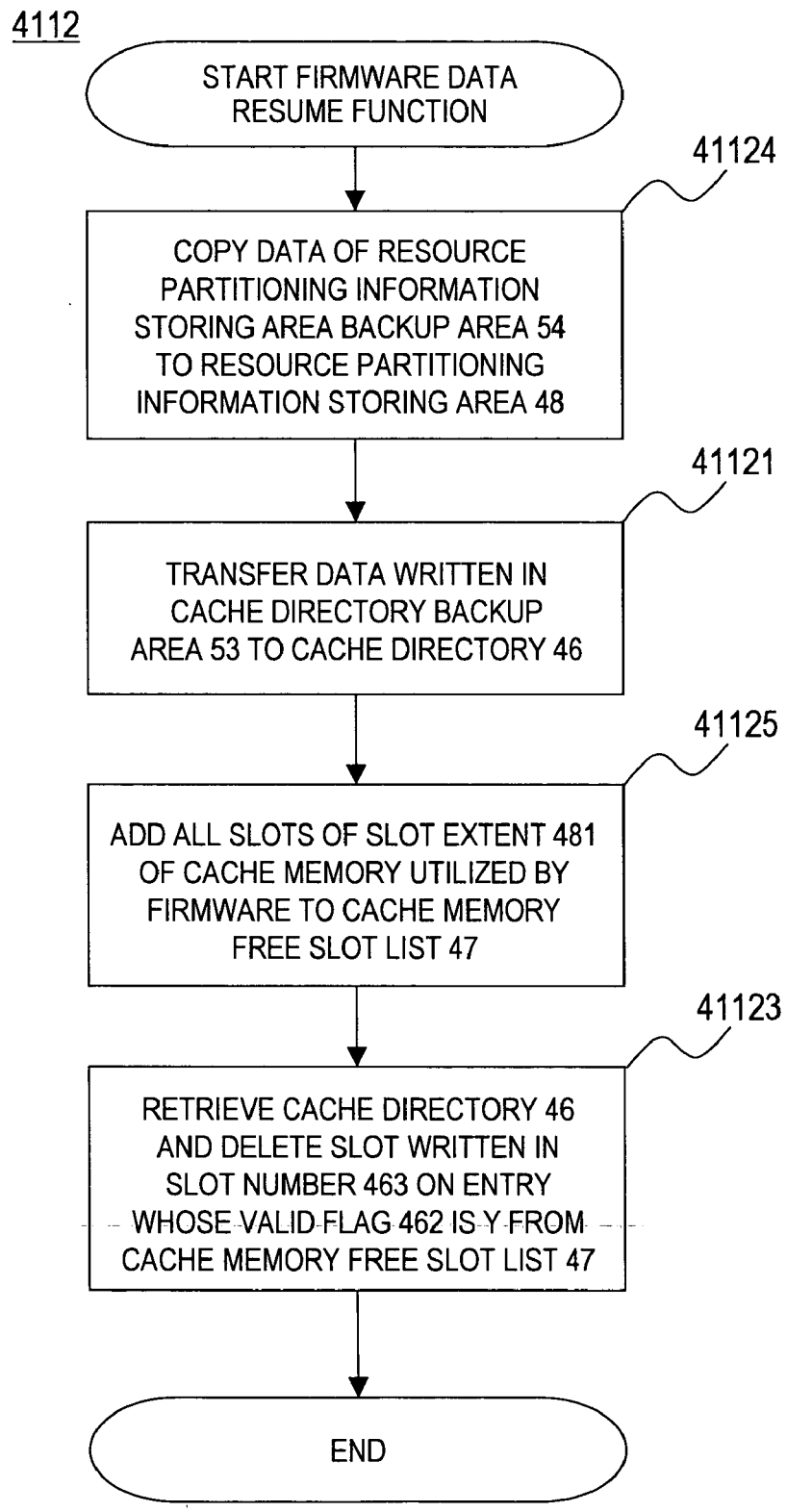
FIG. 39 is a flowchart showing one exemplary process carried out in a firmware data resume function of the firmware program according to the sixth embodiment of this invention.

FIG. 39 is a flowchart of the firmware data resume function 4112. First, the firmware program 41 copies information of the resource partitioning information storing area backup area 54 from the resource partitioning information storing area backup area 54 of the cache memory 101 to the resource partitioning information storing area 48 in Step 41124. Next, the firmware program 41 transfers data written in the cache directory backup area 53 to the cache directory 46 in Step 41121. Then, the firmware program 41 adds all of the slots in the slot extent 481 of the cache memory utilized by the firmware program 41 to the cache memory free slot list 47 in Step 41125. Finally, the firmware program 41 retrieves the cache directory 46 and deletes the slot written in the slot number 463 about the entry whose valid flag 462 is Y from the cache memory free slot list 47 in Step 41123.

Accordingly, the cache directory 46 and the resource partitioning information storing area 48 as well as the cache memory free slot list 47 are recovered to the state before a failure occurred.

Seventh Embodiment

Figure 40:
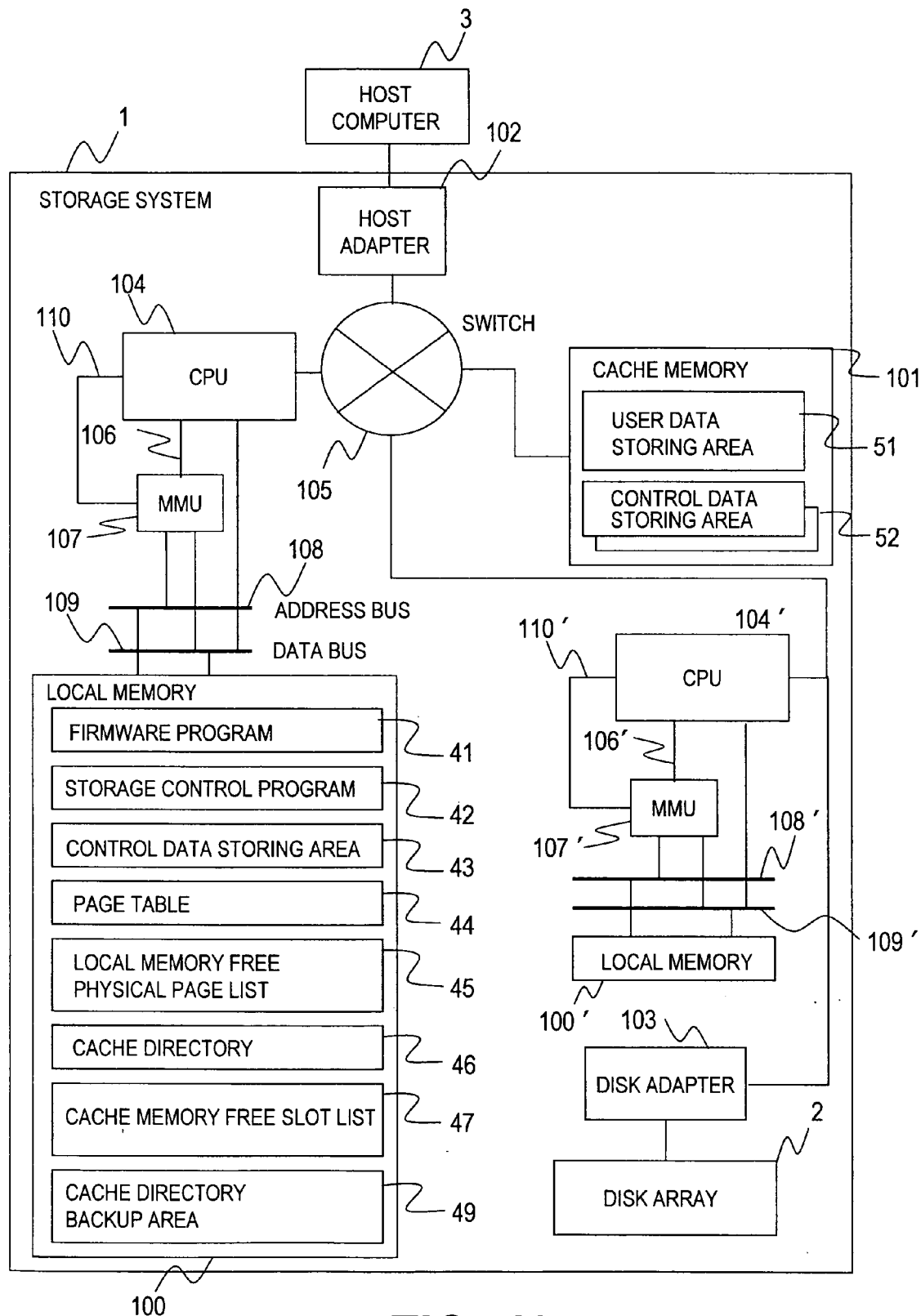
FIG. 40 is a block diagram showing a configuration of a storage system according to a seventh embodiment of this invention.

FIG. 40 illustrates a configuration of a storage system of a seventh embodiment. The storage system has a plurality of CPUs 104 and 104', MMUs 107 and 107', and local memories 100 and 100' within the storage system 1 of the fifth embodiment shown in FIG. 34 and copies the cache directory 46 of the third embodiment to the other local memory. Accordingly, it is possible to prevent the control data from being lost even when a failure occurs in either one of the local memories 100 and 100' and of the CPUs 104 and 104' and thus to improve the reliability of the storage system 1. A difference between the storage system of this embodiment and that of the fifth embodiment will be explained below.

FIG. 40 shows the system configuration of the seventh embodiment that is characterized by having the plurality of CPUs and local memories 100 and 100' as well as a cache directory backup area 49 on the local memories 100 and 100' in addition to the configuration of the storage system of the fifth embodiment shown in FIG. 32.

Figure 41:
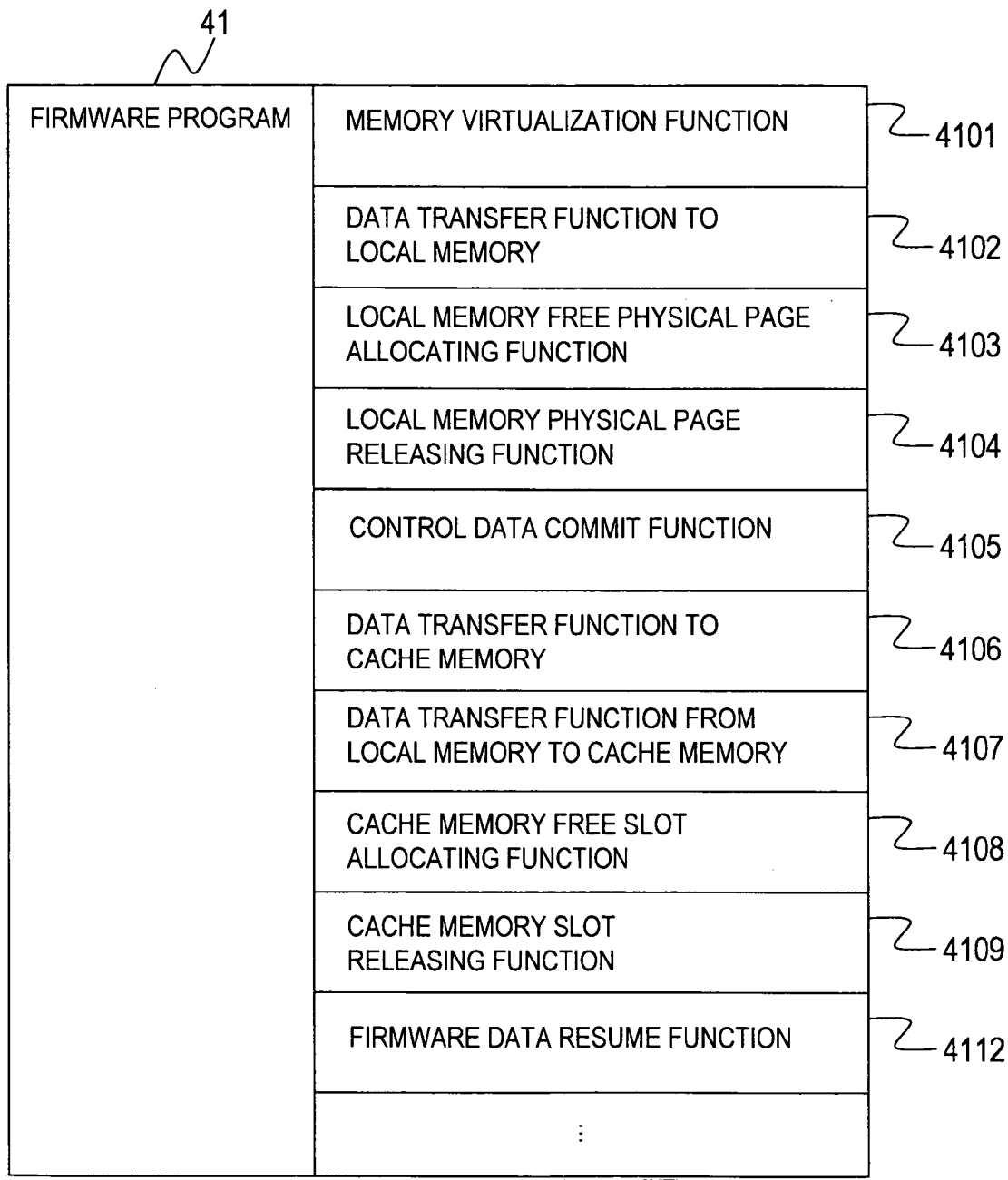
FIG. 41 is a block diagram showing functions of a firmware program according to the seventh embodiment of this invention.

FIG. 41 shows the functions of the firmware program 41 of the seventh embodiment.

The firmware program 41 of the seventh embodiment is characterized by having the control data commit function 4105 for writing back all control data to the cache memory 101 and a firmware data resume function 4112 for resuming a recovery state from a failure.

Figure 42:
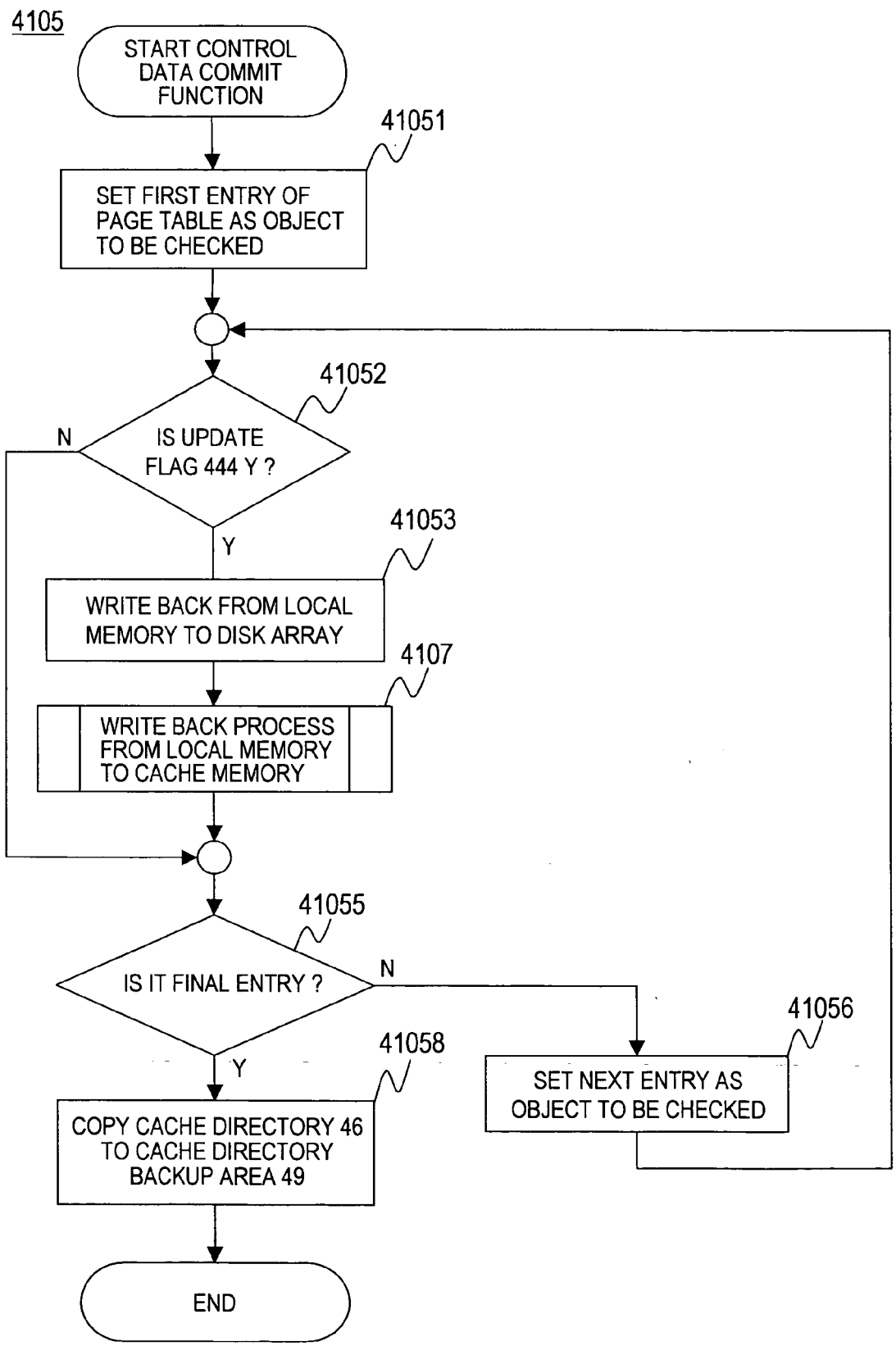
FIG. 42 is a flowchart showing one exemplary process carried out in a control data commit function of the firmware program according to the seventh embodiment of this invention.

FIG. 42 is a flowchart of the control data commit function 4105. In the flowchart, Step 41058 is added to the fifth embodiment shown in FIG. 34 and its configuration other than that is the same with that of the fifth embodiment in FIG. 34.

Similar to the flowchart of the fifth embodiment in FIG. 34, the contents of all updated virtual pages is written back to the control data storing area 62 of the disk array 2 and also to the control data storing area 52 of the cache memory 101 in Steps 41051 through 41057. Then, finally the firmware program 41 copies the cache directory 46 to the cache directory backup area 49 of the other memory 100' in Step 41058.

Figure 43:
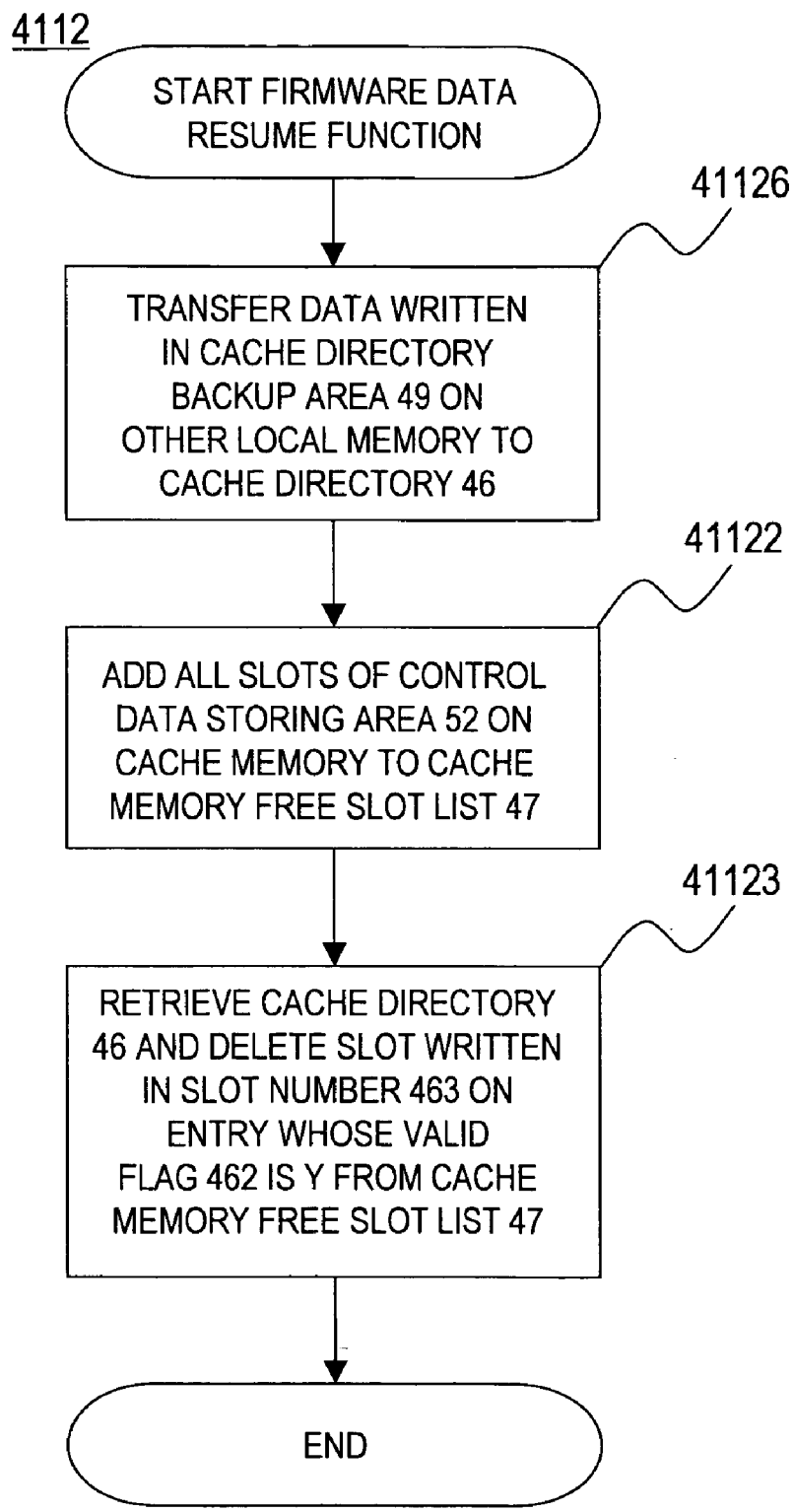
FIG. 43 is a flowchart showing one exemplary process carried out in a firmware data resume function of the firmware program according to the seventh embodiment of this invention.

FIG. 43 is a flowchart of the firmware data resume function 4112. First, the firmware program 41 transfers data written in the cache directory backup area 49 stored on the other local memory to the cache directory 46 in Step 41126. Next, the firmware program 41 adds all slots in the slot extent 481 of the cache memory utilized by the firmware program 41 to the cache memory free slot list 47 in Step 41125. Finally, the firmware program 41 retrieves the cache directory 46 and deletes the slot written in the slot number 463 about the entry whose valid flag 462 is Y from the cache memory free slot list 47 in Step 41123. Accordingly, the cache directory 46 and the cache memory free slot list 47 are recovered to the state before the failure occurs.

Thus, it becomes possible to recover the control data from information stored in the other local memory even if the data on the local memory 100 is lost.

Eighth Embodiment

Figure 44:
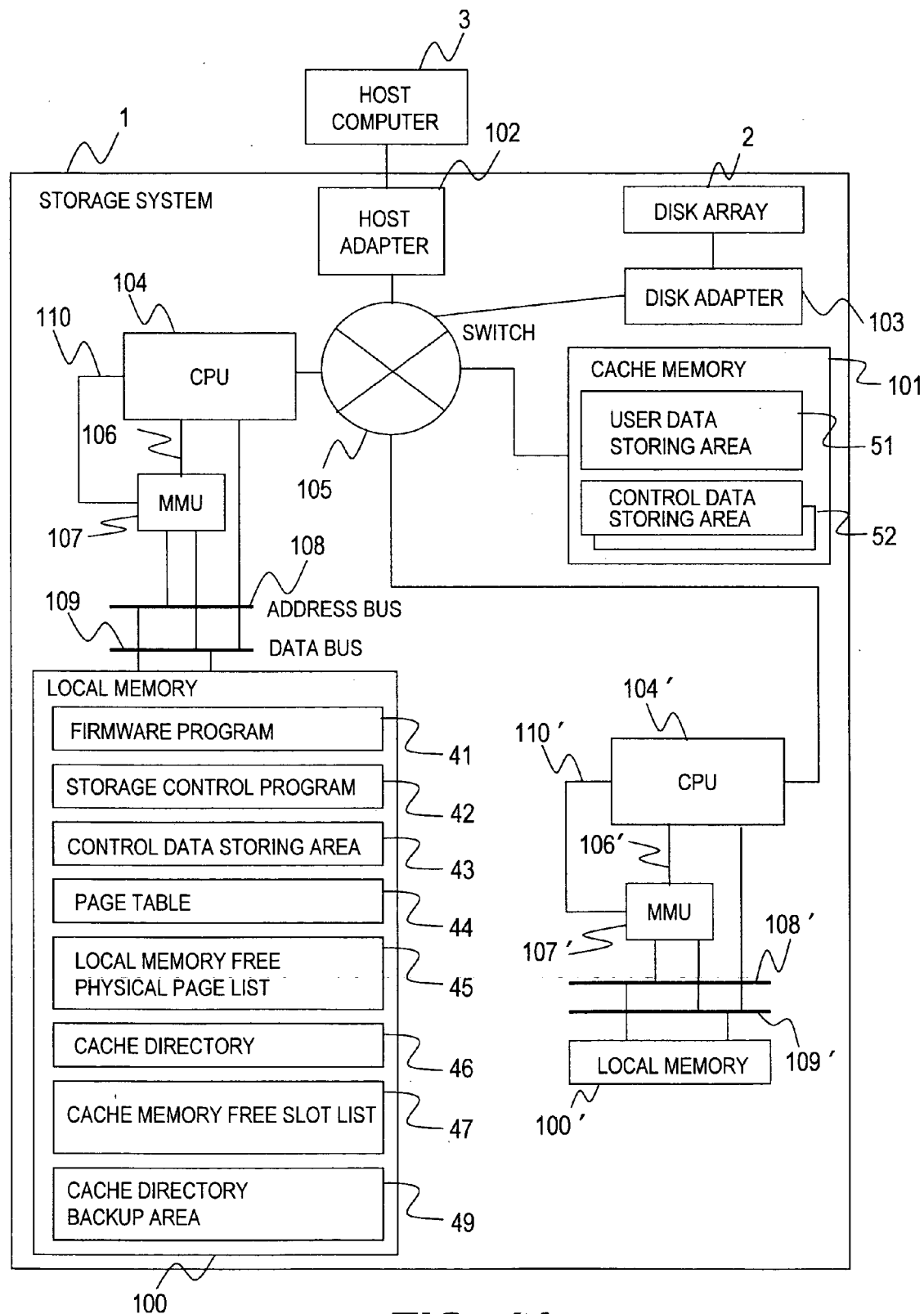
FIG. 44 is a block diagram showing a configuration of a storage system according to an eighth embodiment of this invention.

FIG. 44 shows a configuration of a storage system of an eighth embodiment. The storage system has a plurality of CPUs 104 and 104', MMUs 107 and 107', and local memories 100 and 100' within the storage system 1 of the fifth embodiment shown in FIG. 32 and copies the cache directory 46 of the third embodiment to the other local memory. Accordingly, it is possible to prevent the control data from being lost even when a failure occurs in either one of the local memories 100 and 100' and of the CPUs 104 and 104' and thus to improve the reliability of the storage system 1. A difference between the storage system of this embodiment and that of the fifth embodiment will be explained below.

FIG. 44 shows the system configuration of the eighth embodiment that is characterized by having the cache directory backup area 49 on the local memory 100 in addition to the configuration of the storage system of the fifth embodiment shown in FIG. 32.

Figure 45:
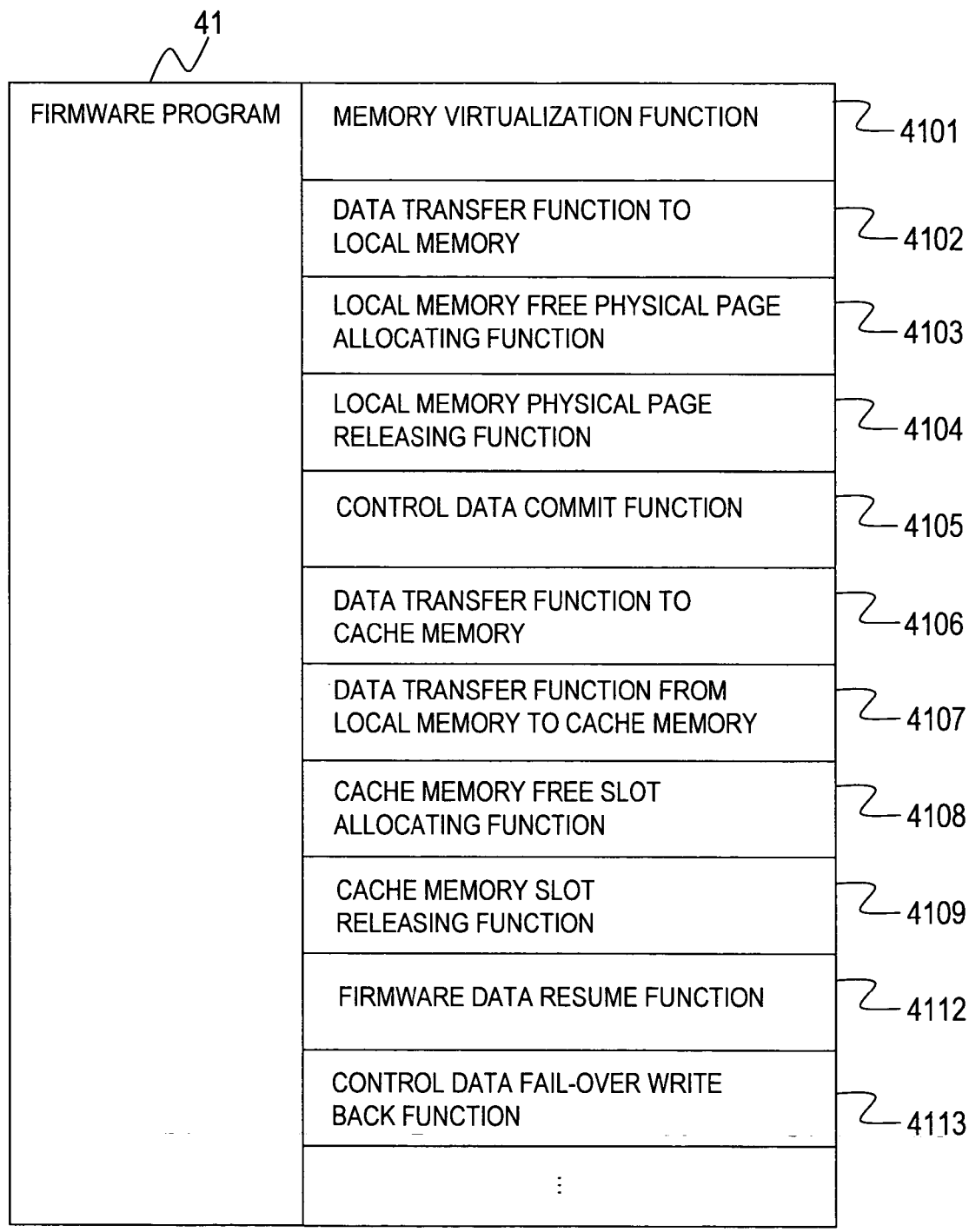
FIG. 45 is a block diagram showing functions of a firmware program according to the eighth embodiment of this invention.

FIG. 45 shows the functions of the firmware program 41 of this embodiment. The firmware program 41 of the eighth embodiment is characterized in by having the control data commit function 4105 for writing back all control data to the cache memory 101, the firmware data resume function 4112 for resuming a recovery state from a failure, and a control data fail-over write back function 4113 for writing back the control data utilized by the other CPU to the disk array instead of the CPU when a failure occurs in the CPU.

The flow of the process of the control data commit function 4105 is the same with that of the flowchart of the seventh embodiment shown in FIG. 42. In other words, similar to the process of the fifth embodiment shown in FIG. 34, the contents of all updated virtual pages is written back to the control data storing area 62 of the disk array 2 and also to the control data storing area 52 of the cache memory 101. Then, finally the firmware program 41 copies the cache directory 46 to the cache directory backup area 49 of the other memory 100'.

Figure 46:
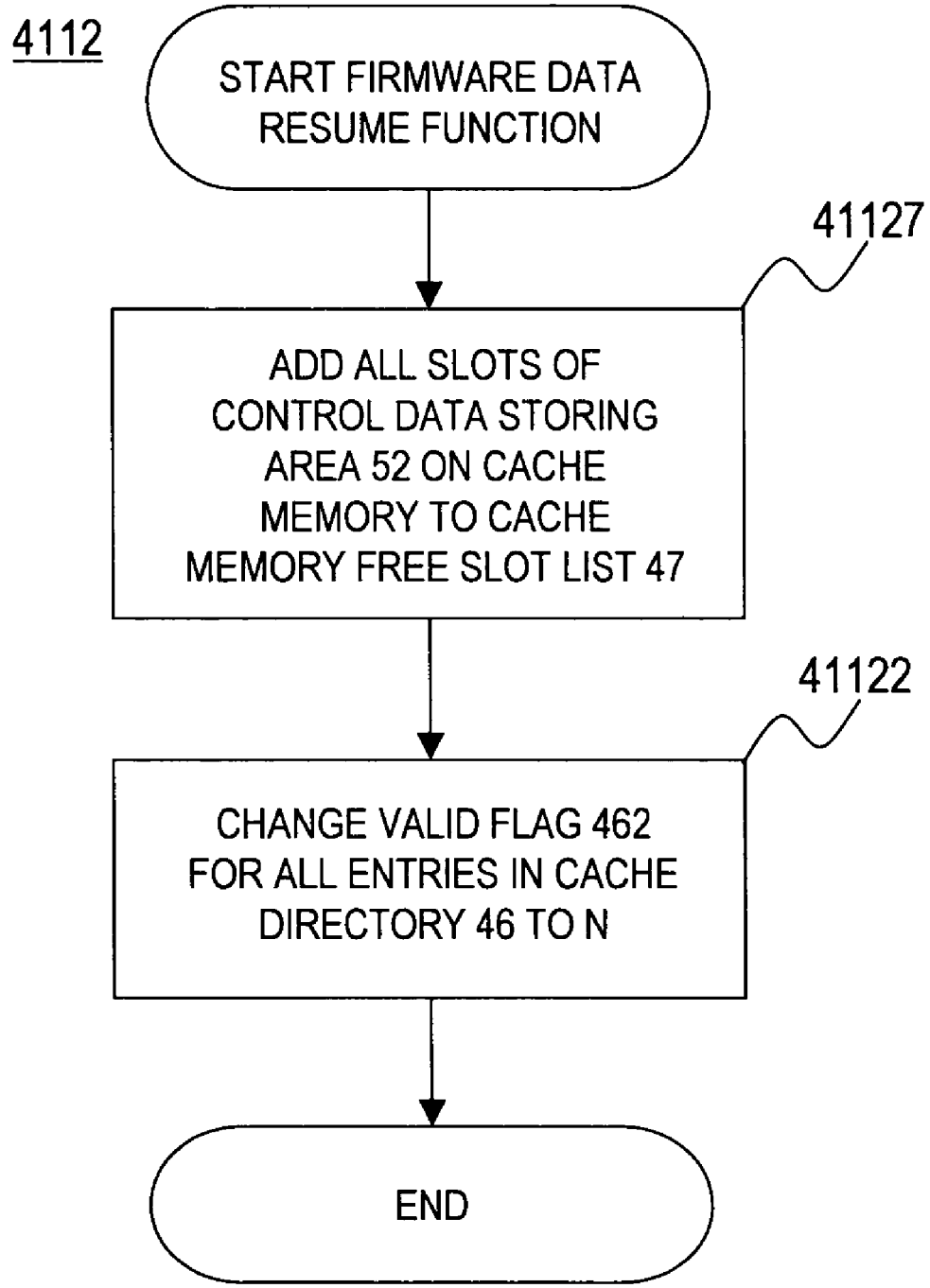
FIG. 46 is a flowchart showing one exemplary process carried out in a firmware data resume function of the firmware program according to the eighth embodiment of this invention.

FIG. 46 is a flowchart of the firmware data resume function 4112. The entire control data has been written into the disk array 2 at the time of recovery in this embodiment, so that the cache directory 46 simply needs to be initialized. First, the firmware program 41 changes the valid flag 462 of all entries in the cache directory 46 to N in Step 41127. Next, the firmware program 41 adds all of the slots in the control data storing area 52 on the cache memory 101 to the cache memory free slot list 47 in Step 41122. Accordingly, the CPU after the recovery from the failure can correctly make a reference to the control data.

Figure 47:
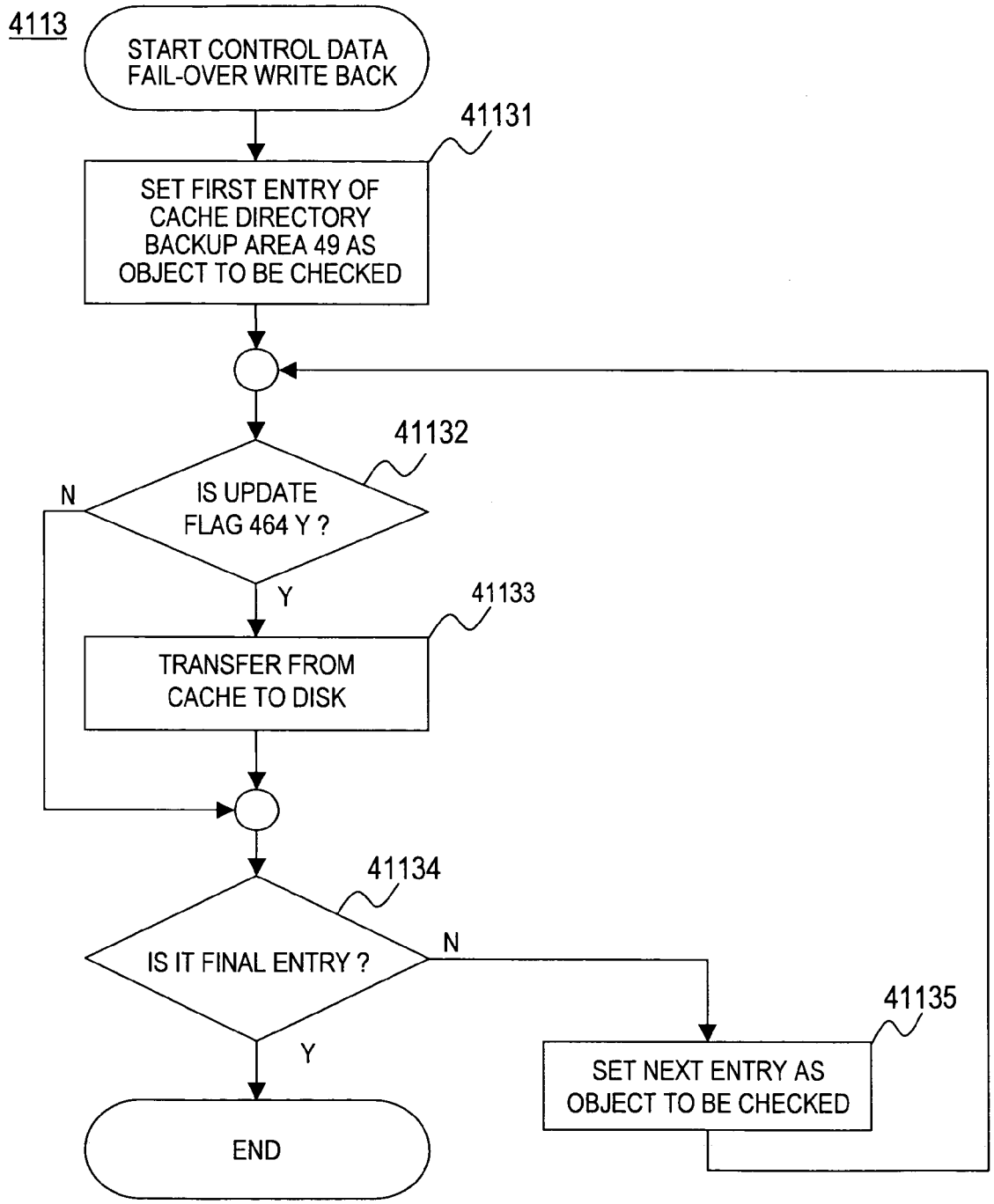
FIG. 47 is a flowchart showing one exemplary process carried out in a control data fail-over write back function of the firmware program according to the eighth embodiment of this invention.

FIG. 47 is a flowchart of a control data fail-over write back function 4113. According to this function, the second CPU 104' saves the control data on the cache memory 101 that is handled by the first CPU 104 to the disk array 2 instead of the first CPU 104 when the first CPU 104 causes a failure and is disabled. First, the firmware program 41 selects a first entry in the cache directory backup area 49 in Step 41131 and checks the update flag 464 of the entry in Step 41132. When the update flag is Y, a virtual page corresponding to that entry has been updated on the cache memory 101, so that the firmware program 41 transfers the data from a slot corresponding to the cache slot number 463 to a block corresponding to the virtual page of the control data storing area 62 on the disk array 2 in Step 41133.

Then, the firmware program 41 judges whether or not the entry is the final entry in the cache directory backup area 49 in Step 41134 and when it is not the final one, repeats the processes on and after Step 41132 by setting a next entry as an object in Step 41135.

The latest control data handled by the first CPU is all written into the disk array by the processes described above. Accordingly, it becomes possible to recover the control data from information stored in the other local memory even when the data on the local memory 100 is lost.

MODIFIED EXAMPLE

It should be noted that in each embodiment described above, it is possible to prohibit an access from the storage control program 42 by setting part of the area utilized by the firmware program 41 as the control data storing areas 62 and 52 among the memory spaces of the cache memory 101 and the disk array 2 as a reserved area. In this case, the storage control program 42 cannot use the reserved area and only the firmware program 41 accesses thereto.

For instance, the storage control program 42 allocates an area except the reserved area when it newly allocates an area in the disk array 2. The unusable reserved area is described in advance within the storage control program 42 such that the storage control program 42 uses the area except the reserved area in creating a new logical volume for example.

Alternatively, it may be arranged such that the storage control program 42 does not use the reserved area set for the firmware program 41 when the storage control program 42 newly allocates an area in the cache memory 101. It is possible to arrange so as not to include the reserved area in the area usable for the storage control program 42 in the same arrangement with the cache memory free slot list 47 of the firmware program 41.

While the present invention has been described in detail and pictorially in the accompanying drawings, the present invention is not limited to such detail but covers various obvious modifications and equivalent arrangements, which fall within the purview of the appended claims.

(Complements)

It should be noted that in the storage system described in claim 8, the control area includes a recovery unit for recovering a mapping of the virtual address and the storage position of the cache memory based on the cache memory managing information copied to the cache memory.

(1) A storage system, including:
a channel interface unit having an interface with a host computer;

a disk interface unit having an interface with a disk array composed of two or more disk drives for storing data sent from the host computer;

a cache memory unit for temporarily storing data read/written from/to the disk array;

a CPU for making control related to data transfer between the channel interface unit and the disk interface unit and the cache memory unit; and a local memory unit for storing the control data used by the CPU for control, in which the CPU stores the control data in an area on the disk array.

(2) The storage system according to the item (1), in which the storage system writes back the updated control data to the area for storing the control data of the disk array when the CPU updates the control data stored in the local memory.

(3) The storage system according to the item (1), further including an area for storing the control data in the cache memory unit.

(4) The storage system according to the item (3), in which the area for storing the control data of the cache memory is variable.

(5) The storage system according to the item (3), in which the storage system writes back the updated control data to the area for storing the control data of the disk array when the CPU updates the control data stored in the local memory.

(6) The storage system according to the item (2), in which the storage system writes back the updated control data to the area for storing the control data of the disk array when the CPU updates the control data stored in the local memory.

(7) The storage system according to the item (3), further including a cache memory management unit for recording a mapping between the control data on the disk array and the control data on the cache memory in the local memory unit.

(8) The storage system according to the item (7), further including a cache memory partitioning management information unit for recording an extent of areas for storing the control data of the cache memory in the local memory unit.

(9) The storage system according to the item (7), in which the storage system writes back the updated control data to the area for storing the control data of the disk array when the CPU updates the control data stored in the local memory.

(10) The storage system according to the item (9), further including an area for backing up the cache memory management unit on the cache memory, in which, when the CPU updates the cache memory management unit, the updated cache memory management unit is written back to the area for backing up the cache memory management unit.

(11) The storage system according to the item (10), in which the CPU reads information in the cache memory management unit from the area for backing up the cache memory management unit when the information of the cache memory management unit is lost.

(12) The storage system according to the item (8), in which the storage system writes back the updated control data to the area for storing the control data of the disk array when the CPU updates the control data stored in the local memory.

(13) The storage system according to the item (12), further including:

an area for backing up the cache memory management unit on the cache memory; and an area for backing up the cache memory partitioning management information unit on the cache memory, in which, when the CPU updates the cache memory management unit, the updated cache memory management unit is written back to the area for backing up the cache memory management unit.

(14) The storage system according to the item (13), in which:

the CPU reads the information of the cache memory management unit from the area for backing up the cache memory management unit when the information of the cache memory management unit is lost; and the CPU reads information of the cache memory partitioning management information unit from an area for backing up the cache memory partitioning management information unit when the information of the cache memory management unit is lost.

(15) The storage system according to the item (1), further including an MMU for converting a logical address and a physical address between the CPU and the local memory unit, in which:

the MMU judges whether or not the control data exists in the local memory in response to a request to refer to the control data from the CPU; and when there exists no control data, the CPU controls so as to take the control data out of the disk array in response to the request from the MMU to store in the local memory.

(16) The storage system according to the item (15), in which the storage system writes back the updated control data to the area for storing the control data of the disk array when the CPU updates the control data stored in the local memory.

(17) The storage system according to the item (15), further including: an area for storing the control data in the cache memory unit.

(18) The storage system according to the item (17), in which the area for storing the control data of the cache memory is variable.

(19) The storage system according to the item (17), in which the storage system writes back the updated control data to the area for storing the control data of the disk array when the CPU updates the control data stored in the local memory.

(20) The storage system according to the item (18), in which the storage system writes back the updated control data to the area for storing the control data of the disk array when the CPU updates the control data stored in the local memory.

(21) The storage system according to the item (17), further including: a cache memory management unit for recording a mapping between the control data on the disk array and the control data on the cache memory in the local memory unit.

(22) The storage system according to the item (21), further including: a cache memory partitioning management information unit for recording an extent of areas for storing the control data of the cache memory in the local memory unit.

(23) The storage system according to the item (21), in which the storage system writes back the updated control data to the area for storing the control data of the disk array when the CPU updates the control data stored in the local memory.

(24) The storage system according to the item (23), further including an area for backing up the cache memory management unit on the cache memory, in which, when the CPU updates the cache memory management unit, the updated cache memory management unit is written back to the area for backing up the cache memory management unit.

(25) The storage system according to the item (24), in which the CPU reads information in the cache memory management unit from the area for backing up the cache memory management unit when the information of the cache memory management unit is lost.

(26) The storage system according to the item (22), in which the storage system writes back the updated control data to the area for storing the control data of the disk array when the CPU updates the control data stored in the local memory.

(27) The storage system according to the item (26), further including:
an area for backing up the cache memory management unit on the cache memory; and
an area for backing up the cache memory partitioning management information unit on the cache memory,
in which, when the CPU updates the cache memory management unit, the updated cache memory management unit is written back to the area for backing up the cache memory management unit.

(28) The storage system according to the item (27), in which:
the CPU reads the information of the cache memory management unit from the area for backing up the cache memory management unit when the information of the cache memory management unit is lost; and
the CPU reads information of the cache memory partitioning management information unit from an area for backing up the cache memory partitioning management information unit when the information of the cache memory management unit is lost.

(29) A storage system, including: a channel interface unit having an interface with a host computer; a disk interface unit having an interface with a disk array composed of two or more disk drives for storing data sent from the host computer; a cache memory unit for temporarily storing data read/written from/to the disk array; a plurality of CPUs for performing a control related to data transfer between the channel interface unit and the disk interface unit and the cache memory unit; and a plurality of local memory units for storing the control data used by the CPU for control, in which the CPUs and the local memories are connected to one by one, further including:
an area for storing the control data in the cache memory unit;
a cache memory control unit for controlling the area for storing the control data in the local memory unit; and
an area for backing up the cache memory management unit of a second local memory unit connected to a second CPU in a first local memory unit connected to a first CPU.

(30) The storage system according to the item (29), in which the storage system writes back the updated control data to the area for storing the control data of the disk array when the CPU updates the control data stored in the local memory.

(31) The storage system according to the item (29), in which:
the second CPU reads out the area for backing up the cache memory management unit stored in the second local memory unit; and
the second CPU writes back the control data on the cache memory to the disk array.

As described above, this invention may be applied to a storage system having a disk cache and a local memory and more specifically to a storage system and a network attached storage (NAS) connected to a storage area network (SAN).

What is claimed is:
1. A storage system, comprising:
a first interface coupled to a host computer;
a second interface coupled to a plurality of disk drives configured to store data;
a cache memory configured to store data read from/written to the disk drives;
a first control unit having a first processor configured to control data transfer between the first and second interfaces and the cache memory;
a second control unit having a second processor configured to control data transfer between the first and second interfaces and the cache memory;
a first local memory configured to store control data used by the first processor; and
a second local memory configured to store control data used by the second processor, wherein:
each disk drive includes:
a first user data storing area configured to store user data; and
a first control data storing area configured to store the control data used by the first processor;
the cache memory includes:
a second user data storing area configured to store the user data; and
a second control data storing area configured to store the control data used by the first processor;
wherein the first control unit includes a virtualization unit configured to allocate a memory space of the first control data storing area to a virtual address accessible from the first processor, and reading control data specified by the virtual address to a physical address of the first local memory to transfer the control data to the first processor;
wherein the virtualization unit comprises page information and cache memory management information configured to store a local memory valid flag indicating whether or not an entry corresponding to the virtual address exists on the first local memory;
wherein when the host computer accesses the virtual address, the virtualization unit references the page information to retrieve information indicating whether or not the entry corresponding to the virtual address exists on the first local memory, wherein if the entry exists on the first local memory then the virtualization unit accesses the first local memory, wherein if the entry does not exist on the first local memory then the virtualization unit transfers the control data from the first control data storing area to the first local memory,
wherein the virtualization unit converts between a storage position of the control data in the second control data storing area and the virtual address based on the cache memory management information, reads the control data specified by the virtual address from the second control data storing area to the physical address of the first local memory, and transfers the control data to the first processor;
wherein the first control unit includes a first backup unit configured to copy the cache memory management information on the first local memory to the second local memory,
wherein the second control unit includes a write back unit configured to copy the control data used by the first processor on the cache memory to a disk drive in the plurality of disk drives and, when the first processor causes a failure, the write back unit references the cache management information on the second local memory and copies the control data on the cache memory to the disk drive,
wherein the first control unit comprises a resource partitioning management unit configured to set a rate of the second user data storing area to the second control data storing area on the cache memory and resource partitioning management information configured to store the rate of the second user data storing area to the second control data storing area on the cache memory, and wherein the first control unit includes a second backup unit configured to copy the resource partitioning management information to the cache memory.

2. The storage system according to claim 1, wherein the virtualization unit includes:

a virtual address setting unit configured to allocate the memory space of the first control data storing area to the virtual address accessible from the first processor;

a virtual address converting unit for configured to convert the virtual address and the physical address of the first local memory;

a control data transferring unit configured to transfer the control data stored in the first control data storing area to the first local memory when the processor requests to read/write the control data; and a control data accessing unit configured to transfer the control data transferred to the first local memory to the first processor by converting the physical address space of the first local memory into the virtual address by the virtual address converting unit.

3. The storage system according to claim 2, wherein the virtualization unit includes:

a second virtual address converting unit configured to convert between the virtual address and the storage position of the cache memory; and a second control data transferring unit configured to transfer the control data stored in the second control data storing area to the first local memory when the processor requests to read/write the control data.

4. The storage system according to claim 3, wherein:

the second virtual address converting unit includes cache memory management information configured to set a mapping between the virtual address and the storage position of the cache memory; and the first control unit includes a first backup unit configured to copy the cache memory management information to the cache memory.

5. The storage system according to claim 2, wherein the control data transferring unit writes back the control data on the first local memory to the first control data storing area when the control data stored in the control data storing area of the first local memory is updated.

6. The storage system according to claim 2, wherein the control data transferring unit writes back the control data on the first local memory to the second control data storing area when the control data stored in the control data storing area of the first local memory is updated.

7. A control method for a storage system which includes a disk drive for reading/writing data in response to a request from a host computer, a cache memory configured to store data read from/written to the disk drive, a first control unit having a first processor configured to control data transfer to the cache memory and the disk drive, and configured to store control data used by the first processor to a first local memory, a second control unit having a second processor configured to control data transfer to the cache memory and the disk drive and a second local memory, wherein the disk drive has a first user data storing the area configured to store the user data and a first control data storing area configured to store the control data used by the first processor and the cache memory includes a second user data storing area configured to store the user data and a second control data storing area configured to store the control data, the method comprising steps of:

allocating a memory space of the first control data storing area to a virtual address accessible from the first processor;

reading the control data specified by the virtual address to an area of the first local memory specified by a physical page; and transferring the control data read into the first local memory to the first processor, wherein when the host computer accesses the virtual address, the method further comprises a step of determining whether an entry corresponding to the virtual address exists in page information for the first local memory and if so, then accessing the first local memory, and if not, then transferring the control data from the first control data storing area to the first local memory, wherein reading the control data specified by the virtual address to the area of the first local memory specified by the physical address includes: converting between a storage position of the control data in the second control data storing area and the virtual address based on cache memory managing information, and reading the control data specified by the virtual address from the second control data storing area to the area of the first local memory;

copying the cache managing information on the first local memory to the second local memory and, when the first processor causes a failure, copying the control data used by the first processor on the cache memory to the disk drive; and setting the rate of the second user data storing area and the second control data storing area on the cache memory, including storing the rate of the second user data storing area and the second control data storing area on the cache memory to resource partitioning management information on the first local memory and copying the resource partitioning information to the cache memory.

8. The method for controlling the storage system according to claim 7, wherein:

the step of allocating the memory space of the first control data storing area to the virtual address accessible from the processor includes the step of setting the mapping between the virtual address and the physical address of the first local memory; and the step of reading the control data specified by the virtual address to the area of the first local memory specified by the physical page includes the step of transferring the control data stored in the first control data storing area to the first local memory based on the mapping between the virtual address and the physical address when the processor requests to read/write the control data.

9. The method for controlling the storage system according to claim 7, further comprising the step of setting the mapping between the virtual address and the storage position of the cache memory, wherein the step of reading the control data specified by the virtual address to the area of the first local memory specified by the physical address includes the step of transferring the control data stored in the second control data storing area to the first local memory when the first processor requests to read/write the control data.

10. The method for controlling the storage system according to claim 7, further comprising the step of writing back the control data on the first local memory to the first control data storing area when the control data stored in the control data storing area of the first local memory is updated.

11. The method for controlling the storage system according to claim 7, further comprising the step of writing back the control data on the first local memory to the second control data storing area when the control data stored in the control data storing area of the first local memory is updated.

12. The method for controlling the storage system according to claim 7, wherein the step of setting the mapping between the virtual address and the storage position in the cache memory includes the step of:

setting the mapping between the virtual address and the storage position in the cache memory according to the cache memory managing information; and copying the cache memory managing information to the cache memory.

* * * * *